US011785466B2

(12) United States Patent
Smith et al.

(10) Patent No.: US 11,785,466 B2
(45) Date of Patent: *Oct. 10, 2023

(54) METHOD AND SYSTEM FOR IOT CODE AND CONFIGURATION USING SMART CONTRACTS

(71) Applicants: Rose M. Smith, Warwick, NY (US);
Samuel F. Smith, Warwick, NY (US);
Clyde C. Smith, Warwick, NY (US)

(72) Inventors: Rose M. Smith, Warwick, NY (US);
Samuel F. Smith, Warwick, NY (US);
Clyde C. Smith, Warwick, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,894

(22) Filed: Oct. 7, 2022

(65) Prior Publication Data

US 2023/0100342 A1    Mar. 30, 2023

Related U.S. Application Data

(63) Continuation of application No. 16/351,647, filed on Mar. 13, 2019, now Pat. No. 11,528,611.

(Continued)

(51) Int. Cl.
*H04L 9/32* (2006.01)
*H04W 12/108* (2021.01)
(Continued)

(52) U.S. Cl.
CPC ........ *H04W 12/108* (2021.01); *G06F 21/645* (2013.01); *H04L 9/3213* (2013.01);
(Continued)

(58) Field of Classification Search
CPC ......... H04L 41/08; H04L 63/20; H04L 67/12; H04W 7/70
See application file for complete search history.

(56) References Cited

U.S. PATENT DOCUMENTS

| | | | |
|---|---|---|---|
| 10,425,414 B1 | 9/2019 | Buckingham et al. | |
| 2015/0067143 A1* | 3/2015 | Babakhan | H04L 63/1433 709/224 |

(Continued)

OTHER PUBLICATIONS

Boudguiga, et al., "Towards Better Availability and Accountability for IoT Updates by means of a Blockchain", IEEE European Symposium on Security and Privacy Workshops (EuroS&PM), pp. 50-58, (2017).

*Primary Examiner* — Ellen Tran
(74) *Attorney, Agent, or Firm* — THE MARBURY LAW GROUP, PLLC

(57) ABSTRACT

Method and Systems for configuring, monitoring, updating and validating Internet of Things (IoT) software code and configuration using blockchain smart contract technology. The use of smart contracts for delivering software code and or configuration scripts to IoT devices is an enhanced cybersecurity solution meant to ensure the security and integrity of IoT devices. The use of smart contracts is also shown how it can be used for verifying the integrity of the IoT devices software code and or configuration is a proactive method of cybersecurity. The proactive cybersecurity method will prevent man in the middle attacks as well as preventing rogue devices from impacting other IoT devices or networks.

21 Claims, 66 Drawing Sheets

Related U.S. Application Data

(60) Provisional application No. 62/684,489, filed on Jun. 13, 2018, provisional application No. 62/673,973, filed on May 20, 2018, provisional application No. 62/642,646, filed on Mar. 14, 2018.

(51) Int. Cl.
*H04L 9/40* (2022.01)
*H04L 67/12* (2022.01)
*H04L 41/08* (2022.01)
*G06F 21/64* (2013.01)
*H04W 12/082* (2021.01)
*H04L 9/00* (2022.01)

(52) U.S. Cl.
CPC .............. *H04L 41/08* (2013.01); *H04L 63/20* (2013.01); *H04L 67/12* (2013.01); *H04W 12/082* (2021.01); *H04L 9/50* (2022.05)

(56) References Cited

U.S. PATENT DOCUMENTS

| | | |
|---|---|---|
| 2016/0261685 A1 | 9/2016 | Chen et al. |
| 2017/0031676 A1 | 2/2017 | Cecchetti et al. |
| 2017/0091397 A1 | 3/2017 | Shah |
| 2017/0279774 A1 | 9/2017 | Booz et al. |
| 2018/0088928 A1 | 3/2018 | Smith et al. |
| 2018/0089641 A1* | 3/2018 | Chan ..................... G06Q 40/06 |
| 2018/0139278 A1 | 5/2018 | Bathen et al. |
| 2018/0176229 A1 | 6/2018 | Bathen et al. |

* cited by examiner

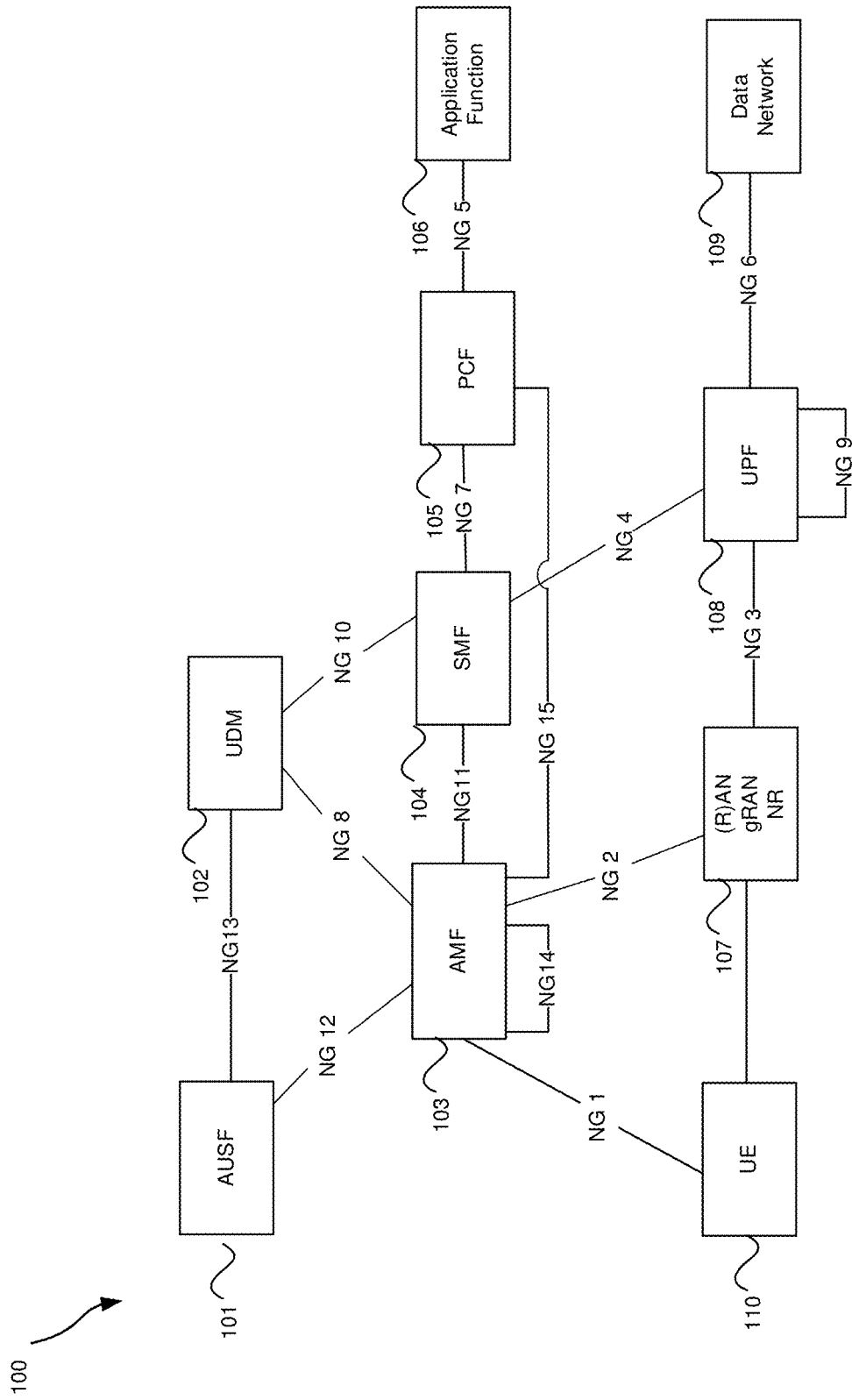

METHOD AND SYSTEM FOR IOT CODE AND CONFIGURATION USING SMART CONTRACTS

CROSS REFERENCE TO RELATED APPLICATION

This application is a continuation application of U.S. application Ser. No. 16/351,647, filed on Mar. 13, 2019, which claims the benefit of priority to U.S. Provisional Application No. 62/642,646, entitled "Method and System for Internet of Things (IoT) Fusion" filed Mar. 14, 2018, U.S. Provisional Application No. 62/673,973, entitled "Methods and Systems for IoT Blockchain Code and Configuration" filed May 20, 2018 and U.S. Provisional Application No. 62/684,489, entitled "Methods and Systems for Smart Contract Code and Configuration" filed Jun. 13, 2018 the entire contents of all of which are hereby incorporated by reference for all purposes.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention relates generally to a wireless communication system, and more particularly to methods and systems which provides enhanced security for Internet of Things (IoT) and other devices

BACKGROUND

The convergence of blockchain technology with Long Term Evolution (LTE), and Fifth Generation Wireless (5G) with IoT and cloud services fosters in a host of new services that were not possible before. Distributed architectures for providing services in a communication ecosystem is common to blockchain, LTE, 5G, IoT and cloud services. The convergence of these unique technologies facilitates a neutral host environment and network slicing that is extended to the enterprise and smart home environments.

Blockchain while initially known for cybercurrency provides many other key factors. Blockchain fosters a distributed ledger that is shared providing a history or rather record of all previous actions which is immutable due to the unique cryptographic security that blockchain uses. Blockchain also enables smart contracts which lead to machine to machine communication for delivering contracts.

LTE/5G networks deployed using Network Containers (NC) and or Network Function Virtualization (NFV) with Software Defined Networks (SDN) is a low latency flat distributed network. This (NC/NFV)/SDN network involves the integration of several cross-domain networks and the systems will be built to enable logical network slices across multiple domains and technologies to create tenant or service-specific networks The Internet of Things (IoT) is pervasive and more and more devices are being deployed for a vast amount of applications. IoT devices can be currently found in consumer applications, smart homes, enterprise, infrastructure management, industrial applications, military, agriculture, energy management, environmental monitoring, medical, transportation, food services, insurance, retail, city infrastructure, banking as well as in oil, gas and mining.

IoT covers a huge range of industries and use cases that scale from a single constrained device up to massive cross-platform deployments of embedded technologies and cloud systems connecting in real-time.

IoT is often considered the next great industrial revolution. Each of the before mentioned industries has unique applications of IoT, but the premise is a common theme: sensors and devices connected via machine-to-machine, or machine-to-infrastructure to monitor assets, collect data, analyze processes, and improve efficiency.

However, tying the diverse IoT ecosystem together which includes numerous legacy and emerging communication protocols that allow devices and servers to talk to each other in new, more interconnected ways is a daunting task.

At the same time, dozens of alliances and coalitions are forming in hopes of unifying the fractured and organic IoT landscape.

However, the IoT ecosystem has created artificial barriers either by design or because of the legacy platforms themselves.

Presently LTE/5G and IoT run on different cloud environments leading to unique policy security issues. This means that the IoT hub may need to segment the traffic streams or rather network elements.

LTE utilizes narrowband, Cat-NB1 (NB) or wideband Cat-M1 (CAT-M) as two access technologies supporting for IoT. However, there are other wireless access techniques using LTE and other wireless access protocols that support IoT devices and the use of NB and CAT-M is meant for illustrative proposes and not meant to limit this innovation to a specific wireless access technique.

The need to have low latency for device to device communication is becoming essential for IoT devices as well as smart vehicles and others. 5G access for IoT devices is still being defined with LTE (4G) having solutions which continue to evolve. Smart vehicles are currently using DSCR also known as 802.110p as well as LTE/5G to facilitate low latency device to device communication.

Presently there is a large focus on blockchain solutions, LTE/5G solutions, IoT solutions and cloud solutions. Some cross pollination between these four pillars are emerging. However, these four seemingly diverse technologies when brought together will enable the next communication system of the future as well as foster in new services and concepts which are not even imaginable right now when you also add location awareness.

LTE/5G and IoT devices leveraging blockchain coupled with cloud services provides a wholistic ecosystem which is the Internet of Things (IoT) ecosystem.

Security and especially cybersecurity have and continues to be a major concern not only in all aspects of telecommunications but of unique concern for IoT. The threat of a cybersecurity attack on IoT devices continues to serious concern for governments, industry and consumers. The currently method of detecting a cybersecurity attack is to utilizing monitoring for post intrusion detection. However, a more robust method is needed involving a proactive method whereby the cybersecurity breach and or intrusion attempt is stopped from the onset.

Blockchain technology utilizing smart contracts can be used to robustly secure IoT devices. The use of blockchain smart contract technology can involve both wired and wireless technologies that either communicate with a private, public or consortium blockchain.

Blockchain smart contract technology can be used to not only robustly secure IoT devices due to its immutability it can also be used to deliver or run software and or configuration files for IoT devices.

SUMMARY

Various embodiment systems and methods provide enhanced security for IoT devices The present invention is a method for improving the security of IoT devices through the use of blockchain technology

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

FIG. 1 B: This figure shows a generic 4G LTE network used in wireless telecommunications.

DETAILED DESCRIPTION

Figure 1B:
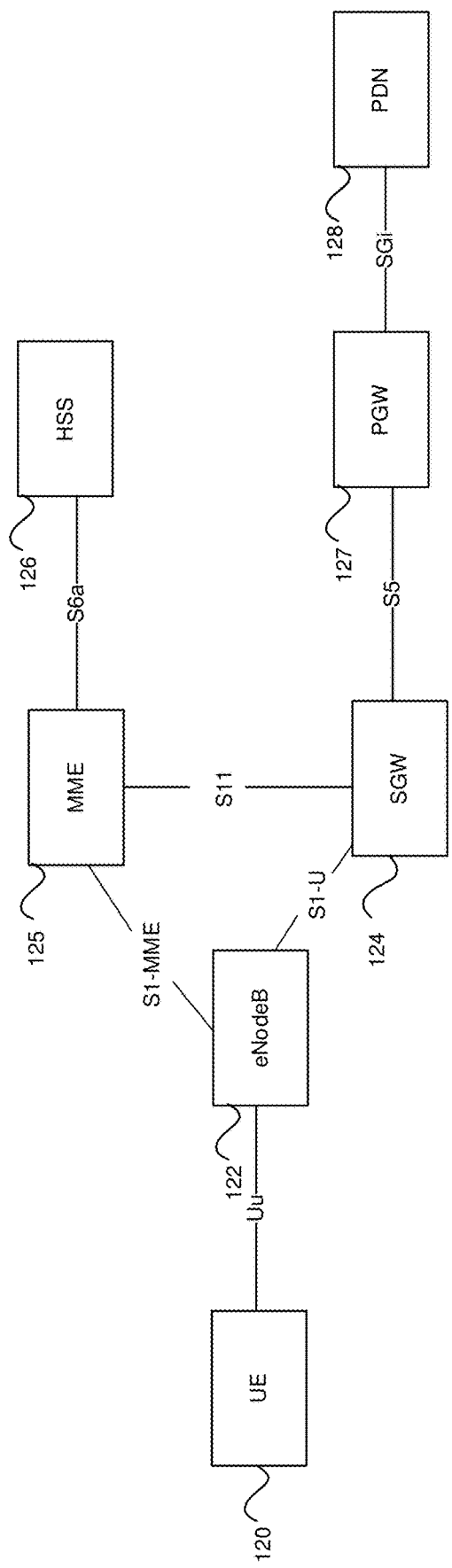
FIG. 1 A: This figure shows a generic 5G network used for wireless connectivity.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "IoT device", "IoT", "device" is used interchangeably herein to refer to any device that can be referred to as an Internet of Things. Additionally, the terms "IoT Hub", "IoT Gateway" are also used interchangeably and refer to a gateway that IoT devices and others connect either physically or via wireless. Also "mobile device," "cellular telephone," and "cell phone" are used interchangeably herein to refer to any one or all of cellular telephones, smartphones, personal data assistants (PDA's), laptop computers, tablet computers, ultra-books, palm-top computers, wireless electronic mail receivers, multimedia Internet enabled cellular telephones, wireless gaming controllers, and similar personal electronic devices which include a programmable processor, a memory and circuitry for sending and/or receiving wireless communication signals. While the various embodiments are particularly useful in mobile devices, such as cellular telephones, which have limited battery life, the embodiments are generally useful in any computing device that may be used to wirelessly communicate information.

The terms "wireless network", "network", "cellular System", "cell tower" and "radio access point", "internet", "local network" may use generically and interchangeably to refer to any one of various wired or wireless systems. In an embodiment, wireless network may be a radio access point (e.g., a cell tower), which provides the radio link to the mobile device so that the mobile device can communicate with the core network.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3 GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), Zigbee, Z-Wave, ZWave, SigFox, LoRa, Each of these technologies involves, for example, the transmission and reception of voice, data, signaling and/or content messages. It should be understood that any references to terminology and/or technical details related to an individual telecommunication standard or technology are for illustrative purposes only and are not intended to limit the scope of the claims to a particular communication system or technology unless specifically recited in the claim language.

The term blockchain may use generically and interchangeably to refer to any one of various blockchain technology types and or blockchain fabrics that utilize smart contracts. Smart contracts for blockchain can reside in Ethereum, Hyperledger or Quorum as some of the possible blockchain technology or technology fabrics with variants of these and other blockchains ecosystems continue to be created. Additionally, the term miner is generically used and can also refer to a validator or validating peer or some other consensus seeking entity utilizing blockchain technology. However, the use of blockchain and smart contacts is meant for illustrative purposes only and is not intended to limit the scope to a particular blockchain or cybersecurity technology unless specifically recited in the claim language.

Presently there are several seemingly diverse technologies which when brought together will create a system which is greater than the sum of its parts. The convergence of blockchain technology with LTE/(5G), IoT and cloud services fosters in a host of new services that were not possible before. The convergence of these unique technologies facilitates a neutral host environment and network slicing that is extended to the enterprise, industrial, smart home environments, utilities, homeland security and Department of Defense (DoD).

Presently there is a large focus on blockchain solutions, LTE/5G solutions, IoT solutions or cloud solutions. Cloud solutions include Blockchain technology as well as other database and software services. Some cross pollination between these four pillars are emerging. However, these four elements when brought together will enable the next communication system of the future as well as foster in new services and concepts which are not even imaginable right now when you also add location awareness.

The Internet of Things (IoT) has many market segments benefiting or adopting solutions utilizing different IoT infrastructure which include both wired and wireless access technologies. Regardless of the market segment IoT falls into one of three general categories: Government, Businesses, and Consumers.

LTE/5G and IoT devices leveraging blockchain coupled with cloud provides a wholistic ecosystem which is the Internet of Things (IoT) ecosystem.

Wireless Telecommunications continues to improve with the use of virtual networks. There are many types of virtual networks within wireless telecom including Containers and Virtual Machines (VM). Regarding containers used for wireless telecommunication there are several currently being utilized including Container Network Interface (CNI) and Container Networking Module (CNM). Virtual machines often come under the Open Network Function Virtualization (OPNFV)/(NFV). NFV or as it is also called Virtual Network Function (VNF) is meant to virtualize network services by abstracting them from dedicated hardware platforms and allow them to run on any platform utilizing OPNFV allowing for network operators to dynamically create or remove services based on demand. Containers are meant to offer services without unneeded functionalities that the services do not need. And software defined networking(s) (SDN) involves separating the control plane from the data plane a network. (SDN) has fostered in new dimension of distributed and flat network architectures which are vendor agnostic and facilitate new services due to the separation of the control and user planes. The term NFV and SDN is used generically and can refer to any type of Virtual Machine (VM) or software container.

However, the majority of the present-day telecommunication networks are populated with a large and variety of proprietary hardware appliances. Therefore, to launch a new network service, it often needs the introduction of yet another variety of proprietary hardware and or software solutions. The use of proprietary solutions to accommodate new services is becoming increasingly difficult on existing network operators and end users.

These constraints/limitations of hardware-based appliances (e.g. Routers, firewalls etc.) have led to think beyond traditional network system and thereby, resulting into development of various IT virtualization technologies, their standards & incorporation of the same into their networks. To accelerate progress towards this common goal, service provider's world-over came together to work it out with different standardization bodies such as the European Telecommunications Standards Institute (ETSI). The ETSI Industry Specification Group for Network Functions Virtualization (ETSI ISG NFV) is the lead group responsible for the development of requirements, architecture and other concerned issues for virtualization of various functions within telecommunication networks.

For example, the Network Function Virtualization (NFV) architecture is defined by the ETSI NFV ISG (document no. ETSI GS NFV 002) and consists of three principal elements:

1. NFV Infrastructure (NFVI)
2. Virtualized Network Functions (VNFs)
3. NFV Management and Orchestration (MANO) functions.

The NFV Infrastructure (NFVI) consists of physical networking, computing and storage resources that can be geographically distributed and exposed as a common networking/NFV infrastructure. It is the combination of both hardware and software resources which build up the environment in which VNFs are deployed, managed and executed. The NFVI can span across several locations i.e. places where NFVI Point of Presence (Pop)'s is operated. These locations typically utilize diverse locations that are geographically separated. The network providing connectivity between these locations is regarded to be part of the NFVI.

Virtualized Network Functions (VNFs) are software implementations or virtualization of network functions (NFs) that are deployed on virtual resources such as VM. Virtualized network functions, or VNFs, are responsible for handling specific network functions that run in one or more virtual machines on top of the hardware networking infrastructure, which can include routers, switches, servers, cloud computing systems and more. Individual virtualized network functions can be chained or combined together in a building block-style fashion to deliver full-scale networking communication services.

NFV Management and Orchestration (NFV MANO) functions provide the necessary tools for operating the virtualized infrastructure, managing the life cycle of the VNFs and orchestrating virtual infrastructure and network functions to compose value-added end-to-end network services. NFV MANO focuses on all virtualization specific management task necessary in the NFV framework.

This is facilitated by Software defined networks (SDN). SDN is a new architecture that will enable more agile and cost-effective networks. With SDN the wireless network is able to dynamically adapt to provide the connectivity services that best serve the application.

SDN allows the network to dynamically reconfigure itself by taking a new approach to the network architecture. In a traditional network device, like a router or switch, it contains both the control and data plane. The control plane determines the route that traffic will take through the network, while the data plane is the part of the network that actually carries the traffic.

Therefore, by separating the control and data plane enables the ability to have network equipment configured externally migrating it from a closed architecture to one that is open.

In addition, SDN also enables the centralization of the network management for different entities within a cellular network enabling network slicing.

SDN separates the network into three different layers—application, control and data.

Application Layer: This layer hosts the SDN applications and communicate with the SDN enabled controller with a standardized application programming interface (API), northbound interface which is open. This enables developers to write applications for configuring the network. The SDN applications can be network applications, cloud orchestration or business applications.

Control Layer: SDN decouples the control plane from the data plane. The SDN controller is located in control layer and translates the application layer requirements while controlling the SDN data paths. T Infrastructure Layer: This layer is referred to as the actual network hardware and is needed to implement the open standards-based programmatic access to infrastructure.

SDN however does not utilize blockchain technology. However, SDN can be configured based on smart contacts within the blockchain environment.

The NextGen network, often referred to as 5G, has a high-level architecture as shown in FIG. 1 A. While that of a 4G network is depicted in FIG. 1 B.

The NextGen architecture in FIG. 1A can be run in an Open NFV (OPNFV) environment, Open Container, or on a dedicated System on a Chip (SOC) device. The NextGen architecture however is very similar to the Enhanced Packet Core (EPC) FIG. 1B in that several platforms were split to facilitate the need to have separation between the control and user planes.

Referring to FIG. 1A the various blocks are defined by SDN as

Access and Mobility Function (AMF), provides UE-based authentication, authorization, mobility management, the AMF is independent of the access technologies Session Management Function (SMF) responsible for session management and allocates IP addresses to UEs. It also selects and controls the UPF for data transfer.

Policy Control Function (PCF), responsible for policy control in order to support Quality of Service (QoS)

Application Function (AF), which runs the applications

Authentication Server Function (AUSF) stores data for authentication of User Equipment (UE)

User Plane Function (UPF)

User Data Management (UDM) stores subscription data of UE

The data network as was the case in the LTE Enhanced Packet Core (EPC) has the Data network is not part of the architecture. The data network is meant to provides Internet access or operator services SDN networks whether operating on an OPNFV, Open Container or static network configuration can utilize smart contracts from blockchain resources to enable various services. For instance, a smart contract can be used to provide a neutral host environment enabling a subscriber or wholesale provider to use the radio resources either on a best effort approach or through network slicing as described in the smart contract.

Smart contracts can also be used to provide automated configurations where the network is dynamically changed in near real time meeting particular contract requirements.

Smart contracts can also be used to facilitate dynamic roaming or network selection either between operators, between assets or a particular radio spectrum that is allowed to be used. This can also be used by subscribers to determine their network of choice by utilizing smart contracts to select which operator to use and provide a method of payment or authentication for payment enabling their use of the network without having to utilize a third-party clearing organization.

Because smart contracts in a blockchain are immutable they can be used for a more effective way of delivering and verifying contracts which can also include the software code and or configuration of an IoT device.

Blockchain while initially known for cybercurrency actually provides many other key factors. Blockchain fosters a distributed ledger that is shared providing a history or rather record of all previous actions which is immutable due to the unique cryptographic security that blockchain uses. Blockchain also enables smart contracts which lead to machine to machine communication for delivering contracts.

Smart contracts can be used for contract facilitation, tracking items in a delivery process, providing a coordination between multiple vendors for delivery of a service. Smart contracts however can also be used to manage devices and provides a unique level of security preventing unwanted actors from disrupting those devices and their intended functions.

Blockchain as its name implies is a collection of blocks. These blocks have relevant pieces of information which can move cybercurrency or smart contracts or both. Smart contracts are also referred to as a transaction-based state. Smart contracts can be proof of work (PoW), proof of stake (PoS), utilize container technology.

Blockchain is a truly distributed architecture. However, blockchain can have several forks namely public, consortium and private depending on what the blockchain is attempting to service or be used for.

Public blockchains: a public blockchain is a blockchain that is public meaning anyone in the world can read, send transactions, and participate in the consensus process (mining). Public blockchains are secured by crypto economics which combines economic incentives with cryptographic verification using proof of work or proof of stake. Public blockchains are fully decentralized.

Consortium blockchains: a consortium blockchain is a blockchain where the mining process is controlled by nodes which have predefined relationships, like banks. The right to read the blockchain may be public, or restricted to the participants, and there are also hybrid routes such as the root hashes of the blocks being public together with an API that allows members of the public to make a limited number of queries and get back cryptographic proofs of some parts of the blockchain state. These blockchains may be considered "partially decentralized".

Private blockchains: a fully private blockchain is a blockchain where write permissions are kept centralized to one organization. Read permissions may be public or restricted to an arbitrary extent. Likely applications include database management, auditing, etc. internal to a single company, and so public readability may not be necessary in many cases at all, though in other cases public auditability is desired.

Blockchain while immutable due to the hashing keys employed also needs a lot a processing power at all the nodes in the network. Depending on the blockchain utilized all the nodes have a complete record of the current blockchain.

What is important is that the blockchain has all the blocks that have been attached since the genesis, start, of the particular blockchain. As part of the blockchain process every node has the same information as other nodes which makes it secure and resilient. However, it also means that any node that participates in the block chain has to dedicate CPU and memory resources to read the block header and store the entire blockchain regardless of whether it is a minor or not.

Contained systems wishing to utilize blockchain technology for security and delivering services through smart contracts may not have the needed processing power, memory or connection bandwidth needed.

The Internet of Things (IoT) has many market segments benefiting or adopting solutions utilizing IoT infrastructure. Regardless of the market segment IoT falls into one of three general categories: Government, Businesses, and Consumers.

The Internet of Things (IoT) is pervasive and more and more devices are being deployed for a vast amount of applications. IoT devices can be currently found in consumer applications, smart homes, enterprise, infrastructure management, industrial applications, military, agriculture, energy management, environmental monitoring, medical, transportation, food services, insurance, retail, city infrastructure, banking as well as in oil, gas and mining.

IoT is often considered the next great industrial revolution. Each of the before mentioned industries has unique applications of IoT, but the premise is a common theme: sensors and devices connected via machine-to-machine, or machine-to-infrastructure to monitor assets, collect data, analyze processes, and improve efficiency. However, the present IoT ecosystem has created artificial barriers either by design or because of the legacy platforms themselves.

Currently the IoT ecosystem includes device platforms, operating systems, device provisioning and management is immature. The IoT ecosystem largely comprises of proprietary solutions that are being promoted as open source as long as you use only devices that are of a particular vendor.

All IoT devices are embedded with electronics, software, and sensors. IoT devices generate, process, and exchange vast amounts information either between themselves or with some centralized processor. The information can be sent in real time, sent in defined time intervals, or sent when there is either enough data to warrant being sent.

The IoT industry or rather ecosystem presently is immature in that there are there are a vast amount of different IoT devices which are not compatible with each other. There are a multitude of device architectures which operate using proprietary software, have unique architectures and management systems. In addition, the connectivity methods used for IoT devices is vast each having their own advantages and disadvantages. The present solution is to either utilize one vendor's product exclusively or operate separate apps for each device.

IoT will encompass different types of connectivity, and the access needed will depend on the nature of the applications.

Wireless connectivity for IoT typically operate in unlicensed spectrum which are designed for short-range connectivity. However, they tend to have limited Quality of Service (QoS) and security requirements IoT connectivity is rather diverse and is divided into short-range and wide-area segments.

The short-range segment primarily consists of devices connected either physically or by unlicensed radio technologies, with a typical range of up to 100 meters, such as WiFi, Bluetooth, Zwave, and ZigBee and also includes devices connected over fixed-line local area networks like cable, DSL, fiber and powerline technologies. The wide-area segment consists of devices using cellular connections, as well as unlicensed low-power technologies, such as Sigfox, LoRa (Long Range) and Packet Reservation Multiple Access (PRMA). GSM/GPRS is currently the dominant technology in this segment. However, LTE CatM as well as LTE NB will likely replace or become the dominant mobile wireless transport technology for IoT devices utilizing both licensed and unlicensed frequency bands for the near term until the 5G ecosystem has been built out. The use of LTE NB or CatM is meant for illustrative purposes and not meant to limit the scope of this innovation unless specifically called out in the claims.

There is a plethora of connectivity options that foster the fragmentation of IoT.
1. Cellular (2G/3G/4G and the impending 5G)
2. GPRS, EVDO, CATM, CATM1, NB, LTE
3. WiFi (bg, a/bg/ac, p etc.)
4. Fixed Broadband (cable, DSL, Fiber, pots)
5. Satellite technologies
6. Low Power Wide Area (LPWA)
7. Unlicensed—SigFox, LoRa, ZigBee, Zwave, Bluetooth (BT), Bluetooth low energy (BLE)
8. Licensed and unlicensed—LTE NB and LTE CatM
9. Other access media Besides the different access methods used for IoT devices the operating systems have some unique characteristics due to the nature of the devices. The device operating systems protocol stack can either defined as constrained or unconstrained.

Figure 2:
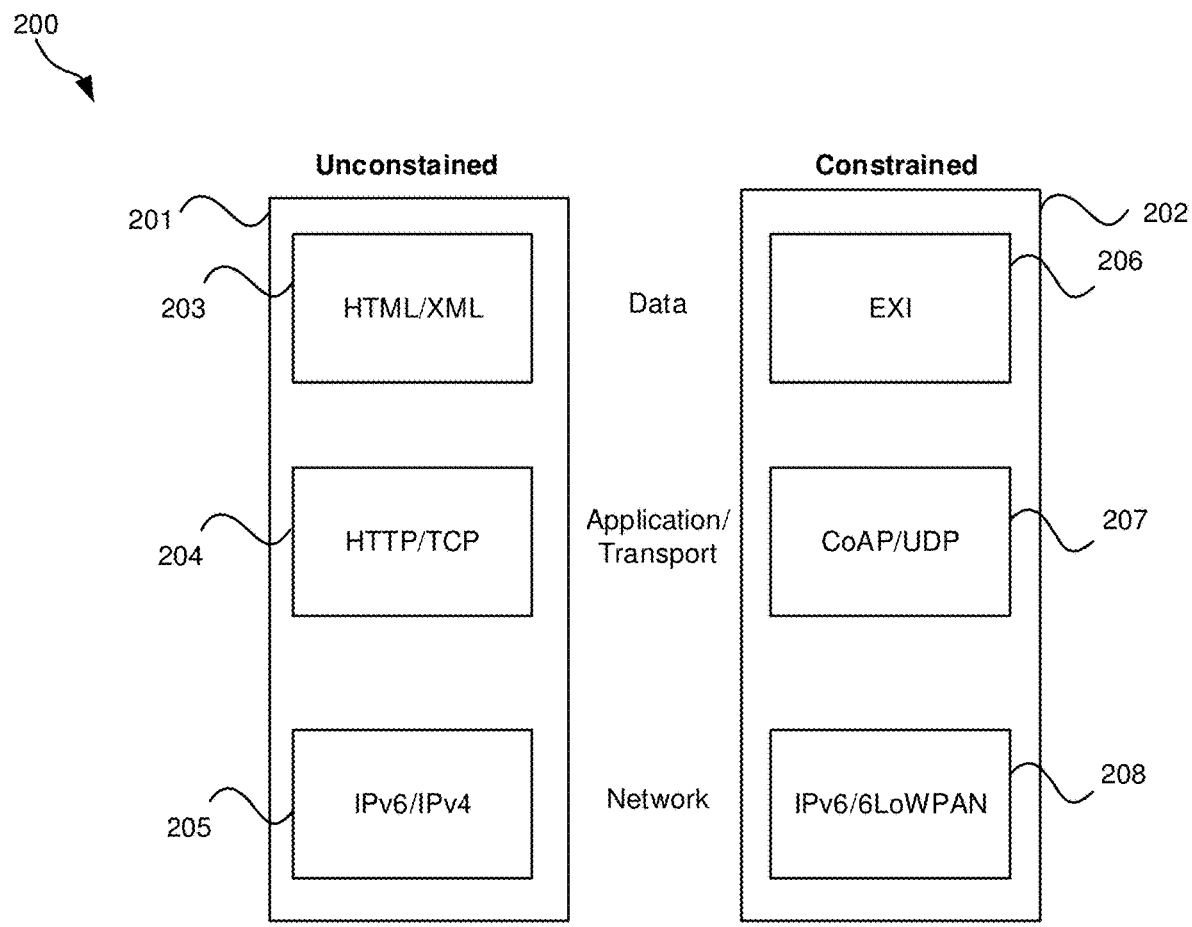
FIG. 2: This figure shows a high-level protocol difference between an IoT unconstrained and IoT constrained devices.

FIG. 2 illustrates the different protocol stacks that are needed for IoT devices comparing differences between constrained and unconstrained devices, 201. The unconstrained IoT device consists of the protocols that are currently the de-facto standards for Internet communications, and are commonly used by regular Internet hosts, such as HTML/XML 203, HTTP/TCP 204, and IPv6/IPv4 205. Much of modern data communication utilizes internet protocols.

However, the constrained protocol stack is more common to IoT devices due to the low-complexity primarily because of CPU and memory limitations for single purpose functions.
1. Efficient XML Interchange (EXI) 206
2. Constrained Application Protocol (CoAP)/UDP 207
3. IPv6/6 LoWPAN 208

The transcoding operations between the protocols can be performed in a standard and low complexity manner, thus guaranteeing easy access and interoperability of the IoT nodes with the Internet.

The overall CPU and memory constraints of many IoT devices limits their ability to fully participate in a blockchain environment.

FIG. 2 depicts an example of the differences between a constrained 201 and unconstrained 202 IoT device protocol stack. The protocol stack shown in FIG. 2 is an example of a protocol stack for illustration purposes.

In FIG. 2 one the reasons for difference in protocol stacks between unconstrained and constrained IoT devices is due to differences in overall capability typically due to CPU type, memory or power consumption to mention some common elements.

To help explain the reason why many IoT devices utilized a constrained protocol a little explanation is provide.

In many IoT devices the size of Extensible Markup Language (XML) or HTML 203 messages are often too large due to their limited capacity. In addition, using HTML/XML necessitates the parsing of messages which is more complex as compared to the use of a binary format which is why EXI 206 format is used so it can be compatible with HTML/XML.

EXI however has two types of encoding, schema-less and schema-informed. While the schema-less encoding is generated directly from the HTML/XML data and can be decoded by any EXI entity without any prior knowledge about the data, the schema-informed encoding assumes that the two EXI processors share an HTML/XML Schema before actual encoding and decoding can take place.

Using an EXI shared schema makes it possible to assign numeric identifiers to the HTML/XML tags in the schema. However, with EXI schema-informed the IoT processor can have the EXI schema informed can be integrated into constrained devices thus enabling them to use EXI formats.

Using schema-informed EXI makes it possible to build multipurpose IoT nodes with constrained devices but this needs more integration with HTML/XML.

The integration of multiple XML/EXI data sources into an IoT system can be obtained by using the databases typically created and maintained by high-level applications facilitating full internetworking of the two protocol stacks.

Regarding the Application and Transport layers the internet and cloud services utilize HTTP over TCP (204). However, HTTP over TCP is not viable for constrained devices and TCP may not scale the best for contained devices because of the small data packets sent.

CoAP (207) however overcomes these difficulties using a binary format transported via UDP. CoAP uses ReST making it interoperable with HTTP. The interoperability between CoAP and HTTP is done through an intermediary which is a proxy that translates requests/responses between the two protocols Regarding the network lay for IoT IPv4 (205) is the leading addressing technology supported by Internet hosts. IPv6 standard which provides a 128-bit address field makes it possible to assign a unique IPv6 address to any possible node in the IoT network.

However, for IoT IPv6 introduces additional overhead that is not compatible with constrained nodes. This constraint is overcome by 6LoWPAN (208) which is an established compression format for IPv6 and UDP headers over low-power constrained networks.

The use of 6LoWPAN typically needs a border router, which is a device directly attached to the 6LoWPAN network and performs the conversion between IPv6 and 6LoW-PAN.

While the deployment of a 6LoWPAN border router enables transparent interaction between IoT nodes and any IPv6 host in the Internet, the interaction with IPv4-only hosts remains an issue.

An example of the interaction includes v4/v6 Port Address Translation (v4/v6 PAT) where the application of this technique needs low complexity and, indeed, port mapping is an established technique for v4/v6 transition. The use of PAT has a scalability problem because the number of IPv6 hosts that can be multiplexed into a single IPv4 address is limited by the number of available TCP/UDP ports (65535). However, for smart small offices and homes this constraint is not seen as a limiting factor.

v4/v6 Domain Name Conversion which is similar to the virtual hosting service in HTTP 1.1, which makes it possible to support multiple websites on the same web server, sharing the same IPv4 address. DNS provisioning would be needed as well so an IPv4 address using a Http-CoAP proxy to communicate with the IoT device.

URI mapping involves a reverse cross proxy for HTTP-CoAP. This proxy behaves as being the final web server to the HTTP/IPv4 client and as the original client to the CoAP/IPv6 web server. Since this machine needs to be placed in a part of the network where IPv6 connectivity is present to allow direct access to the final IoT nodes, IPv4/IPv6 conversion is internally resolved by the applied URI mapping function.

Therefore, the link layer technologies for an IoT device and or system utilize either unconstrained and constrained technologies. With IoT there is a need to support a wide geographical area and at the same time handle a large amount of traffic resulting from the aggregation of voluminous amounts of smaller data flows.

The unconstrained link group includes all the traditional LAN, MAN, and WAN communication technologies, such as Ethernet, WiFi, fiber optic, cable, DSL, broadband Power Line Communication (PLC), and cellular technologies such as GSM, UMTS and LTE. They are generally characterized by high reliability, low latency, and high transfer rates (order of Mbit/s or higher), and due to their inherent complexity and energy consumption are generally not typically suitable for peripheral IoT nodes. Except LTE CATM/NB and new advances in WiFi devices which enable power saving policies.

The constrained physical and link layer technologies are characterized by low energy consumption and relatively low transfer rates, typically smaller than 1 Mbit/s. The more prominent solutions in this category are IEEE 802.15.4, Bluetooth (BT) and Bluetooth Low Energy (BLE), IEEE 802.11 Low Power, PLC, NFC and RFID. These constrained links usually exhibit long latencies, mainly due to two factors: (1) the intrinsically low transmission rate at the physical layer and (2) the power-saving policies implemented by the nodes to save energy, which usually involve duty cycling with short active periods to extend their life.

IoT Devices can best be classified or rather groups based on their location within the IoT ecosystem which include Backend (backend server), Gateways, terminals, and sensors.

It is important to note that IoT nodes do not necessarily need a gateway or backend server (cloud) to function. Some IoT nodes function autonomously and do not need or share data with other devices, they can simply turn on a local annunciator or light to indicate status or display the temperature.

Regarding IoT Devices the Backend Servers can either be dedicated servers or cloud-based platforms. These are typically located in some form of a control center where IoT enabled data is collected, stored, and processed to produce added-value services.

Backend servers are unconstrained and are meant to facilitate the IoT data feeders like.

Database management systems (DMS): The DMS oversees storing the large amount of information produced by IoT peripheral nodes, such as sensors.

Web sites: The use of web interfaces facilitates the interaction between the IoT devices and systems and the data consumers.

Enterprise resource planning systems (ERP): ERP components support a variety of business functions. Interfacing various ERP components with database management systems which collect the data generated by the IoT devices enables the management of the massive amount of data gathered.

As well as other functions.

Gateways in the IoT ecosystem are meant to interconnect end/edge devices to other upstream communication infrastructure. Gateways are needed to provide protocol translation and functional mapping between the edge devices which are constrained and upstream unconstrained devices. Gateways can also be used to manage the plethora of data coming from IoT devices. The Gateways can be used to provide local policy and improve latency. A gateway can be either constrained or unconstrained.

The IoT devices like terminals and sensors are those which produce the necessary data and can perform programmed tasks. IoT devices like sensors or single purpose devices due the cost constraints are typically constrained devices. These IoT devices can be classified based on a wide number of functions however they typically sensors or actuators. The unconstrained IoT devices are laptops, tablets, smart phones and other higher computing power devices that not only interact with the IoT devices but can also be an IoT device itself.

Presently there are many technical hurdles as well as general perception, real or not, that using IoT devices will result in less control. Below is a summary of the primary barriers to IoT adoption.

a) Device Management IoT devices are not a set and forget nor purely plug and play. Each device needs some provisioning which necessitates the need to manually configure it. However, despite the advances in low power consumption enabling devices to live for years on the internet they still need some form of monitoring, updates of software and firmware, physical maintenance, and diagnostic reports. IoT introduces a new scale of device management; management platforms must be able to monitor thousands and maybe millions of devices. The need to minimize provisioning as well as scale linearly is needed.

b) Device Platform: The processors used by IoT devices will remain fractured due to the varied use cases the device must satisfy. At the heart of the device platform is the processor along with the operating system (OS) and the device Input/output (IO) capabilities. The processors need to support strong security and encryption, networking, and other capabilities. Many systems on a chip (SOC) are the predominant platform type and there is no common device platform that has emerged. Because many IoT devices are placed in locations which may not provide local power and rely on a battery as its power source. Regardless of the source of powering the device the platforms capabilities must be factored against power consumption and cost, as well as complexity of maintenance and upgrading. The operating system also has to be powerful but not consume much power. Operating systems like Windows and MacOS were not built for IoT as they consume far too much power and have too large a footprint to be installed. Linux is a better OS for IoT devices however current IoT devices have proprietary implementations of Linux due to the uniqueness of the device platform itself. IoT devices need one general OS which is an Open Standard without licensing fees. The IO capability of device itself has a direct impact on how the platform interacts with other IoT devices, sensors and connectivity. However, without a standard, there will be many differing solutions resulting in the proliferation of solutions including proprietary solutions.

c) Connectivity: The vast majority of IoT devices utilize some form of wireless technology to enable its connectivity. However, IoT devices can also have hardwired connections. There are a plethora of wireless connectivity methods and some IoT devices and hubs utilize more than one method for obtaining connectivity with other devices and the cloud. Selecting a wireless network for IoT devices means finding a balance of range, battery life, bandwidth, and cost. As there are multiple options for wireless communications, from low-power short range networks to LTE-CatM the end-to-end communication for IoT devices will likely not be over one network or protocol. Therefore, IoT solutions will need to support multiple forms of wireless communication. However, once the device is delivered to the end point if a change in wireless communication is needed and it was not installed on the device initially either an expensive truck roll is needed to upgrade the device, or the device needs to be replaced. There is a need to have the IoT devices adapt to the current and future radio environments increasing their functionality and longevity to the ever changing IoT environment.

d) Analytics: IoT devices by themselves are capable of delivering vast volumes of data if not culled properly at the source and the destination. Existing analytic methods and algorithms may not be able to absorb the quantity of data, or not be able to process the data fast enough. IoT demands new analytical approaches combined with big data storage to process the flow of information. The approach needed is a distributed approach for data analytics.

e) Cloud Networking and Big Data Storage: For processing large amounts of data IoT could not exist on a large scale without cloud computing. Scalable solutions are needed to house the massive amount of data IoT devices are reporting. But again, securing the data is a major concern. Cloud systems facilitate scaling with ever-growing IoT environments, but the cloud infrastructure itself must be robust, secure, and powerful enough to run those new analytic algorithms, while also being distributed. Deriving a proper cloud solution for any given IoT application is critical and non-trivial. However, there are various cloud types that exist which are not directly compatible with each other leading to IoT devices once deployed being locked into a specific cloud environment which may be limit its overall functionality and usability in the future.

f) Security: IoT devices connecting to the internet pose a security risk. The data being sent however can include information of security and safety critical data as well as privacy-sensitive information, and hence are appealing targets. Their platforms, operating systems, and data they communicate all have to be guarded against malicious attacks. Attacks can come in the form of data hacking/manipulation, device tampering, and network overloading. Simple IoT devices with a basic operating system utilizing minimalized hardware may not be able to support a complex security model. In addition, security models are fragmented and involve multiple vendors, making end-to-end security models difficult. A more robust security scheme needs to be implemented in IoT.

So far IoT has already made many positive impacts in industry and society and offers many promising ideas in the future. For instance, things that are accomplished with connected devices these days were inconceivable a few years back like autonomous or driver assisted vehicles.

However, as these advances and improvements continue new devices that say make our homes smarter also are making them more vulnerable to unwanted events like cyber-attacks, malicious activities, unwanted eavesdropping, and metadata collection on individuals and companies that can be exploited for good and bad.

In response to the growing number of IoT devices in homes, businesses, and governments' and the potential attack vectors they introduce, technology firms are offering new smart solutions that make up for the shortcomings of individual devices by creating a shell around an IoT ecosystem and controlling the interactions with and between the IoT devices in a centralized way.

The proliferation of IoT devices has fostered the big data phenomena where the mining of mega data is being promoted as essential for any business. However, having all the is data made available for third parties is not necessarily a good thing.

Any IoT enabled device regardless of what its function is meant to be collects, sends and or receives telemetry. It is essential from the onset that it is understood by all relevant parties involved what is the telemetry, data, that the IoT device will collect, send and receive. In particular what needs to be understood is how the device manufacturer plans to protect the IoT device and its data from being compromised and or how it is going to be used. The voracious volume of data that these devices generate can lead to cyber criminals stealing it and hold it hostage for ransom or use it to run subsequent schemes, such as identity theft.

However, relying on the manufacturer to provide the protection since they are also potentially collecting and using the data for their own purposes has many reservations and is not practical from a security perspective. It is not practical due to the company and or manufacturers desire to monetize metadata and the low cost of the IoT devices makes following more stringent security tampering requirements not cost effective because the price can easily make the IoT devices unattractive.

The other issue about security being embedded on the devices is manufacturing copy cats which have spread in many sections of the electronics industry. Stenciling and other markings make the device appear it is legitimate however it can be a rogue device that has other purposes.

Therefore, in order to improve security and privacy it will be necessary to:
1. Always use encrypted networks to connect IoT devices (intranet and internet).
2. Segment and firewall IoT devices from the rest of your network.
3. Perform data backups regularly.
4. Perform all recommended software updates.
5. Use strong and complex passwords, For example, your smart toaster might not be critical to your security and privacy however its vulnerabilities can be used as a bridgehead to take over other devices in your home or small office.

Figure 3:
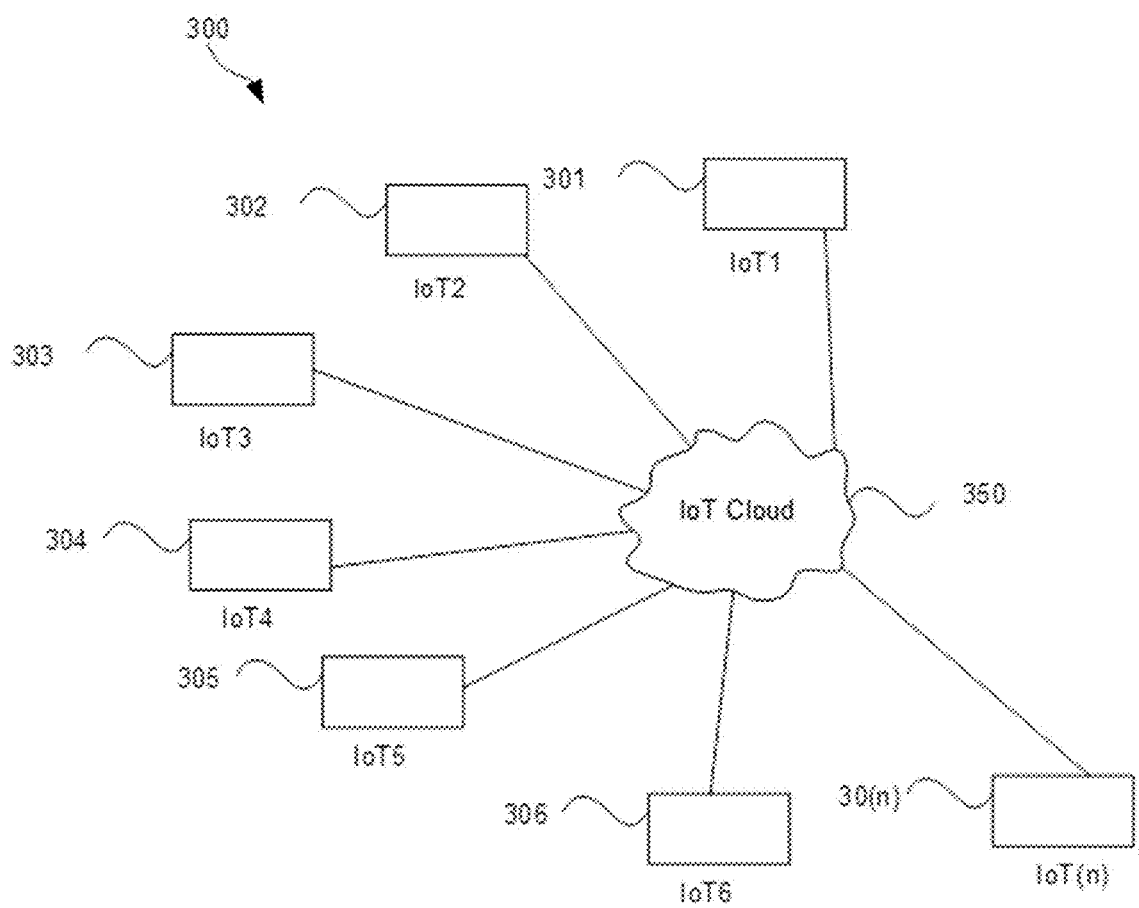
FIG. 3: This figure shows multiple IoT devices connected to an IoT cloud.

FIG. 3 illustrates a typical scenario 300 where various IoT devices are connected to a cloud environment. The IoT devices could be connected via wired or wireless and the devices could be all in close proximity, geographically, or dispersed. Each IoT device 301 through 306 including 306(n) is communicating with the cloud 350.

Figure 4:
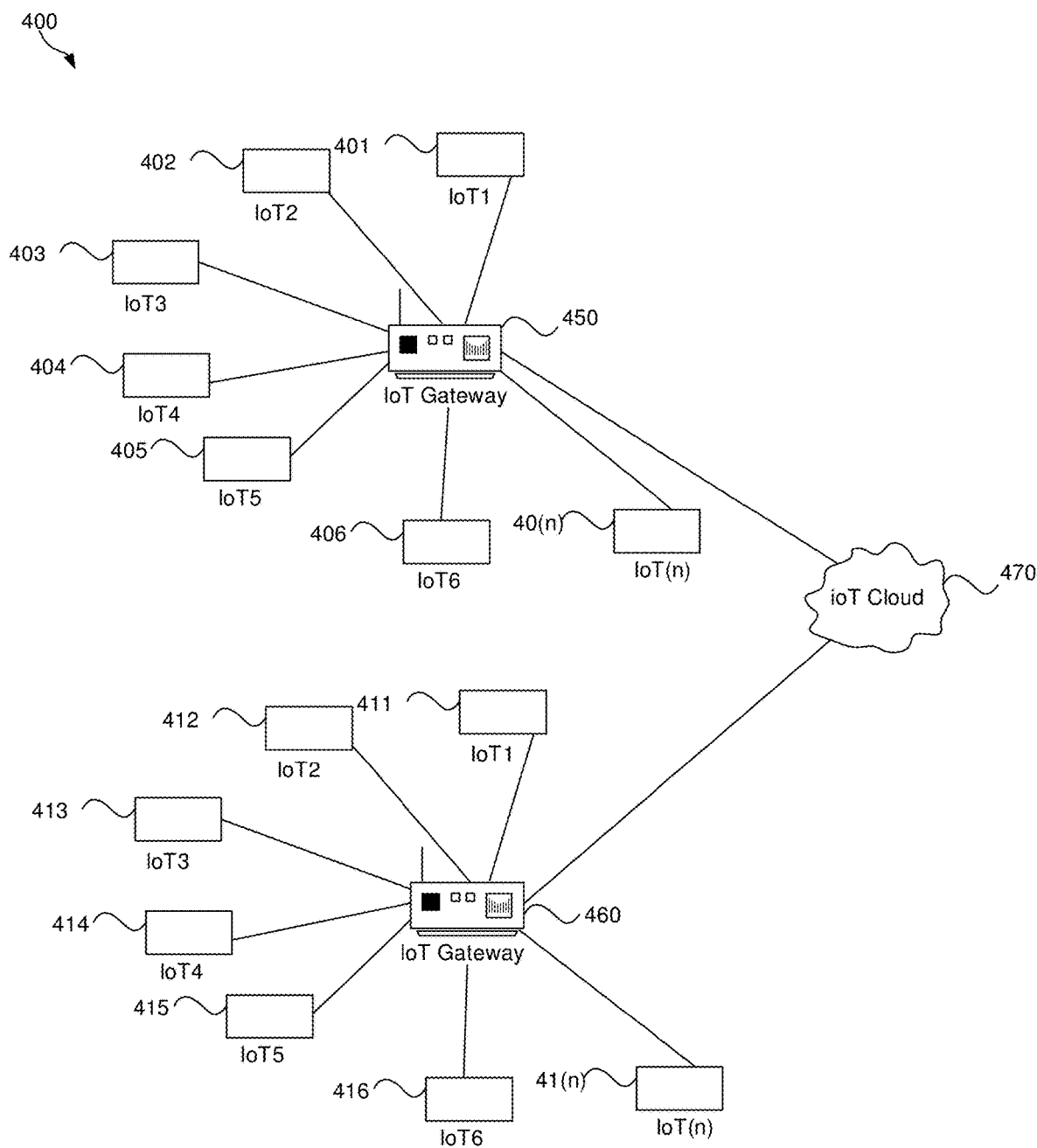
FIG. 4: This figure shows several IoT hub/gateways having multiple IoT devices connected to a cloud, fog or mist network.

FIG. 4 is illustrating where the IoT devices, 401 thru 406 are grouped or rather associated with an IoT hub/gateway 450 which can also be called an IoT concentrator. Also, IoT devices 411 thru 416 are grouped or rather associated with an IoT hub/gateway 460. The IoT hubs 450 and 460 are located between the various grouped IoT devices and cloud 470. The IoT hubs function is to provide security and rules. The IoT hub with the IoT devices forms a local grid sometimes referred to as a fog network however this can also be a mist network as well.

Figure 5:
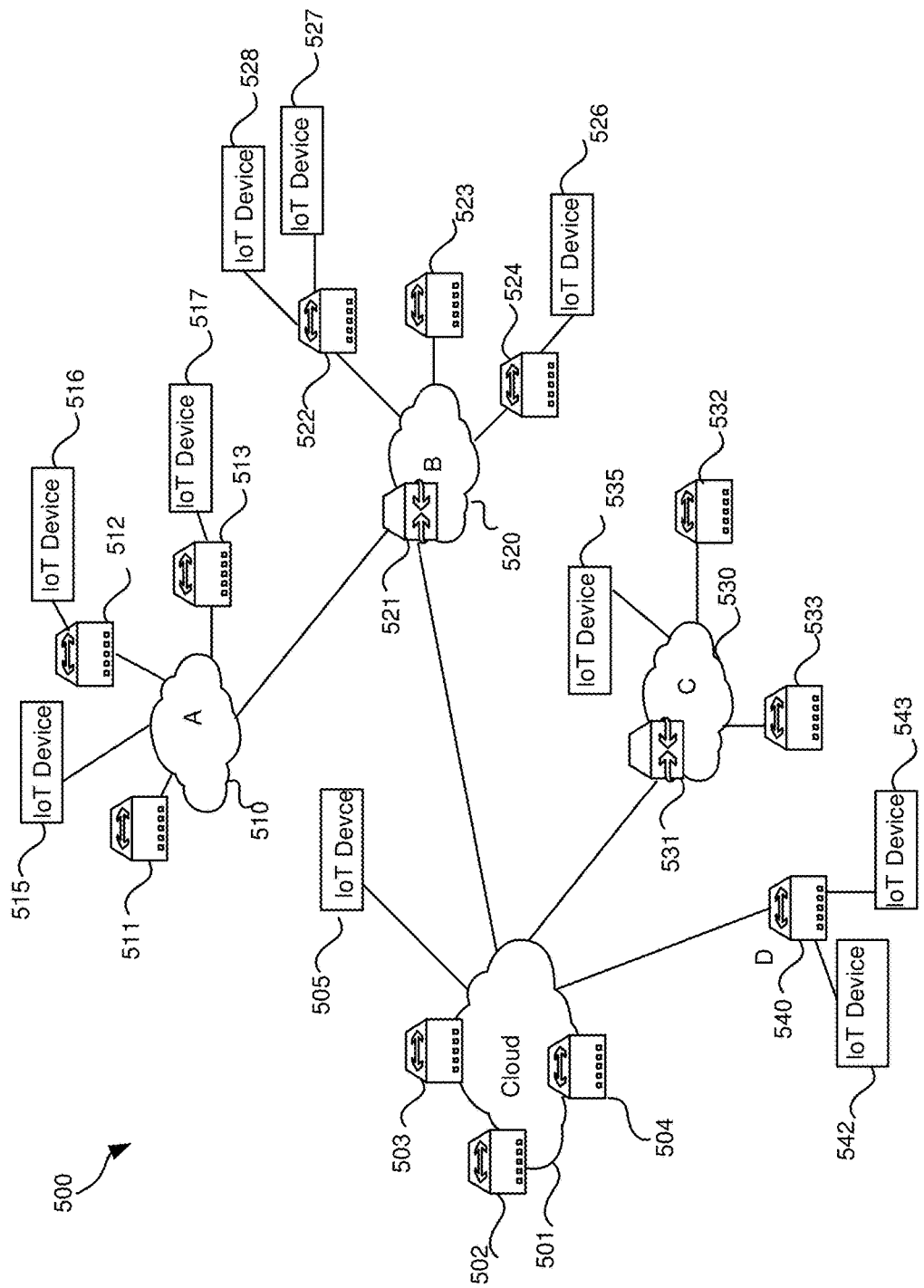
FIG. 5: This figure shows several IoT hub/gateways having multiple cloud, fog or mist networks all linked together.

FIG. 5 is a further refinement of the architecture where 500 you have several small networks grouped together and then linked to the main cloud 501 which can be a cloud, fog or mist network. FIG. 5 has several intermediary clouds 510, 520 and 530 with various IoT hubs. The cloud networks shown in 510, 520 and 530 can be cloud, fog or mist networks. For example, with cloud B 520 is connected to cloud A 510 through means of an intermediary hub or router 521. With cloud B there are several IoT hubs depicted 522, 523 and 524 that are connected to it. IoT Hub 522 for example has several edge devices 527 and 528 connected to it. It is also possible to have an IoT hub 540 with its associated edge devices 542 and 543 directly connected to the main cloud 501.

Figure 6:
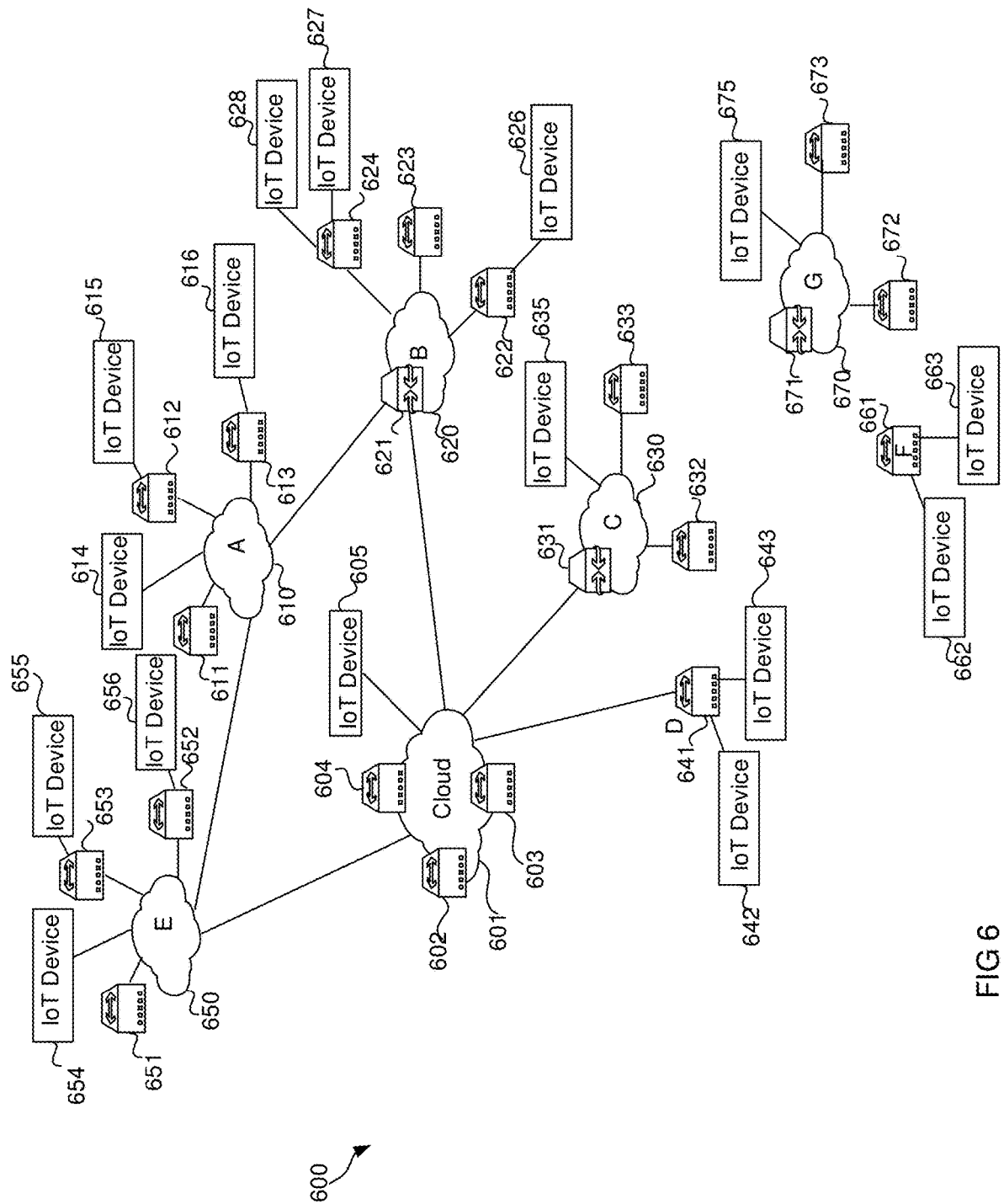
FIG. 6: This figure shows several IoT hub/gateways in a multiple cloud, fog or mist network that have been forked for some reason and are no longer part of the collective network connectivity.

FIG. 6 illustrates that situation 600 where an IoT Hub 661 or small network cloud 670 is separated from the rest of the network either on purpose or by circumstance. FIG. 6 while similar to that of FIG. 5 illustrates the potential for forked clouds within an IoT ecosystem. With the forked scenario the reliance on the use of a main cloud 601 to have the IoT, edge devices, as well as the IoT Hub protected needs local control at the IoT hub level in order to ensure security within the forked ecosystem.

The reason for the architecture depictions in FIG. 3 through FIG. 6 is to illustrate the various perturbations that either exist or could exist which constitutes an IoT ecosystem related. The architecture depictions shown in FIG. 3 through FIG. 6 are used for illustrative purposes and there are many other perturbations possible.

The IoT hub also needs to be location aware because depending on the functions needed for the IoT solution or solutions there may be hundreds or even thousands of locations where the solution is deployed. Location awareness enables the IoT hub to facilitate the management of the devices, updating software, apply new security settings, and manage the devices communication requirements as some examples.

The Cloud as it become to be known is essentially a group of Network Remote servers which should be deployed in a distributed architecture. The cloud can also be a combination of smaller clouds like a fog or mist or be a combination of several larger clouds. However, there are numerous types of clouds ranging from those favoring IT deployments like AWS and Azure to ones which are meant for telecommunications infrastructure like OPNFV and Opencontainer and coupled with SDN for supporting LTE, 5G and the wireless technology generations that are to follow. Blockchain technology utilizes IT clouds for some capabilities and can be considered a cloud by the fact of its distributed nature and smart contracts.

The cloud and its many manifestations have numerous advantages from a cost, operations, resiliency, as well as function point of view. However, for IoT itself the cloud has some hurdles to overcome with respect to wireless involving latency and security.

The IoT Hub overcomes many cloud limitations including latency, limited bandwidth, data protection and need to internet connectivity by fostering edge computing. The IoT Hub can also be used with blockchain for security as well as smart contacts. Not only can the IoT Hub support blockchain technology and facilitate edge computing it also can support numerous radio access technologies on it.

For instance, the IoT Hub can operate as a private LTE/5G network utilizing unlicensed or even licensed frequencies with a local core network that can link to another core network to obtain the necessary credentials of wireless devices which are not part of the home network. This local LTE/5G network can be used in a distributed SDN architecture as part of the pool of resources or as a standalone network.

The IoT devices that utilize the IoT hub whether they are constrained or unconstrained can be both physical and virtual where the virtual IoT devices reside in a cloud environment or are associated with another IoT Hub. The IoT devices can be described as universal customer premise equipment (uCPE) which includes both virtual customer premise equipment (vCPE) and physical CPE.

Therefore, the IoT Hub can also be thought of as a communication hub where constrained and unconstrained devices are brought together in one device. In essence the IoT Hub can extend diverse cloud services to the edge of the network by providing application and security management to the edge.

The IoT hub is an Edge Cloud (EC). There is no common definition of what the Edge is or how close it has to be to the end device.

Protecting data from being incorrectly sent, used or changed by unwanted parties is paramount of the IoT ecosystem. Data protection is essential since personal Information either residing directly in an IoT device or indirectly because it is associated with a person or location is needed to be protected.

To enhance security with IoT devices that lack the processor power the IoT Hub will act as a gateway for a trusted environment for those IoT devices which need added security. Some of the security enhancements with the trusted environment involves slicing the local fog cloud so security sensitive applications are protected.

With the IoT hub running a secure subnetwork that can include the local miner which provides the trust (managed keys) and authorizes the applications which can run in a device. The minor can also be located in a cloud service which can be used to run the IoT hub, back it up and also in case of distributed hubs provide common policies.

The security relevant information for any device needs to be verified prior to the device being placed into the trusted environment. For example, some of the relevant information can be the type of trusted environment that the IoT device needs to operate within, the current firmware, and verification that the application is correct for the IoT device as well. Also, the IoT device need to verify that the IoT Hub and what is being allowed is correct, however this is only possibly with IoT devices that have the requisite processing power.

The IoT Hub also controls the duration and potential payload of the IoT device in the trusted networks.

An example of a trusted network managed by the IoT Hub could be remote patient monitoring where the device attached to the patient can also be reconfigured.

However, security does not equate to privacy. Therefore, to overcome this the IoT Hub will incorporate a Privacy by Design (PbD) design which has some of the following key attributes. (1) Proactive not reactive, (2) Privacy by Default settings, (3) Privacy embedded into design, (4) Full functionality, positive-sum not zero-sum, (5) End to End security, (6) Visibility and Transparency (open), (7) Respect for user privacy (user-centric), (8) other attributes.

Blockchain technology can be used to protect the IoT device from cybersecurity and other threats that could comprise the device. Blockchain utilizing smart contracts has numerous security advantages for protecting an IoT device. However, blockchain in its current envisioned form is ill suited to support IoT applications either in an Intranet or when utilizing a cloud due to some of the following reasons.
1. Block chain message size grows resulting in the bandwidth of the connection, intranet or internet is consumed by the blockchain message size
2. IoT involves voluminous small messages, i.e. temperature sensors, and every message does not need to be immutable
3. Most IoT devices are constrained and do not have the processor or memory capacity to support native block chain messages
4. Time necessary to process the blockchain Instead a streamlined or light client protocol is needed to allow users in low-capacity environments (embedded smart property environments, smartphones, browser extensions, some desktops, etc.) to maintain a high-security assurance in a block chain environment.

However proper security is paramount and blockchains immutability makes it ideal for preventing man in the middle attacks or any cyber security breach.

Whether a Merkle tree, Patricia Merkle tree, or some other variant is used each node of the tree is the hash of its children. And in blockchain each key/value pair corresponds to a unique root hash, and only a small subset of nodes is needed to prove that a key/value combination is in the tree corresponding to a particular root hash.

The Merkle proof and its derivatives scale linearly however the complexity increases logarithmically in relation to the quantity of the data stores for smart contracts or any other items.

Therefore, having every IoT device in a local network say within a small office or smart home maintain a copy of the entire blockchain is cumbersome as well as resource in efficient in that the small light weight devices which were meant to be cheap and minimal purpose devices now have to perform higher level functions to support being in the blockchain.

Before the device participating in the blockchain communication either fully, partly or not at all it needs to first connect to the network. In the following examples put forth the device will communicate with a local hub however the process is the same if the device reaches out the blockchain cloud directly instead of going to a gateway. The blockchain can be a public, private or consortium type and in some instances the block chain can be forked so it becomes its own branch.

Figure 7:
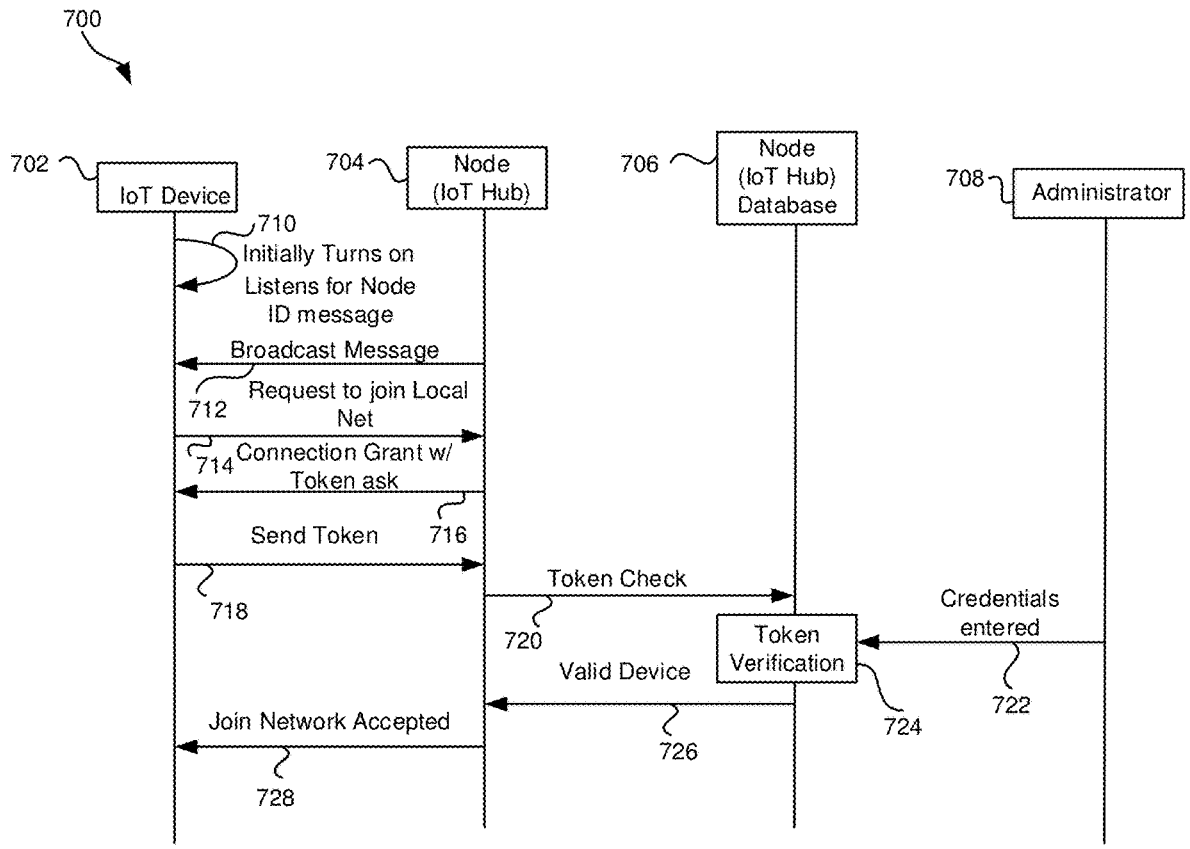
FIG. 7: This figure shows one secure method for an IoT device to attach to a network.
Figure 8:
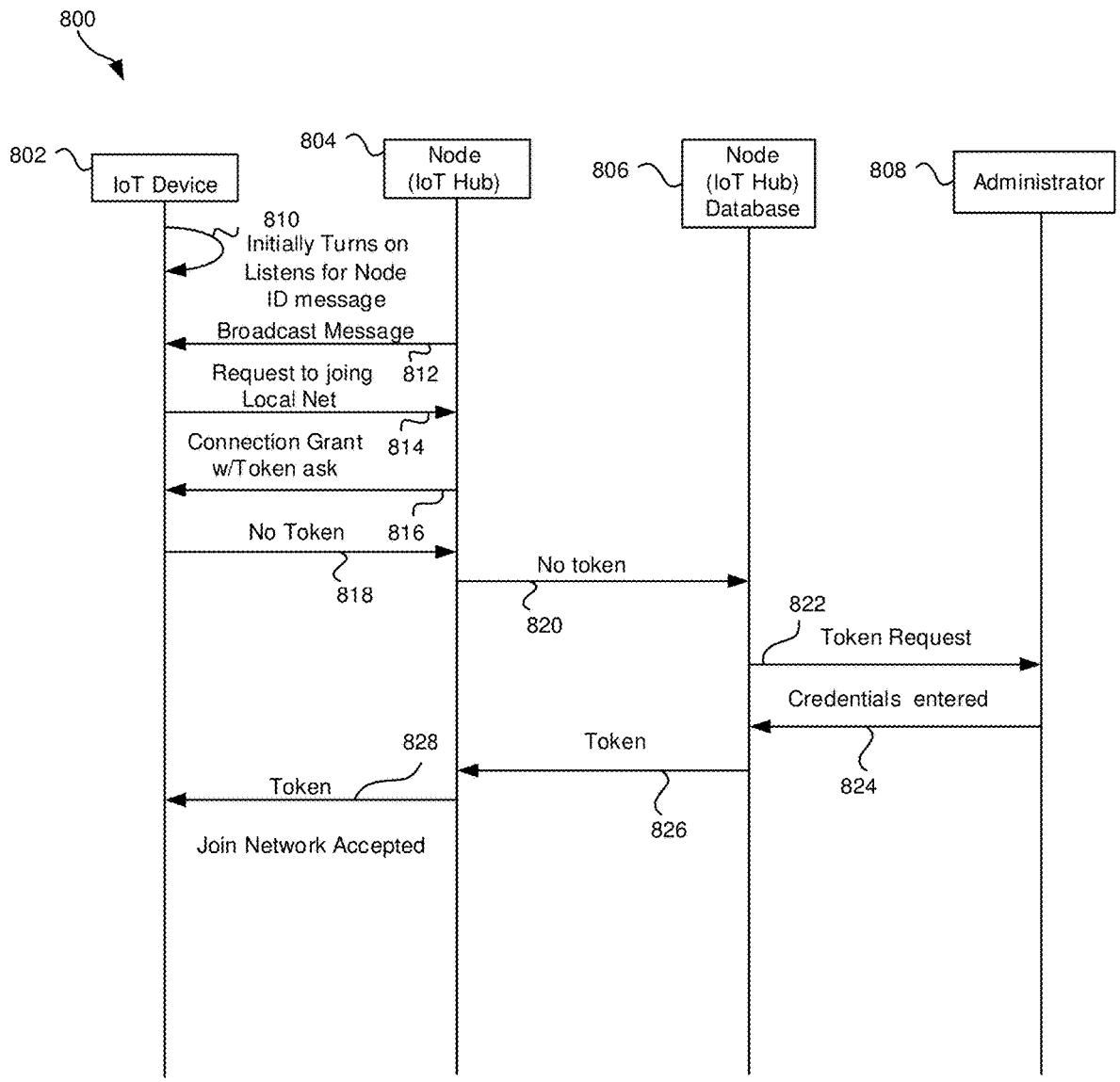
FIG. 8: This figure involves a potential message flow of an IoT device that attaches to a network without credentials and waits for certification to allow it to gain access further.

There are several possible methods for an IoT to initially attach to a network all involving some level of authentication and authorization. However, authentication and authorization of an IoT device have some deficiencies that need to be resolved. Most authentication and authorization solutions involve having some level of initial trust with the device attempting to attach to the network. The initial handshake can be wireless where a secure tunnel is setup between the device 702 and the node 704 as shown in FIG. 7. Alternatively, the device can be connected via a wired connection which also would have a secure connection.

The access handshake or authorization 700 would be done initially when the device initially powers on or has lost its later gained certificate and other credentials due to some problem which can be loss of power, moving the device to another location, the node it is bound with has failed.

For the initial handshake or access one method is to have the initial token or rather security certificate integrated as a hardware key when it is manufactured. This option will necessitate provisioning of the device into some type of database or authenticated ledger which can also be a block on the block chain in order to recognize that this unit is indeed the correct one that will be connected. The certificate is then used as the method to prove authenticity to gain access to the network as well as providing the digital signature credentials for blockchain communication or other communication. However, this does not eliminate the potential that a cloned piece of hardware or counterfeit hardware is used. The location of the file used for recognizing the authenticity of the device can also be tampered with as well since a device rolling off the factory line and being packaged in mass production will not be earmarked for a particular user.

Another access method is to allow all devices to attach to the network without any additional interaction occurring. The devices will remain on a black list 814 until such time that the administrator recognizes that the device is indeed valid and binds the device to the network 828. The device then can either participate as a full node or reduced node where the full node may be a new miner or just a node that does not perform mining capabilities. The reduced node however has very limited capability in terms of GPU.

Another method is to provision a security certificate into the device via software using either a hardwired connection or NFC to mention two possible methods. The device then is placed in the network and using the security certificate it is able to provide the authentication needed.

Figure 9:
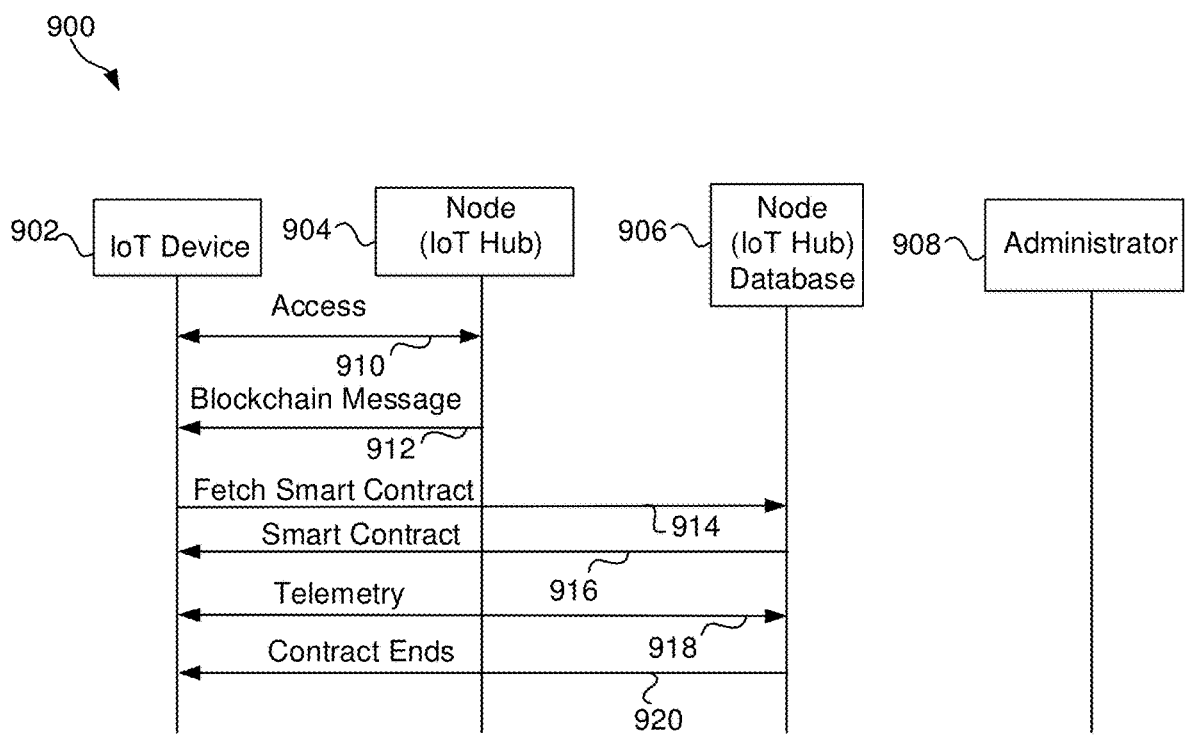
FIG. 9: This figure shows a potential message for an IoT device to fetch its smart contract.

Another method shown in FIG. 9 is to create a token at the device using the public key of the node it is connected to and hashed with the mac address of the device itself as shown in 900. The hashed information is sent to the node 910 which has authentication capability and decrypts the message. Then node either has the devices mac in its database or approved device file or it waits until the administrator approves the device. The node then includes the device as part of the block chain with other credentials.

Another method involves a peer to peer connectivity method where the device advertises its capability. The node or other device recognizes the devices function and asks for the payload or snippet of data taking it as unsecure and untrusted.

Another method is where the device requests a security token from the node itself. The node either sends the security token to the device because it is recognized, or it waits to send the security token only if authorized by the administrator.

Yet another method is to have the device to attach to the network and listen for a local net blockchain message. The send an invite request using the mac address of the device as the destination message r There are other methods of achieving initial handshaking for trust, light trust, or no trust.

Once the device is attached and allowed on the Node or blockchain network it fetches the smart contract as highlighted in FIG. 9.

The fetching of the smart contract can be achieved in several methods. The method is to receive the entire block chain and search the header for references to the device as the destination or part of the transaction. However, this will increase the payload size toward the device.

Another method using a similar logic flow as shown in FIG. 9 900 is to have the node apply local intelligence and direct the device to the appropriate smart contract. The device then fetches the smart contact. This process is an efficient method to start the device toward vetting and directing it to the appropriate smart contract.

Yet another method is for the device to get a reduced version of the block chain. The reduced version of the block chain can be a simple as only containing the block headers, so the device can fetch the appropriate block.

And another method again has a similar logic flow as shown in FIG. 9 is to have the Node apply local intelligence and direct the device to the appropriate smart contract. The device then fetches the smart contact. The node however filters all subsequent blocks so that only the block header is sent so the device can detect additional information requests sent its way. This is the most efficient method by improving the GPU efficiency of the device and reduces latency for receiving or sending telemetry in support of the smart contract.

The IoT Hub can utilize a block chain process to protect and manage the profiles for each of the environments from being tampered with by unauthorized devices or people.

IoT devices depending on their function can generate a continuous stream of data. While other IoT devices only send information at defined intervals, times, or when a change occurs. Regardless there is a plethora of data that can be generated from some sensors and minimal from others. Many IoT device sensors cannot be connected to the blockchain because they are constrained by capability or will provide too much unwanted data that is not needed to be sent.

Therefore, a Gateway is needed to connect the smart home/office or location using sensors or an IoT Hub to the blockchain. In this case a gateway is the publisher and is the mediator between users and the IoT devices. Additionally, by using a block chain method the IoT Hub can store the preferences including privacy policies in the block chain network itself.

The IoT hub is a communication gateway and policy controller. The IoT Hub enables the IoT ecosystem for enterprise and smart homes.

The IoT hub performs many primary features including some of the following. (1) Flexibility (agility and modular approach), (2) Offers high security, (3) Tiered Services, (4) Open Standards support, (5) Open API, drop and drag scripts, (6) Ethernet/WiFi/Bluetooth/ZigBee, (7) 5G+ capable (LTE-NB/M), (8) other features.

The desire is to match the IoT hub functions and capabilities to the applications it needs to support. The tailoring or matching capabilities and functions of the IoT hub to the applications it is meant to support can done using a modular approach where you plug in new modules for everything. As with all modular approaches to design there is a practical, economic and physical space limitation that need to be included in the process.

The IoT Hub because it can be located anywhere needs to be location aware. The location awareness can be achieved through location awareness algorithms used for mobile, fixed and IoT devices. Being location aware the IoT Hub whether it is stationary or mobile can be differentiated by floor in a building or what part of the mall the kiosk may reside in.

The IoT hub can also be a street sign, or other device facilitating V2X/C2X communication with diverse IoT devices.

Figure 10:
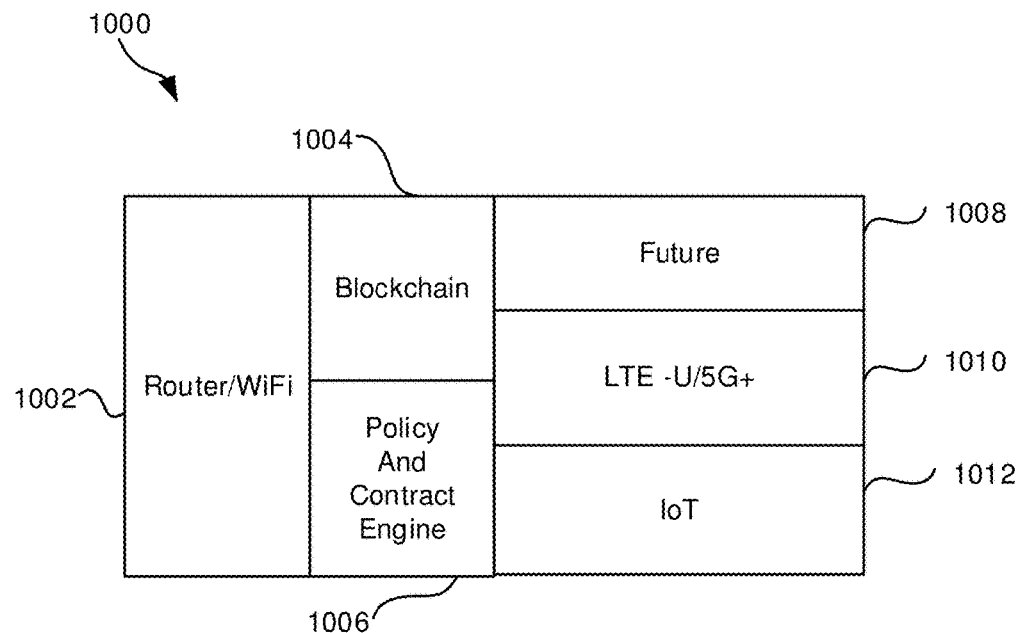
FIG. 10: This figure shows a modularized IoT hub functional blocks.

FIG. 10 is a very high-level depiction of the IoT hub/gateway functional blocks 1000. The IoT hub can function not only as a router 1002 but it has the ability to be a blockchain node 1004 which can also function as a miner if desired. The IoT Hub has a policy and contract engine 1006 which is associated with the router and the blockchain. The access methods use for connecting different IoT devices whether constrained or unconstrained is shown as the IoT module 1010 which communicates with IoT devices. The LTE/5G+ module which has the full core network and radio interface for providing P2P connectivity with LTE devices as well as providing local access for LTE/5G+ devices which includes LTE NB and CatM. A future module 1008 is there to address later protocols and other developments to prevent product obsolesce.

The IoT hub can be modularized that can be put together like building blocks. This enables on device platform to be used to all the smart home/enterprise configurations. The modular approach also enables the ability to add or swap out different modules by just unplugging or plugging them in.

One implementation of a module IoT hub/gateway could involve a System on a Chip (SOC) which has 6 or more cores. The cores can be either pooled or defined for particular services.

Figure 11:
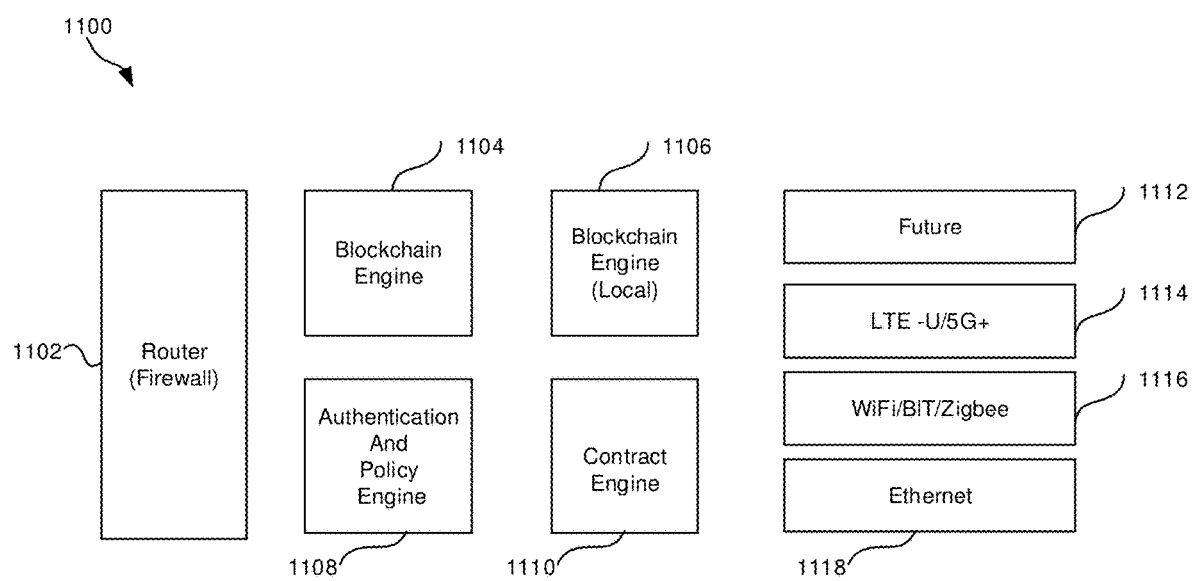
FIG. 11: This figure shows a modularized IoT hub functional blocks with multiple engines.

Another implementation of a module IoT hub/gateway shown in FIG. 11 would have multiple engines 1100. In one substantiation there would be two blockchain engines, one for the main or inter blockchain network 1104 and the other for intra blockchain (local) 1106. There would be a contract engine 1110 for the smart contracts that would be relevant to the IoT devices associated with the IoT hub itself. The authentication and policy engine 1108 would be used to authenticate the devices and the policy engine would be responsible for establishing policies on the devices themselves. This policy engine would in itself could also publish a smart contract that would be located in the contract engine. The WiFi/Bluetooth/Zigbee module 1116 would be used to connect to IoT devices as would be the ethernet module 1118. The LTE/5G+ module 1114 would operate as a private LTE/5G+ network and the future module 1112 is meant to provide future capabilities that are not visible at this time.

Figure 12:
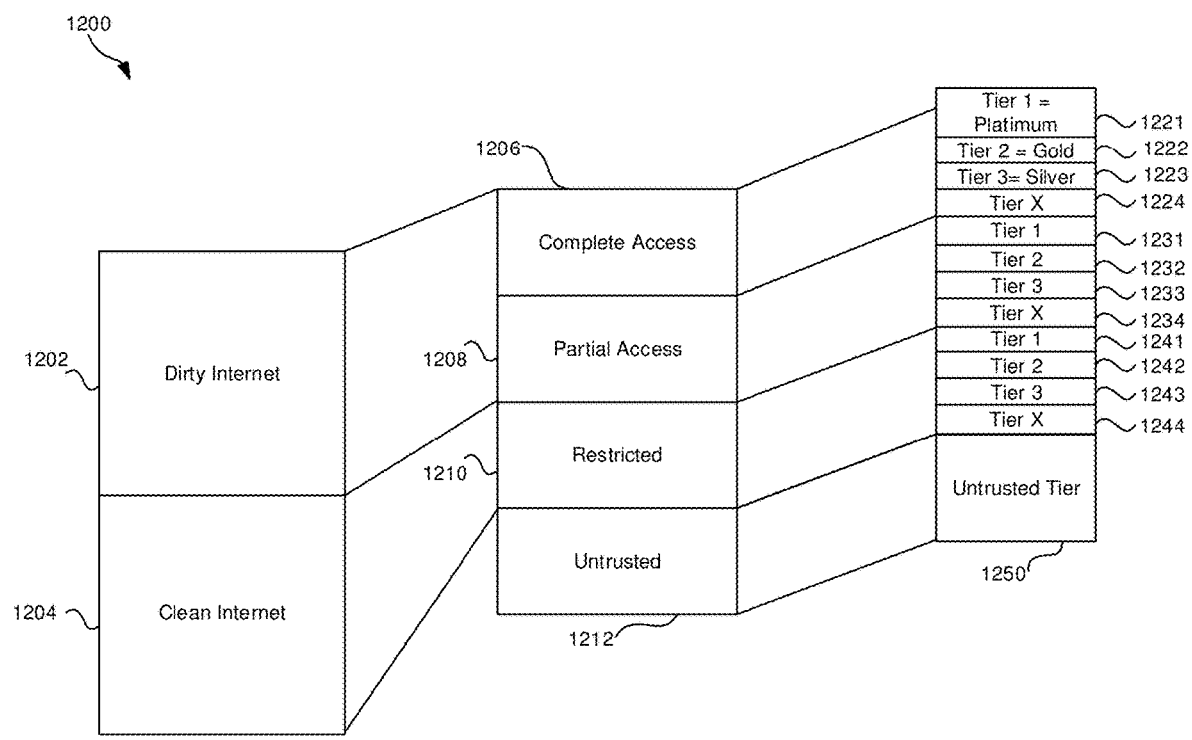
FIG. 12: This figure shows a hierarchy policy of an IoT hub managing IoT devices with a policy smart contract.

The ability to introduce network or rather smart hub slicing to IoT hub/gateway is important from a functional point of view as well as a security point of view. The slicing of services or functions for an IoT hub/gateway is shown in FIG. 12. In FIG. 12 the IoT hub will have the ability to define both a dirty internet 1202 and a clean (trusted) internet 1204. The dirty internet will be segmented from the clean internet though use of hardware, cores, as well VPN segmentation. Each IoT device based on its policy will be assigned either to the dean or dirty internet. The devices however will not be allowed to access both and the history of this will be stored in the blockchain.

Examples of devices needing access to the dirty internet would be a laptop, mobile device or tablet which is an unconstrained device. Monitoring of the IoT devices and services that reside in the IoT hub will be done though a web interface which can be accessed locally via the firewall or in the cloud environment.

FIG. 12 shows a possible policy hierarchy 1200 can be used in an IoT hub environment. In one implementation the IoT devices could have access to the dirty internet or the clean internet. The internet however could a LAN or WAN that may or may not be connected to the internet and could be a private network itself.

The policy used would then be invoked on the IoT hub to either have complete access, no restrictions with in the clean or dirty internet. Examples of different service policies that the policy hierarchy could apply to for the IoT hub include be email, browsing capability, mobile data etc. associated with a retail sales department, a visitor center, asset tracking in a warehouse, or even the refrigerator to mention a few possible scenarios that this could applied to.

With the policy hierarchy an IoT device also could have a partial access where the device can interact with other devices but on a limited or rather restricted basis. For instance, a smart refrigerator could be requesting access to get a firmware update. This firmware update would have to approved by the administrator prior to the completion. This would ensure that the user or rather administrator knows what is allowed and not allowed on the network and prevents that inadvertent software change or collection of metadata from upstream devices or services to mention a few possibilities.

The other policy is restricted in that all the devices that are restricted will not have the ability to connect with any other device except the IoT hub. If a device needs to communicate with another device, it will fall within the partial access but is still bound to firewall separation of dirty verse clean environments.

With any system involving trusted and untrusted devices how to handle untrusted devices should be proactive and not reactive. Untrusted devices are those which are attempting to gain access to the network itself. The untrusted devices can be legitimate devices but lack the proper credentials either from initiation or due to come corruption. These IoT devices are placed in an untrusted list and do not have access to any resources or communication until the reason for the lack of credentials is resolved.

Some IoT devices will perform Ad-Hoc connections on their own when attempting to access either a network or another device. Having ad-hoc connections presents a rogue process that left unchecked could present a way to bridge the dirty and clean internets. However, the authenticated IoT devices that are given partial and restricted access will also have defined what they are allowed to connect to and when.

An IoT hub/gateway policy hierarchy could have laptops and tablets within a particular hierarchy have complete access 1206 to the dirty internet 1202, also known as the public internet. Partial access 1208 may be allocated to certain devices that content needs to be filtered or limited access is allowed under defined conditions. Some the defined conditions for partial access could include have a refrigerator check for a firmware update but is now allowed to install the update until approved. The devices could also be restricted 1210 for any outside communication so that their actions are only applicable to the local network that the IoT hub manages. Some scenarios for hierarchical policy could also include a clean internet 1204 which can be a company LAN.

The IoT devices that are allowed to connect to the IoT hub may be initially restricted as part of the initial hierarchy policy. This immediate restriction may be important because the initial software code running on the IoT devices is typically provided by the manufacturer of the IoT device and therefore falls within the bounds of either providing partial access or some variant of that once the IoT device is activated.

The smart contract used for defining the function of the IoT device can also contain the code that enables a tight coupling between the policy and the embedded code that resides on the IoT device itself. The smart contract can also have the hierarchical policy defined so the IoT hub so a more self-discovering process or rather plug and play environment can take place.

The policy scheme depicted in FIG. 12 could also be used to segment bearer traffic by type based on the policy that is associated with the bearer traffic type and the IoT device involved.

Figure 13:
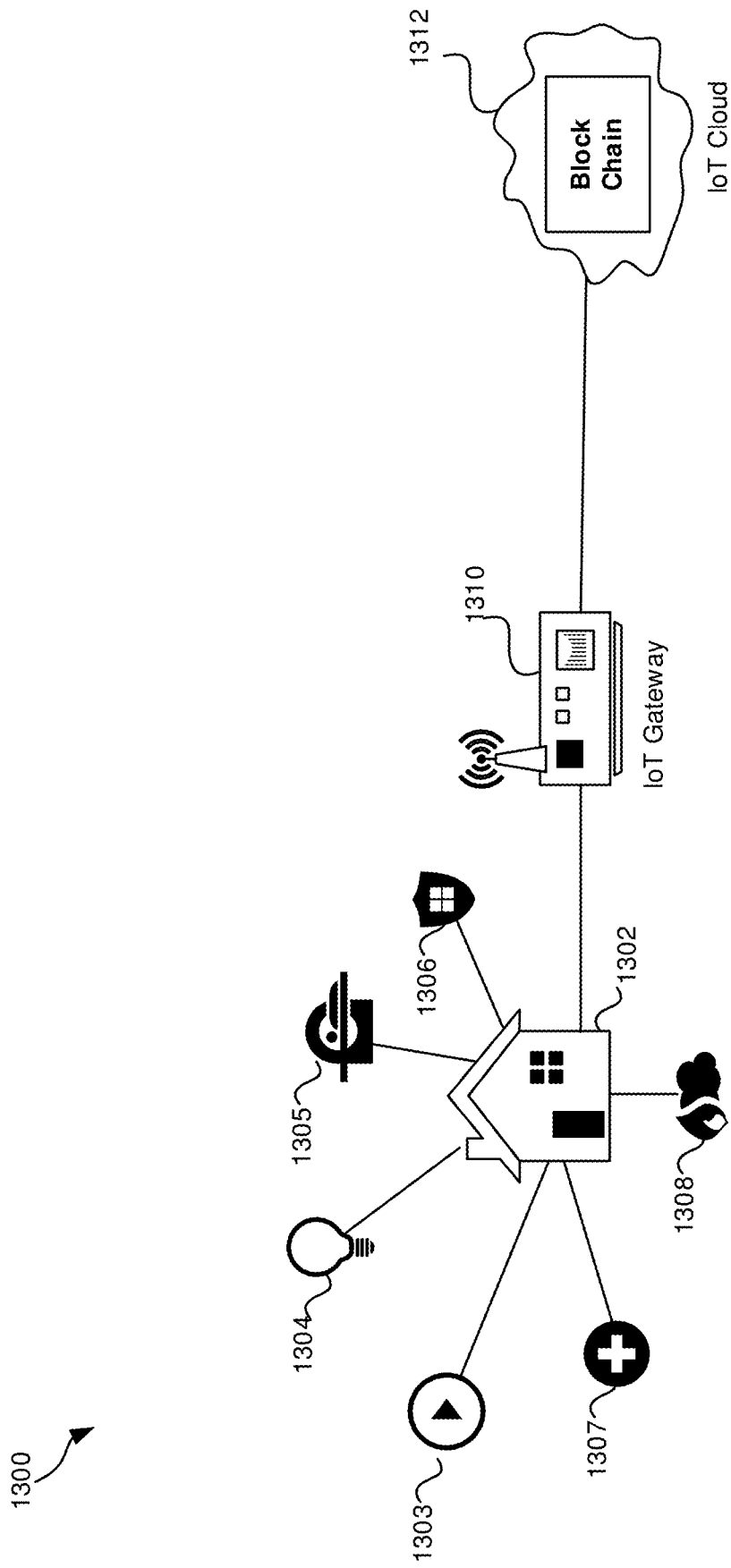
FIG. 13: This figure shows a smart home either operating as its own self-blockchain or networked blockchain or a combination of both.

FIG. 13 is yet another depiction of a smart home 1302 which can use a local blockchain (self-block) and then connect to the IoT cloud 1312 if desired where the IoT hub 1310 is a blockchain node.

In FIG. 13 various IoT sensors 1302 through 1308 are shown which can that can be included in a typical smart home IoT ecosystem. However the types, quantities and the associated functions will vary based on the requirements and uses for the smart home ecosystem.

FIG. 13 could have the IoT devices directly communicating with the IoT cloud 1312 using blockchain technology or the IoT devices connected to the IoT hub 1310 may communicate with the IoT cloud which may or may not be part of a blockchain.

Figure 14:
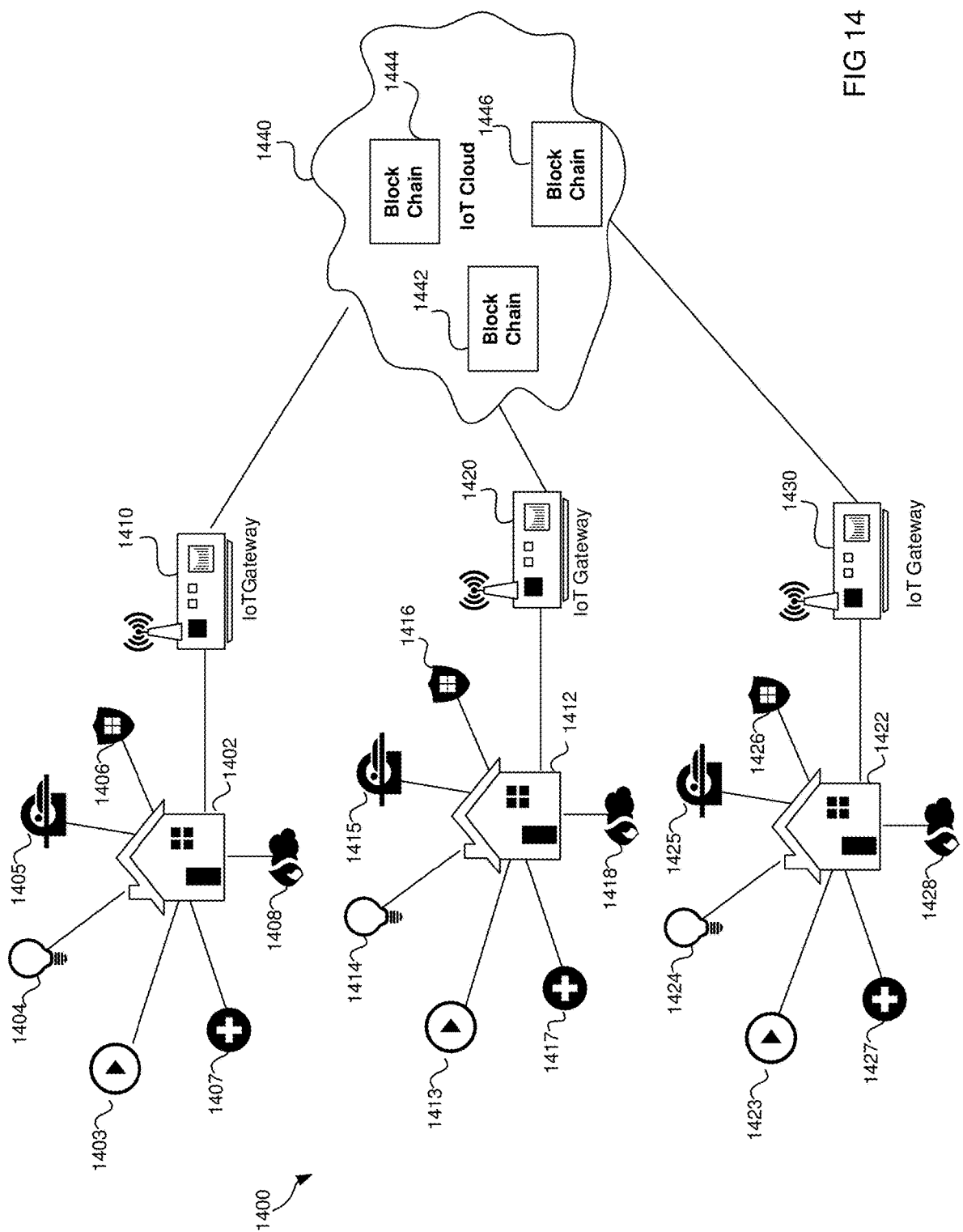
FIG. 14: This figure shows smart homes in a networked blockchain.

FIG. 14 shows a networked group of smart homes, 1400 that have several IoT hubs that have IoT devices 1403 through 1408 that are connected to an IoT hub 1410, IoT devices 1413 through 1418 connected to IoT hub 1420 and IoT devices 1433 through 1438 connected to IoT hub 1430. However, the smart homes shown in FIG. 14 could be a small campus environment or apartment complex, strip mall, government facility, military base. The IoT device can use a local blockchain (self-block) that is facilitated by the IoT hub. The IoT device can also be connected to the IoT cloud 1440 if desired where the IoT hub is a blockchain node the blockchain nodes 1442, 1446 and 1448 reside in the IoT cloud or some other location. The IoT hubs can also connect to each other as part of a consortium blockchain or even private blockchain sharing resources through the use of smart contracts.

Figure 15:
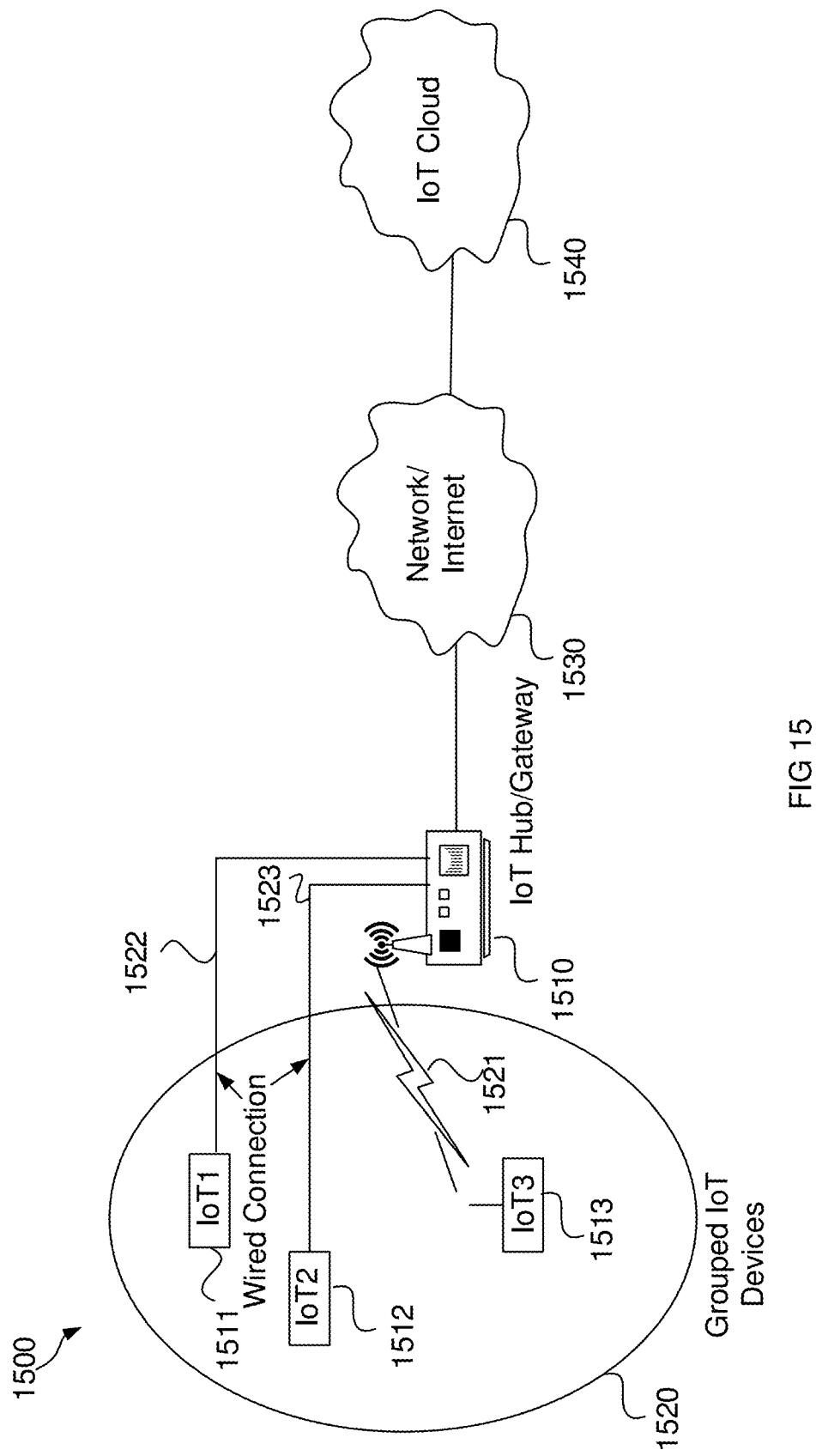
FIG. 15 This figure shows the grouping IoT devices from a blockchain smart contract.

An extension of the policy and slicing process described in FIG. 12 IoT devices can and should be grouped FIG. 15 depending on their use or desired function. The grouping of the IoT devices can be done at the IoT hub level 1510 or using another platform at the edge of the network 1530. Alternatively, the grouping of the IoT device with other devices can be done further in the network or in the IoT cloud 1540 service where grouping functions are performed that utilize either manual or network discovered ranging where the IoT devices as part of the grouping process are grouped based on their physical proximity or collective function.

Additionally, the small consortium network in FIG. 14 can be setup so one or two locations are minors and the other network elements are storage locations for data or other functions.

FIG. 15 1500 shows multiple IoT devices that include wireless 1513 and wired devices 1511 and 1512. The IoT hub 1510 based on the policy and smart contract has the IoT devices grouped together 1520.

Figure 16:
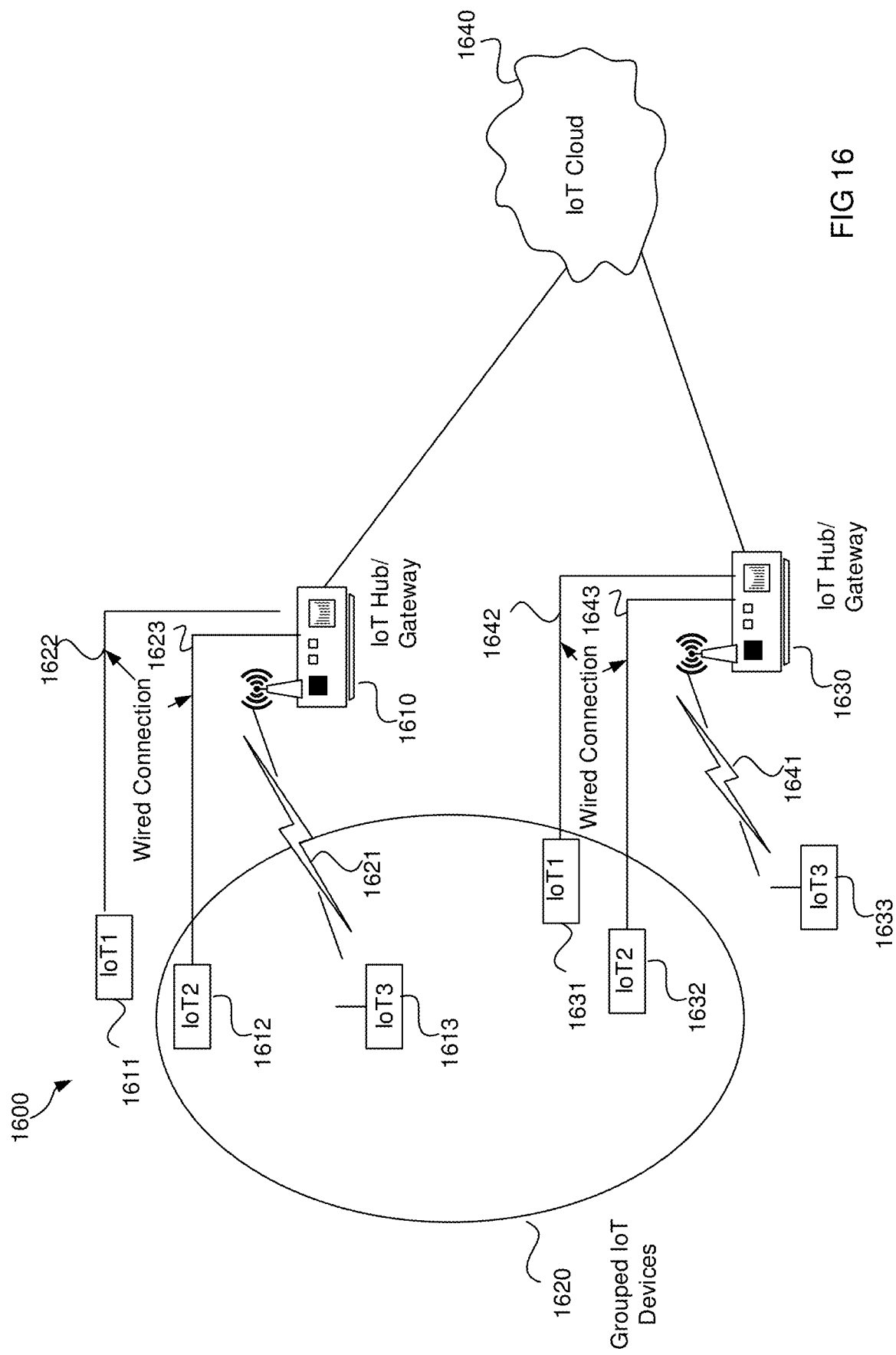
FIG. 16 This figure shows the grouping of IoT device using multiple locations and or access points from a blockchain smart contract.

FIG. 16 shows a potential scenario where several IoT devices are grouped together for a collective service offering 1620 however the IoT devices are connected to the network or cloud service either from different IoT Hubs 1610 and 1630 or beacons, or eNodeBs or other wireless access networks allowing for a HetNet of IoT devices to exist 1600.

In FIG. 16 not all the IoT devices are included in the grouping 1620. In this example IoT device 1633 is not included in the grouping due to its capability, function or relative proximity.

The grouping of IoT devices allows for better management and control of the IoT devices due to a policy linking their cross functionality.

Figure 17:
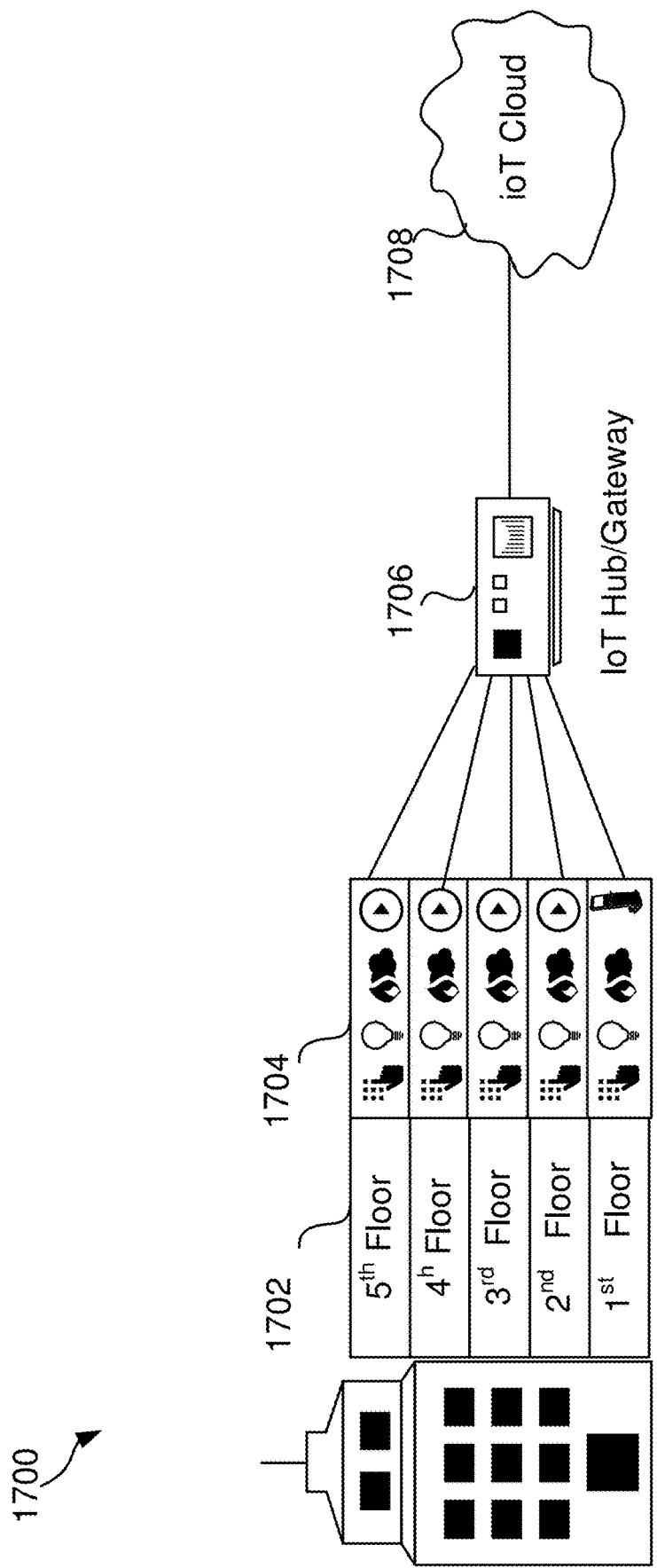
FIG. 17 This figure show an enterprise location with multiple floors being controlled by an IoT hub/gateway using a blockchain smart contract.

FIG. 17 1700 shows one example where IoT devices 1704 in an enterprise or business location are grouped by floor 1702 or some other organizing method to provide potentially different services or capabilities based on the location the IoT devices are located in the building. The various IoT devices arranged by floor in FIG. 17 can include security functions for physical entry, lighting control, fire detection and multimedia capabilities as some possibilities. In FIG. 17 kiosks can also be includes as part of the grouping as shown in the IoT grouping for the 1st floor in 1704. The IoT devices are then connected to an IoT hub 1706 which then can communicate or allow communication to an IoT cloud 1708 and or the internet or private data network depending on the policies and functions provisioned with the IoT Hub and or smart contracts utilized.

Figure 18:
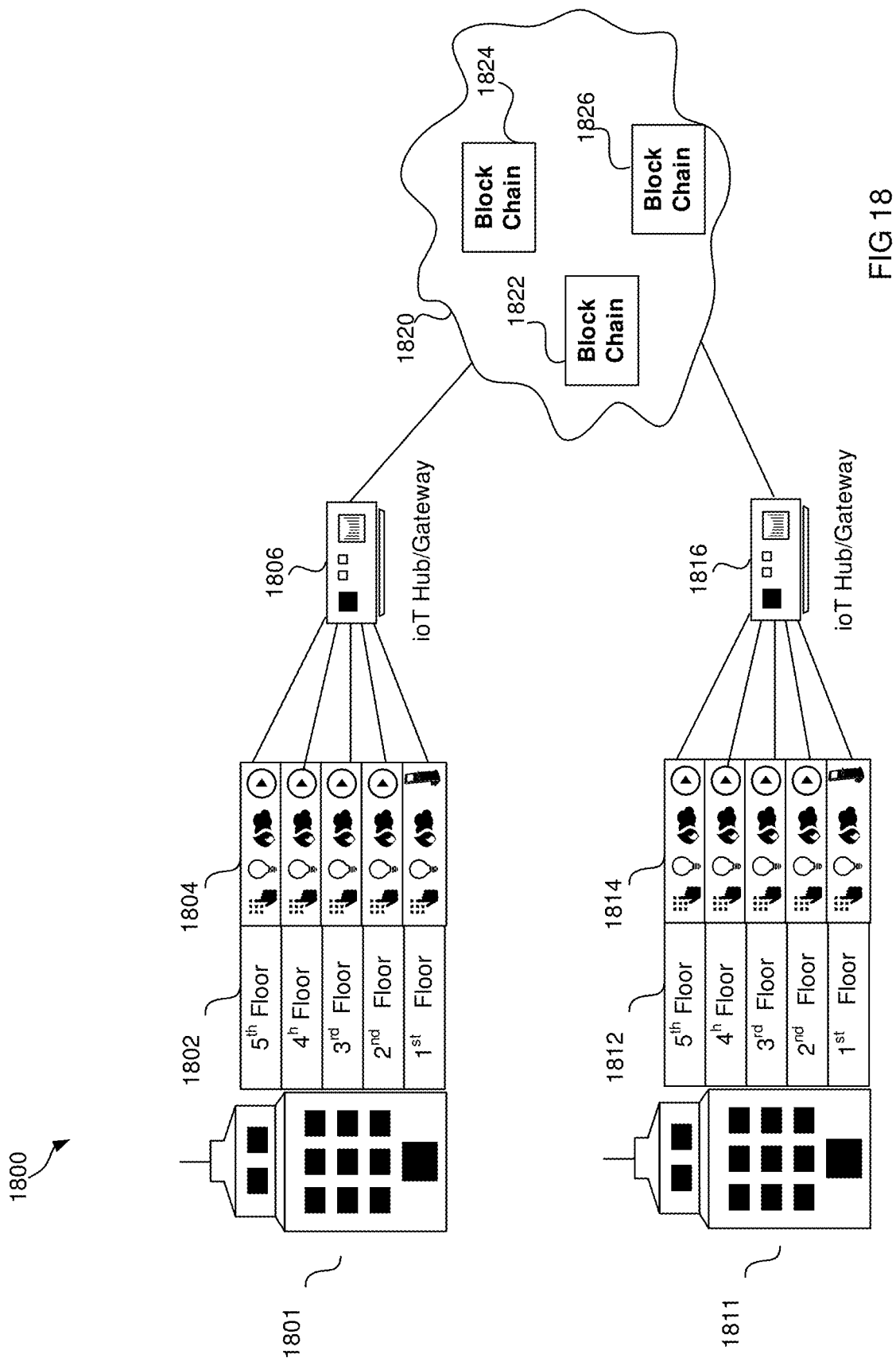
FIG. 18: This figure shows multiple enterprise locations, campus and or satellite offices being with multiple floors being controlled by an IoT hub/gateway using a blockchain smart contract.

FIG. 18 shows another potential enterprise deployment 1800 where the concept of FIG. 17 now includes the need to expand the service between different office buildings on a campus environment or between satellite offices. FIG. 18 only two locations 1801 and 1811 only two are used for ease of illustration. In this example the two campuses are connected for to the blockchain environment 1802 through the IoT hubs 1806 and 1816. The IoT hub/gateway 1806 and 1816 can also connect to other data networks that can reside in 1820 or elsewhere. Smart contact information can be obtained from the blockchain 1822, 1824 and 1826 where the policies and functions of the IoT hub/gateway and associated IoT sensors are defined.

In FIG. 13 through 18 some of the IoT devices shown can be location aware where they either are able to determine their geographic location, have the network they are associated determine the geographic location or have their geographic location determined via an alternative method. Location awareness is essential for many IoT device capabilities and enhancements. Location awareness has many advantages for IoT in that the IoT devices can be better associated with a particular consumer or location. The consumer or location can be the actual location of the apartment or home with multiple floor or levels which are above or below grade allowing for the automatic provisioning of the IoT devices without having to have the consumer provision the devices. The automatic provisioning or rather introduction of a plug and play environment allows for tightly coupling devices to each other for a coordinated ecosystem of sensors and services enhancing the consumer experience.

The tightly coupling or grouping of various IoT devices shown in FIG. 13 through 18 also can be used to enhance infrastructure monitoring for bridges, tunnels, roadways by grouping IoT devices with individual structures or groups of structures.

Location awareness for proper grouping of IoT devices is important. For grouping of IoT devices based on some location awareness can be associated with an IP address, physical street or apartment location related to the billing information or pertaining to the range from a cell site where the IoT device may be able to obtain GPS/A-GPS or ranging information for its approximate location. The IoT hub/gateway could also have its location defined though its billing address information that can be manually configured or determined from the network address it communicates with.

With plug and play or rather a self-organizing network of IoT devices the addition or removal of IoT device is also possible without requiring the need for human intervention. Examples of inclusion of an IoT device can be where a device is brought into the IoT ecosystem either as an enhancement to the IoT ecosystem or a device temporary entering and utilizing the IoT ecosystem. This method can also be used for removing an IoT device from service either because of performance issues, moving out the ecosystem area or because a service subscription has ended.

When the device initially registers and or attaches with the IoT Hub it is put into the lock down, no access, and this is placed on a black list or untrusted list. However, if the IoT Hub is connected to the cloud it could then read the pre-provisioned rules for that IoT device that is uniquely identified in the smart contract or other provisioning database. Also, if the IoT hub is a self-block it can utilize the smart contract it has for that IoT device or class of IoT devices. The IoT hub can also be part of a consortium where it is able to obtain the smart contract detailing the specific policy for the IoT device.

Figure 19:
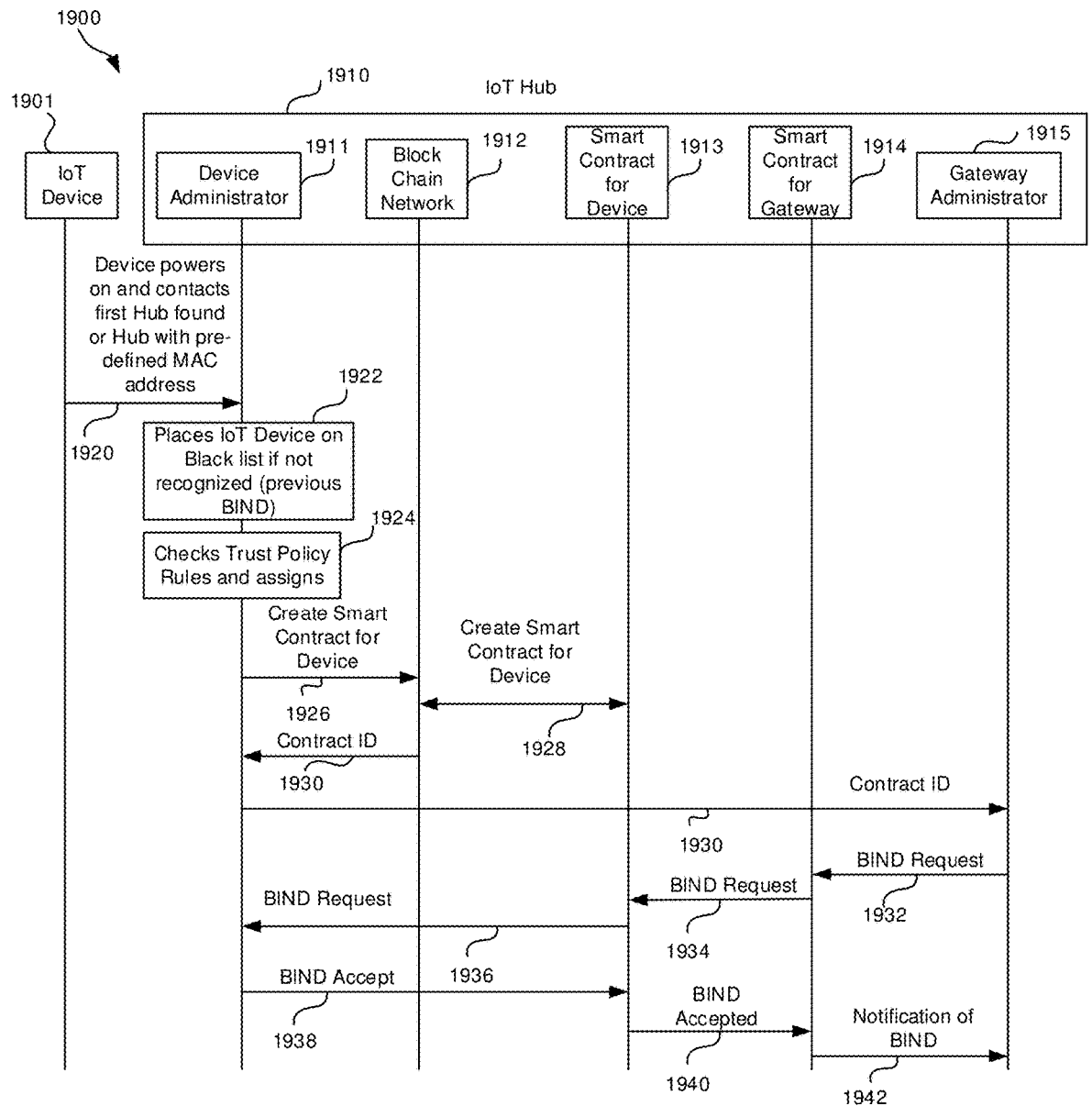
FIG. 19: This figure shows a process flow for an IoT device to obtain its policy smart contract.

FIG. 19 depicts a process 1900 where the IoT device(s) 1901 requests access to the IoT Hub 1910. In the example depicted in FIG. 19 the IoT device is unknown or is known but with no policy or smart contract associated with it. The IoT devices policy and trust rules 1924 are checked. In this instance the smart contract is the policy for the IoT device. The administer approves the device and creates a smart contract with the associated trust rules which is then binded 1932 through 1942 to the IoT device as part of the smart contract pertaining to policy.

Figure 20:
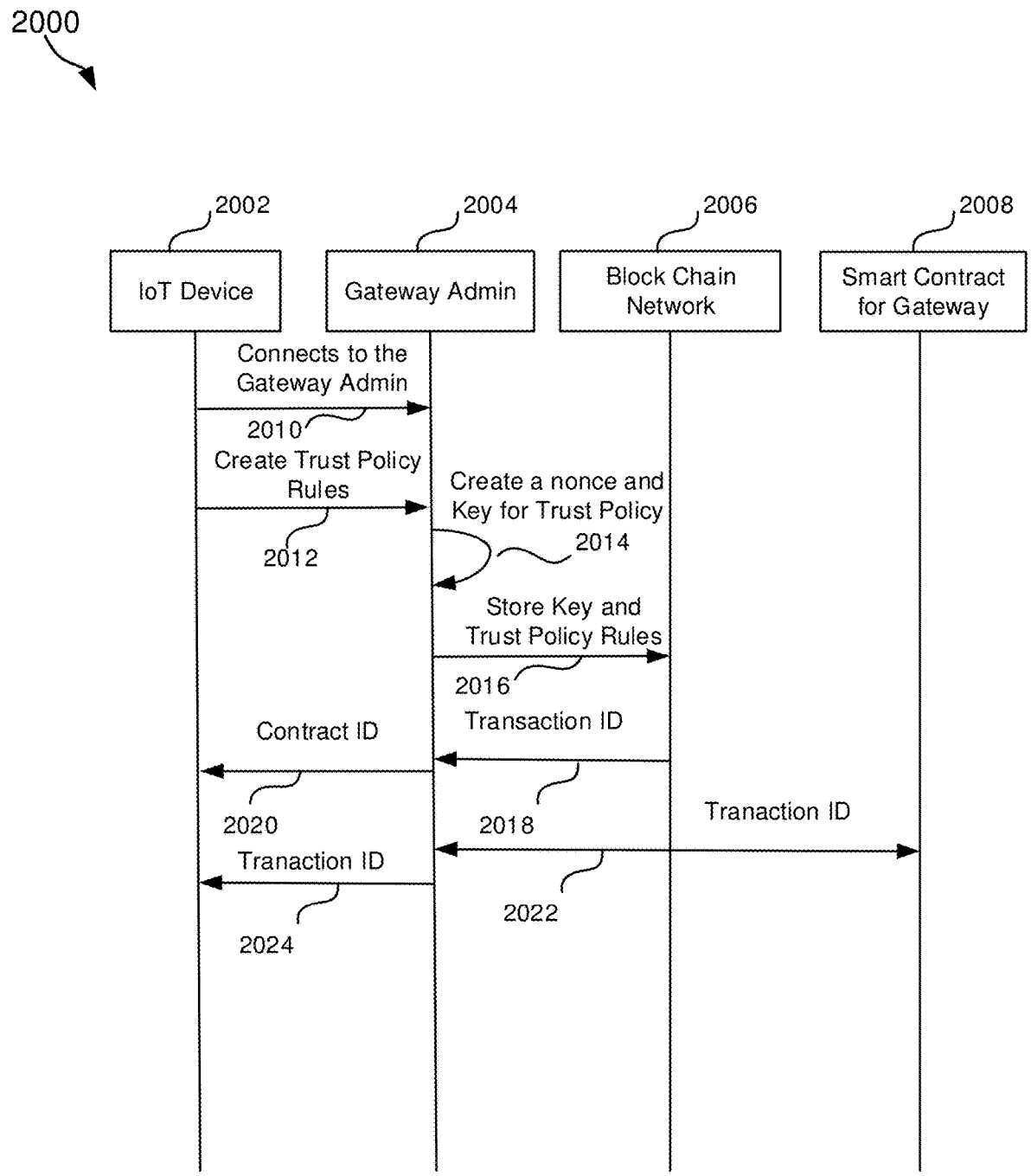
FIG. 20: This figure shows a process flow for an IoT device to obtain its Trust/Token security key.

FIG. 20 2000 shows an example of how a security token can be created for the IoT device.

In FIG. 20 the IoT device 2002 connects to the Gateway Administrator 2004 which can take place for example after the IoT device goes through a binding process as shown in FIG. 19. The Gateway Administrator (GA) creates a Key 2014 which is then used to create a transaction ID 2018 and a contract ID 2020 all part of a process to provide cybersecurity for the IoT device.

The following are a few possible scenarios of use cases involving smart contract types that are meant to manage, provision and protect various IoT devices or other network elements.

For example, an SDN networks whether operating on an OPNFV, Open container or static network configuration can utilize smart contracts from blockchain resources to enable and or define various services that a network operator can offer its customers. For instance, a smart contract can be used to provide a neutral host environment for wireless access enabling a subscriber or wholesale provider to use the radio resources either on a best effort approach or through network slicing as defined in the smart contract.

Smart contracts can also be used to provide automated configurations where the network is dynamically changed in near real time meeting particular contract requirements. In this use case there can be one master smart contract which has all the relevant information and the end device is able to communicate to the blockchain environment in a secure fashion ensuring its integrity. In addition, it is possible to have a smart contract reference several other smart contracts enabling the device receiving the configuration or code to have a standard configuration associated with one smart contract and also have user or location specific configuration information associated with another smart contract which can be updated based on policy or user profile requirements.

Smart contracts can also be used to facilitate dynamic roaming or network selection either between operators, between assets or a particular radio spectrum that is allowed to be used. For example, a smart contract can be used to allow a mobile device to select different networks based on user preferences. Also, smart contracts can be used to change the mobile devices preferences directed by the operator enabling the network operator to best manage it resources for delivering service.

There are numerous possible scenarios not listed where IoT devices and or network elements are provisioned, configured and managed in a secure environment protected from unwanted attacks either through cyber, physical or other methods. The added security protection and ability to track configurations for IoT devices and or network elements in addition to service differentiation is all possible because smart contracts are immutable, and they can be used for a more effective way of delivering and verifying a contract.

The following are a few use cases with an SDN network utilizing blockchain smart contracts for managing nodes on the edge of the network or edge computing where most if not all processing and decisions are done at the edge of the network to improve latency and other functions. The SDN network can utilize blockchain smart contracts to provision and manage the edge devices securely. The use of smart contracts to manage an edge device ensures a method of validating contract compliance. For example, the contract compliance can be associated with a network slice for delivering service and utilizing a blockchain smart contract method would provide an immutable method of validating the contract for monetization.

Therefore, the following are a few examples of how smart contracts can be used for network slicing associated with edge computing.

1, Usage Tracking Policy Smart Contract

The usage tracking policies can be used to determine how the usage has to be tracked for a lease and reported to not only network operator who owns the asset but also to the one who is using the asset. The usage tracking policy can also periodicity send a usage report to all parties in the transaction at defined the time intervals. An example of a possible report is described next to illustrate what is possible. The exact contend and period of the example report is meant for illustrative purposes only.

Actions can also be described in the smart contact which must be taken if an event is triggered. In this example the trigger described is when a certain data usage threshold is reached.

For example the report can contain the following information (1) Uplink data usage, (2) Downlink data usage, (3) Average Resource Utilization on the eNodeBs/gNodes or edge node in the usage tracking window, (4) number of lessee subscribers contributing the usage, (5) Control plane traffic, (6) A flag indicating if the report has to include the usage at cell, eNodeB or node level or not, (7) Temporary Roaming Monitoring and Reporting Policy where the Temporary Roaming monitoring and reporting policy defines the parameters that have to be monitored and reported to all addresses in the transaction, (8) Monitor the load level of the eNodeB/gNode's, (9) Monitor the KPIs defined for a lease, (10) The time period at which a report has to be sent, (11) Percentage of Resource Utilization, (12) The O&M counters and KPIs associated with a lease in support of neutral hosting environments, (13) other.

Various triggers or thresholds can be defined that invoke having updates recorded onto the blockchain as part of the smart contract requirements. The event reporting details are those which may indicate contract violations and can include the following items. (1) The load level of eNodeB/gNode crossing the Major threshold. The threshold value would be provided in the policy, (2) The load level of eNodeB/gNode crossing the Critical threshold. The threshold value would be provided in the policy, (3) Subscriber mobility and load balancing policy where the subscriber mobility and load balancing policy define the movement of devices from one network to the other which can involve different operators or just different portions of the same network operator's resources. Included in this could be the relative load balancing threshold at lessee network that would trigger the movement of the users from network A to network B. and the amount of times the occurrence happened. The relative load balancing threshold at lessor network that would trigger the movement of users back from network B to network A and the amount of times the occurrence happened, (4) it is also possible to include the policy for idle mode handling of the UEs, (5) and other load balancing thresholds like load difference for load balancing trigger etc. and the amount of times the occurrence happened.

Blockchain smart contracts can also be used to create and manage IoT as a Service (IaaS). IaaS involves the leasing of IT and cloud computer assets on a temporary basis for an on-demand basis. For instance, either for business and operation reasons a company, organization or persons may need to augment their service offerings or computing requirements through temporarily leasing assets from another entity.

Blockchain smart contracts can also be used for Server Leasing which can include using blockchain smart contract to manage excess capacity for the computing systems can be temporarily leased out to others using a smart contract. For example, a smart contract can be used to add blockchain minors to their group of nodes on an on-demand basis or a more structured time-based approach.

Some of the functions that can be included the smart contract involving server leasing can include monitoring the collective CPU load on home nodes, setting the relative CPU load threshold that would trigger adding temporary nodes, setting the relative CPU load threshold that would trigger removing temporary nodes, and other functions.

Additionally, smart contracts can be used for allocating shared software licenses either with multiple owners for a software license. The allocation of software licenses via a smart contract can lead to a new method for offering different software licenses allowing the cost of software licenses to be shared between multiple parties. The use of smart contracts for software licenses also facilitates the use of temporary use of the software licenses though a prearranged payment plan defined in the contact.

Blockchain smart contracts make it possible to share the license or seats of software between multiple parties that are part of the smart contract. Some of the items that can constitute a software license smart contract include (1) number of licenses available, (2). Allocating a license/seat for temporary use, (3) tracking available licenses that are available, (4) revoking a license(s) if time or conditions are exceeded, (5) returning a license(s) for reallocation when activity falls below a certain threshold, (6) others.

Using smart contracts for various provisioning and service delivery facilitates many additional capabilities besides ensuring contract compliance. Smart contracts utilize resident code and this code is typically used for verifying contractual relationships. With smart contracts an IoT device can obtain and run its software by using a call function on the block chain facilitated by the use of a smart contract.

The IoT device uses the smart contract concept in order to determine where the software resides on the block chain. IoT Device has a small executable code that resides on the IoT device or node that points it to the smart contract. The executable code can be delivered by an IoT Hub as well. The IoT device then calls the smart contract and reads from the smart contract which block or blocks the functional code for the IoT device resides. The IoT device then calls the block or blocks and executes the code that resides in the block itself as any program would using a function call or subroutine. Therefore, an IoT device can either obtain the code it is supposed to run from the smart contract, or it can run the code via the smart contract. The code on the block chain is also visible however it is immutable regardless of whether it is public, private or consortium block chain. Because the code is immutable this prevents the corruption of the desired code and or configuration by unwanted parties or organizations from repurposing the IoT or other devices functionality.

Figure 21:
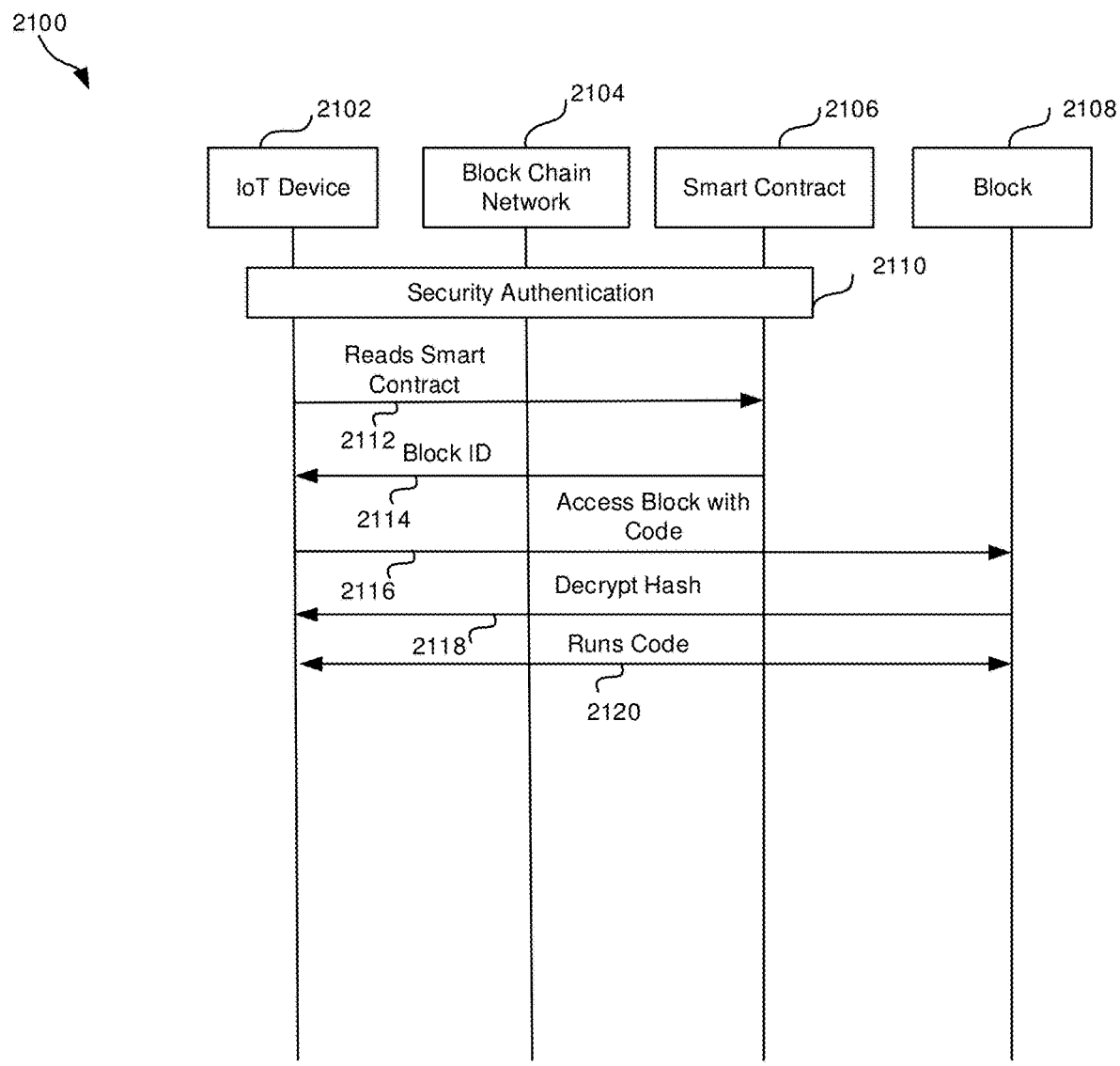
FIG. 21: This figure shows a process flow for an IoT device to obtain its software from the block chain.

FIG. 21 shows as possible method on how and IoT device can utilize software code 2120 residing on the blockchain to perform its needed functions. As part of the process there is a security authentication process 2110 that takes place. The code that the IoT device is stored within a block 2108 within the blockchain and the smart contract 2106 is used to determine rules, policy and also what block need on the blockchain the IoT device needs to utilize.

The code used by the IoT device or IoT hub can be encrypted depending on what the functionality of the device is. The use of a hash key for decrypting the code can be achieved by using the same authentication process for the IoT device having the challenge response algorithm used be the foundation of the hash key that is used for decrypting the code for use. Without the proper hash key, the code becomes unusable by anyone but the one with the proper hash key. The hash key also is changed for every transaction resulting in a zero-trust environment.

The method described in FIG. 21 has multiple benefits. First benefit is the functional code is not stored on the IoT device and cannot be changed because it is in the blockchain preventing unwanted actors from making changes to the code itself and therefore repurposing the device. Another advantage is the use of the smart contact function so the IoT devices function can be changed over time. Specifically, when it is determined that a better function or some code change is needed for the IoT device the smart contract simply points to another block which has been written that the device can now reference and use.

The general process shown in FIG. 21 allows for firmware and software updates to occur for many devices with the ecosystem. The process shown in FIG. 21 helps extend the usable life of constrained IoT devices into the future since software and configuration information can be changed to reflect different mission parameters.

Figure 22:
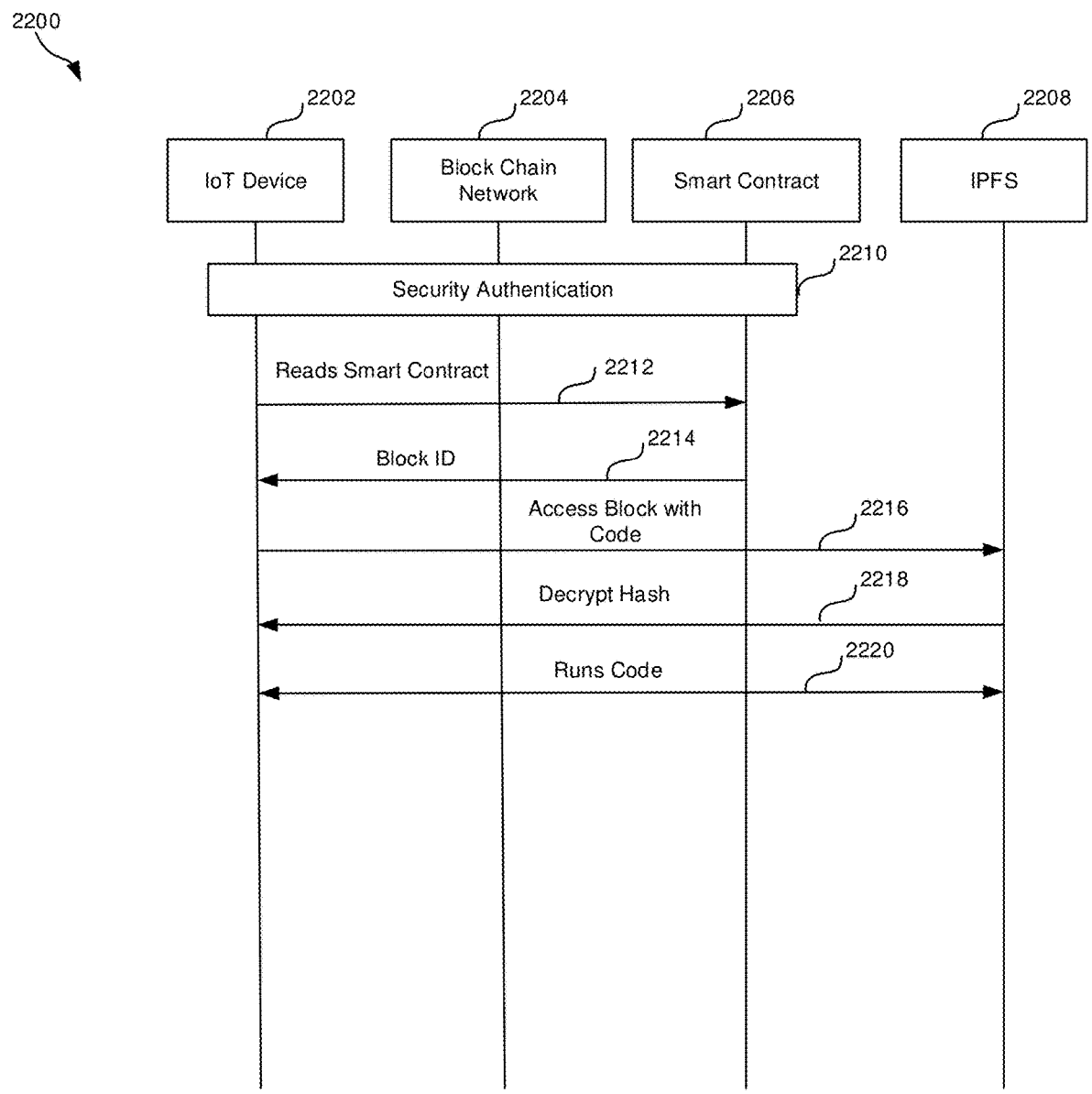
FIG. 22: This figure shows a process flow for an IoT device to obtain its software from an IPFS network.

The IoT device can also utilize an IP File Service (IPFS) or something similar where the IoT device reads the smart contract. FIG. 22 depicts an example similar to that in FIG. 21 except the code and or configuration for the IoT device based on the configuration or software code size does not lend itself to efficiently being stored on the blockchain itself.

In FIG. 22 the smart contract points the IoT device 2202 to the IPFS network 2208 with an address that holds the software that the IoT device is meant to operate. This advantage allows for different code sizes to reside utilizing block chain technology. The IoT device reads the smart contact 2206 and is pointed to the proper location in the IPFS system. The code which resides in the IPFS system can be complex or simple depending on the functionality for the device itself. The reason for the IPFS system is needed for when complex operations are needed to be performed by the IoT device itself requiring the code to be large in size. The size of the code while possible to store on the blockchain is not efficient and will need more miner processing with not the requite return as an economical advantage.

The use of the IPFS system can be used as a code repository. The code can also be encrypted requiring a key to decrypt the code. The use of a hash key for decrypting the code can be achieved by using the same authentication process for the IoT device having the challenge response algorithm used be the foundation of the hash key that is used for decrypting the code for use. Without the proper hash key the code becomes unusable by anyone but the one with the proper hash key. The hash key also is changed for every transaction. The code can be transferred to the IoT device or the IoT device can use the code either as a function call or treat it like a subroutine call in a program.

The method depicted in FIG. 22 has several benefits. The first benefit is the functional code is not stored on the IoT device itself thereby providing enhanced proactive security to the device by utilizing blockchain technology to prevent unwanted actors from making changes to the code itself. Another advantage is this method enables large and or complex code to be delivered to the IoT device. The IoT device can either read the code as a function call or subroutine or the IoT device can read the code and insert it into the IoT device itself. Another critical advantage to this approach is built in ability to update the code when the device needs to be repurposed or enhancements or fixes need to be done to the code itself. When new code is needed to be used the smart contract is updated with the new location of the code.

The IoT device can also utilize an external database for retrieving the software code. The IoT device reads the smart contract and is instructed where the software code resides. The code can be encrypted requiring a unique key to open as well making the code itself. The use of a hash key for decrypting the code can be achieved by using the same authentication process for the IoT device having the challenge response algorithm used be the foundation of the hash key that is used for decrypting the code for use. Without the proper hash key the code becomes unusable by anyone but the one with the proper hash key. The hash key also is changed for every transaction.

Figure 23:
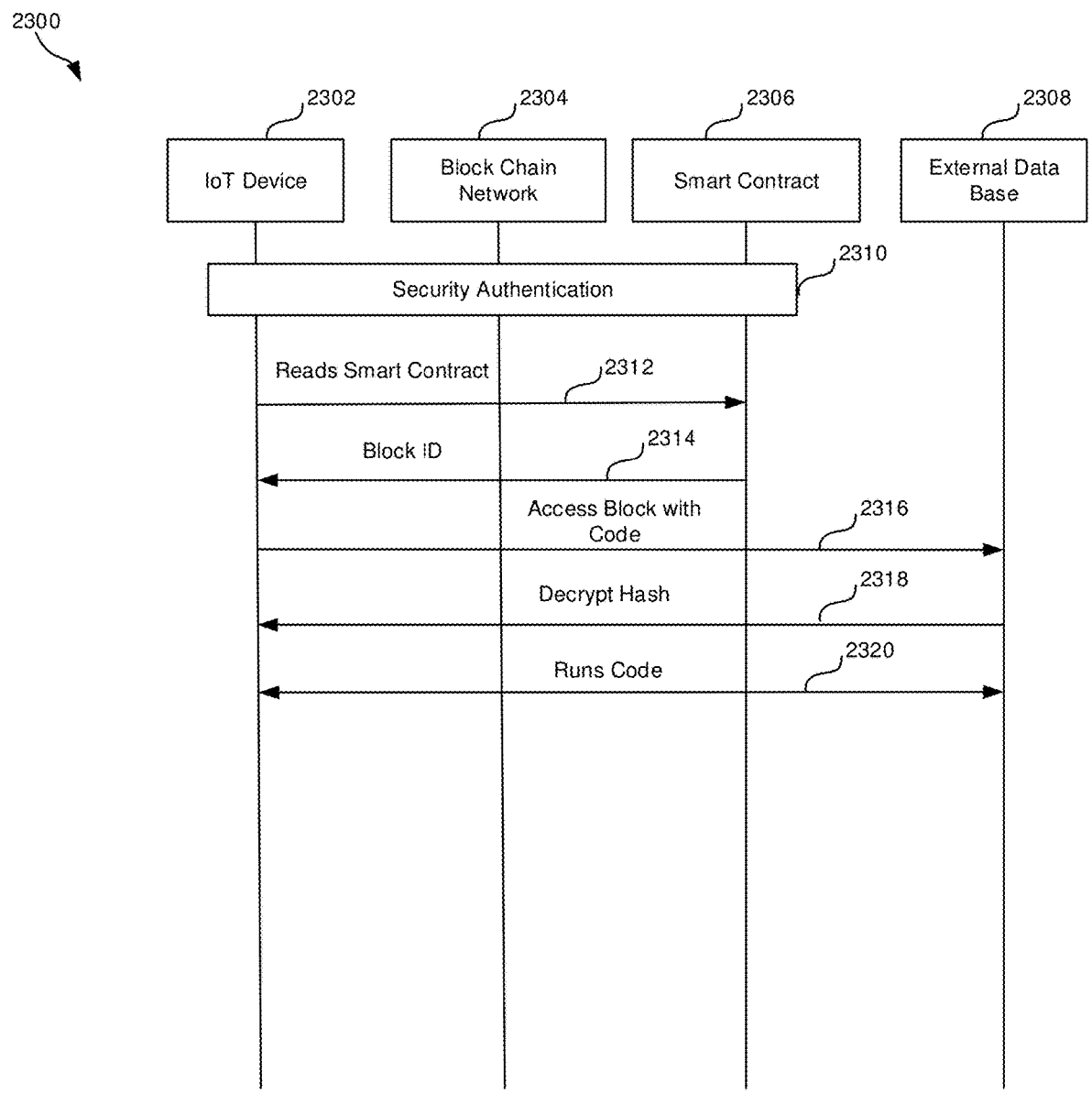
FIG. 23: This figure shows a process flow for an IoT device to obtain its software from an external data base.

FIG. 23 is similar to that of FIG. 22 except instead of the IoT device 2302 interacting with an IPFS system 2208 to obtain the software code and or configuration information the IoT device instead is directed by the smart contract 2306 to obtain the information from an external database 2308.

An IoT device can obtain its software code from the blockchain, IPFS system or external database residing somewhere remote from the IoT device itself. The IoT device can also obtain its configuration or profile by using a call function on the block chain.

Figure 24:
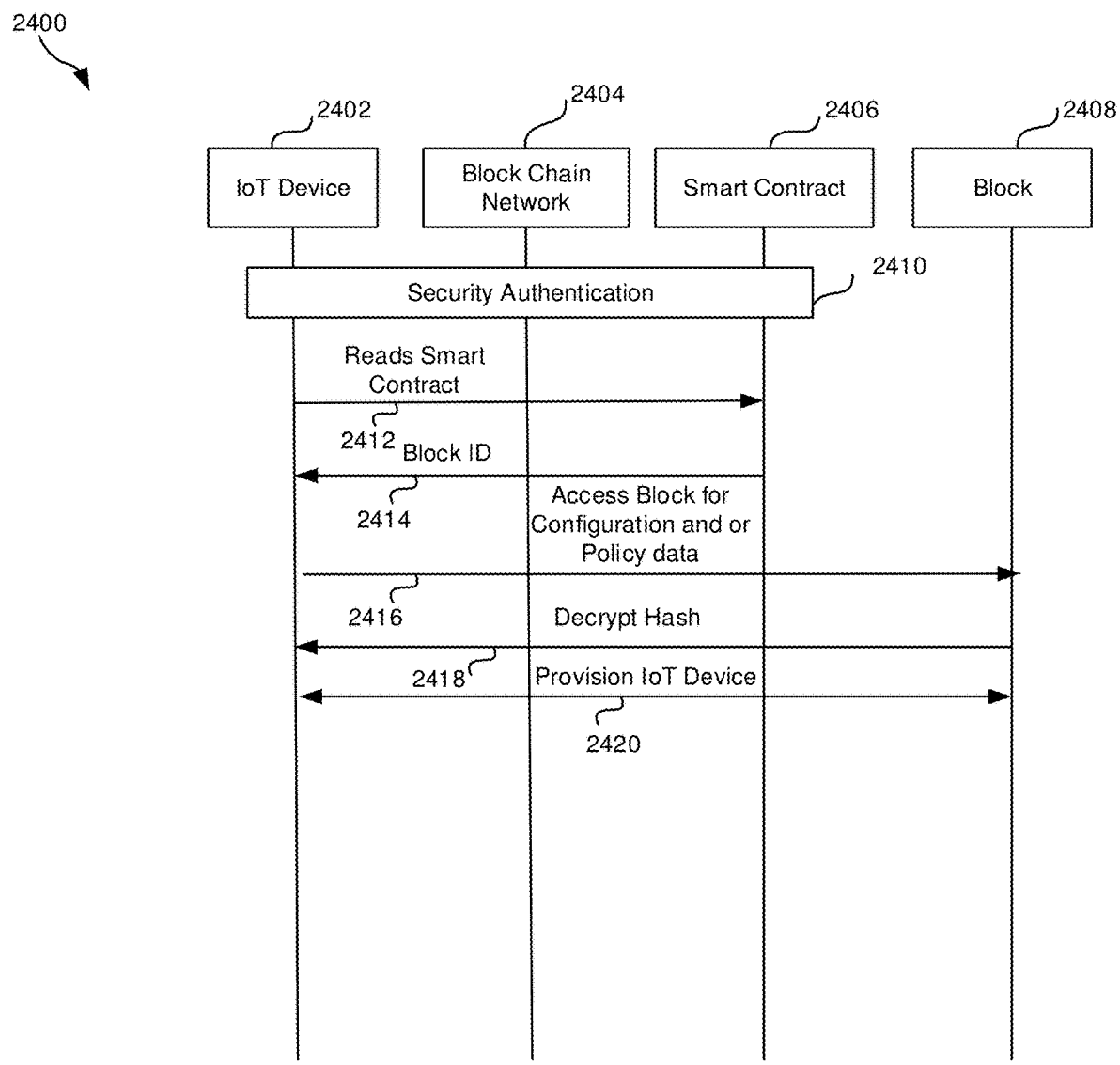
FIG. 24: This figure shows a process flow for an IoT device to obtain its configuration from the block chain.

The IoT device 2402 in FIG. 24 uses the smart contract concept in order to determine where the profile resides on the block chain. The IoT Device has a small executable code that resides on the IoT device or node that points it to the smart contract 2406. The IoT device calls the smart contract and reads from the smart contract which block 2408 the configuration and or profile for the IoT device resides. The IoT device then calls the block and executes the code allows the IoT device to be configured based on the configuration file that resides in the block itself. The configuration file on the block is also visible to all members of that blockchain whether it is a public, private or consortium blockchain. Because the configuration is stored on the blockchain it is immutable.

Depending on what the functional requirements of the IoT device the configuration and or profile can be encrypted. The use of a hash key for decrypting the configuration data can be achieved by using the same authentication process for the IoT device having the challenge response algorithm used be the foundation of the hash key that is used for decrypting the configuration data for use. Without the proper hash key the configuration or profile data becomes unusable by anyone but the one with the proper hash key. The hash key also is changed for every transaction ensuring a zero-trust environment.

The method described in FIG. 24 has multiple benefits. First the configuration is not stored on the IoT device and cannot be changed because it is in the blockchain preventing unwanted actors from making changes to the configuration or profile itself and therefore repurposing the device. Another advantage is the use of the smart contact function so the IoT devices function can be changed over time. When it is determined that a better function or profile change is needed for the IoT device the smart contract simply points to another block which has been written that the device can now reference and use.

Figure 25:
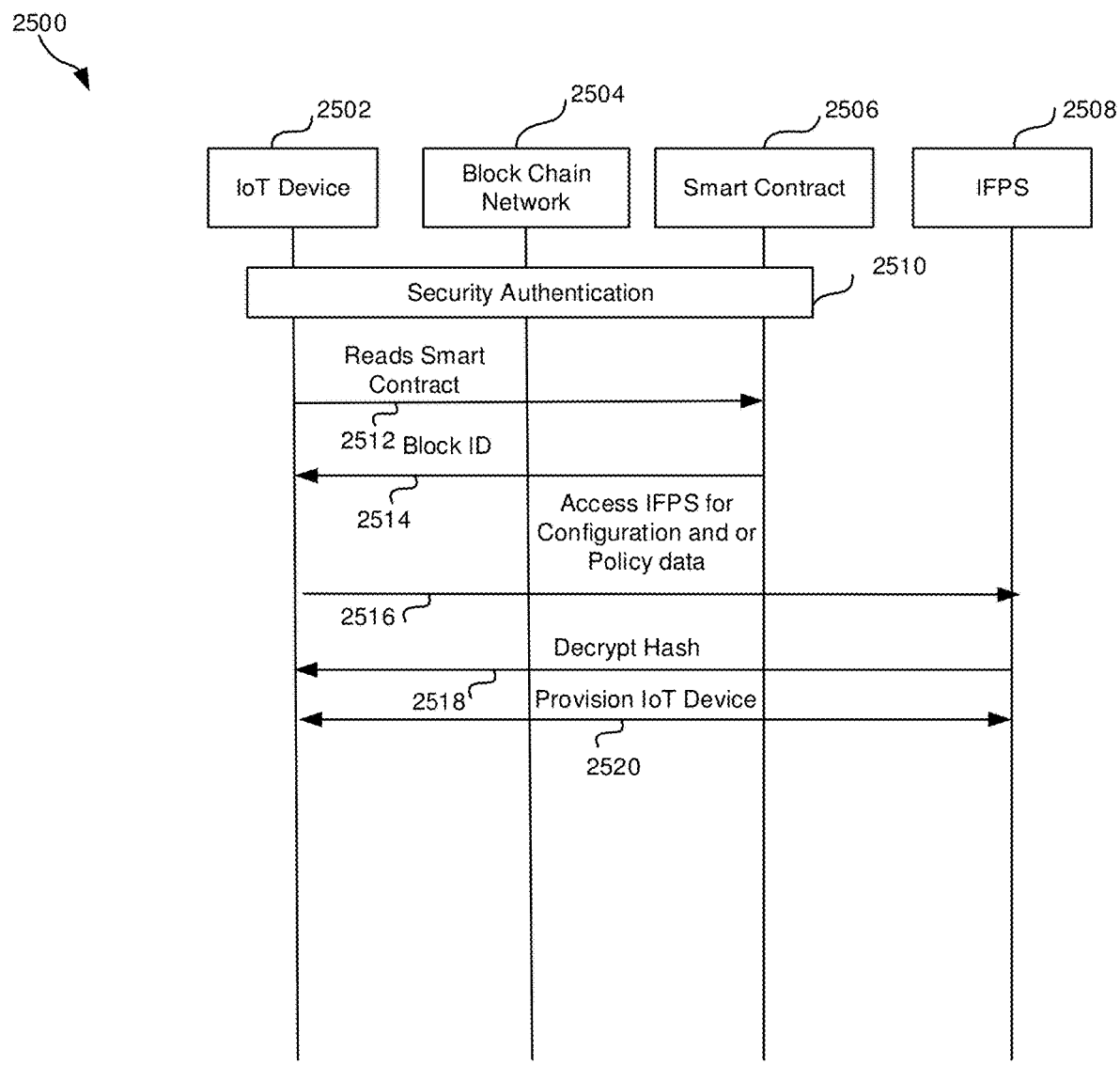
FIG. 25: This figure shows a process flow for an IoT device to obtain its configuration from an IPFS network.

FIG. 25 is an example of how an IoT device 2502 can also utilize an IP File Service (IPFS) 2508 or something similar where the IoT device reads the smart contract to obtain the profile or configuration data for the IoT device. The smart contract 2506 points to the IPFS network with an address that holds the configuration or profile which the IoT device is meant to use. This advantage is that some devices may require large configuration or profiles sizes to reside utilizing block chain technology. The IoT device reads the smart contact 2512 and is pointed to the proper location in the IPFS system. The profile or configuration data which resides in the IPFS system can be complex or simple depending on the requirements for the device itself. The reason for the IPFS system is needed for when complex operations are needed to be performed by the IoT device itself requiring the configuration or profile data to be large in size. The size of the data while possible to store on the blockchain is not efficient and will need more miner processing or other inefficient methods which serve no efficient or economical advantage. Therefore, the use of the IPFS system can be a configuration or profile repository.

The configuration and or profile data stored on the IPFS system can also be encrypted requiring a key to decrypt the code. The use of a hash key for decrypting the data can be achieved by using the same authentication process for the IoT device having the challenge response algorithm used be the foundation of the hash key that is used for decrypting the code for use. Without the proper hash key the profile or configuration data becomes unusable by anyone but the one with the proper hash key. The hash key also is changed for every transaction providing a zero-trust environment. The configuration and or profile data can be transferred to the IoT device or the IoT device can use the configuration and or profile data to be treated either as a function call or treat it like a subroutine call in a program.

The method 2500 shown in FIG. 25 has several benefits. The first benefit is the configuration data is not stored on the IoT device itself thereby providing enhanced proactive security to the device by utilizing blockchain technology to prevent unwanted actors from making changes to the code itself. Another advantage is this method enables large and or complex configuration data to be delivered to the IoT device. The IoT device can either read the data as a function call or subroutine or the IoT device can read the data and insert it into the IoT device itself. Another critical advantage to this approach is built in ability to update the configuration and or profile information when the device needs to be repurposed or enhancements or fixes need to be done to the actual code running on the IoT device. When new configuration and or profile data is needed to be used the smart contract is then updated with the new location of the code.

The IoT device can also utilize an external database for retrieving the configuration and or policy data. The IoT device reads the smart contract and is instructed where the software data resides. The data can be encrypted requiring a unique key to open as well making the code itself. The use of a hash key for decrypting the configuration and or profile data can be achieved by using the same authentication process for the IoT device having the challenge response algorithm used be the foundation of the hash key that is used for decrypting the code for use. Without the proper hash key the code becomes unusable by anyone but the one with the proper hash key. The hash key also is changed for every transaction providing a zero-trust environment.

Figure 26:
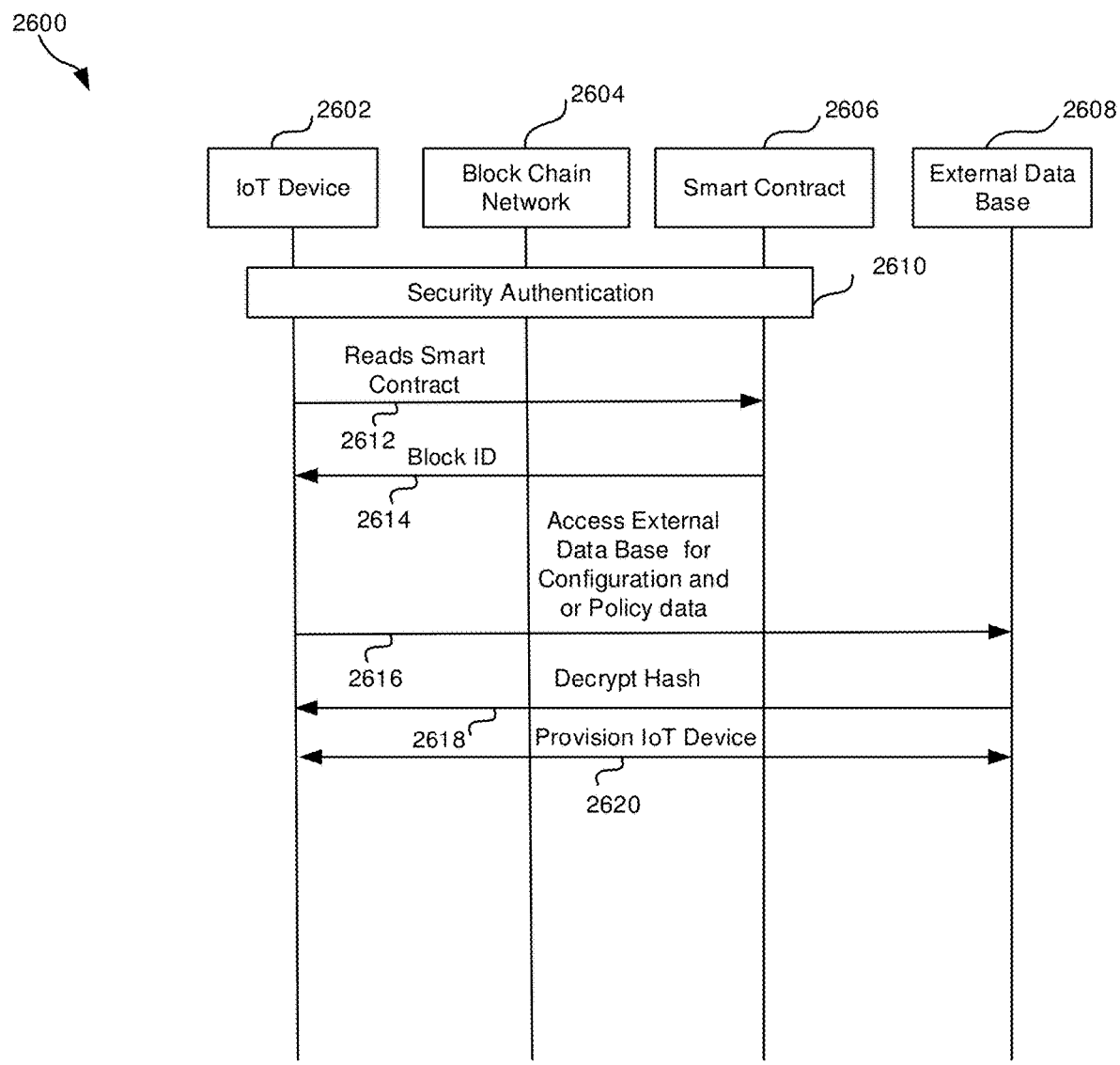
FIG. 26: This figure shows a process flow for an IoT device to obtain its configuration from an external data base.

FIG. 26 is similar to that of FIG. 25 except instead of the IoT device 2602 interacting with an IPFS system 2508 to obtain the profile and or configuration information the IoT device instead is directed by the smart contract 2606 to obtain the information from an external database 2608.

Blockchain can be used to provide either the configuration information for a device or node. Blockchain can also be used to deliver the software code the node or the device needs to utilize in order to perform its prescribed functions.

The software code and or configuration data, also called a configuration script can either be read by the node or device that is in a smart contract on the block chain and be read similar to a push command or other method for loading the software or configuration script onto the node or device.

The software code and or configuration script can be read by the node or the device using the blockchain smart contract for running the program and or configuration. By having the software and or configuration script reside on the blockchain instead of the device will enable constrained devices that are limited in CPU, memory or other resources to run the requisite program or utilize the configuration script or both.

The software code and configuration scripts residing on the blockchain can be associated with one particular smart contract or a smart contract can reference multiple smart contracts where the software code and or configuration scripts reside in different smart contracts on the blockchain.

Figure 27:
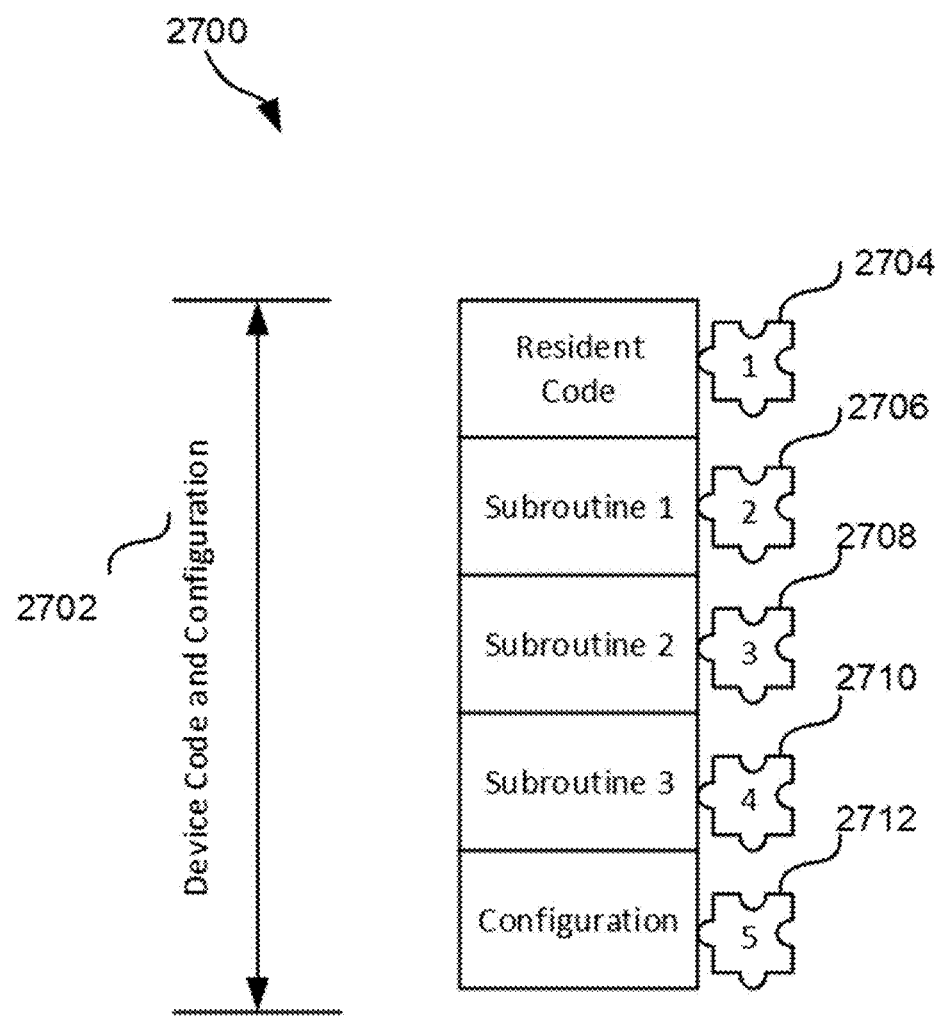
FIG. 27: This figure shows the portions of code and configuration files can be put together using smart contracts.

FIG. 27 is a representation of distributed software code and configuration script concept 2700 which are located in different blocks 5004, 5006, 5008, and 5012 that can be combined together 5002 which then can function as the software code and configuration that the IoT device uses to operate and run its functions and or application.

In FIG. 27 shows how different code or subroutines can be separated onto different parts of the blockchain and then concatenated together to produce a cohesive set of code and configuration enabling an IoT device to function as it is intended. More or less blocks can be included, and the blocks shown in FIG. 27 are meant to illustrate the concept.

In FIG. 27 firmware or resident code can exist on block 1 2704 and subroutine 1 is associated with block 2, 2706. The resident code can be the master smart contract pointing to other smart contracts which contain various elements of the software code, 2706, 2708 and 2710. Block 5 illustrates that the configuration file for the associated IoT device is depicted in 2712. The various subroutines are combined along with the configuration script enabling the device or node to function with its intended purpose. However, the example shown in FIG. 27 is but one possible scenario and is meant for illustrative purposes to highlight the important concept of utilizing the blockchain to provide the necessary code and configuration for any IoT device to function properly.

Figure 28:
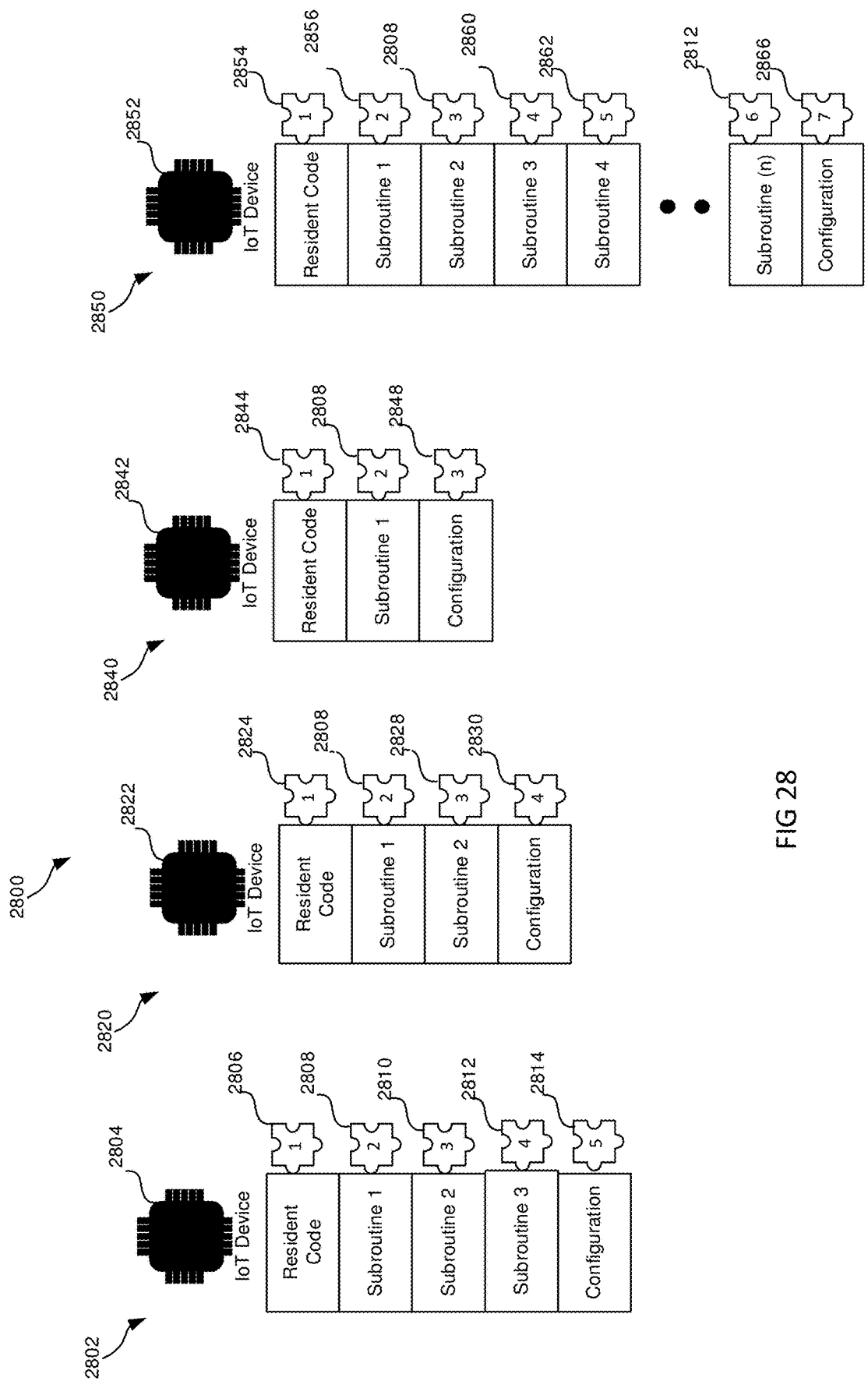
FIG. 28: This figure shows code reuse within the blockchain.

FIG. 28 is a simple depiction 2800 of different nodes or devices that utilize code and or configuration scripts from the blockchain. In the FIG. 28 there are four different devices shown 2804, 2822, 2842 and 2852. FIG. 28 depicts how the use of the same subroutine residing in the blockchain can be used by different IoT devices or nodes depending on what their specific function is. For example, device 2822 is also using the same subroutine 2808 that device 2804 and 2852. The order of the subroutine 2808 position in the code for 2852 is different for 2852 than 2808 and 2822. And in device 2842 the subroutine 2808 is also used. The subroutine 2812 is also used by devices 2804 and 2852. The ability for different IoT devices to use the same subroutine or code that they can obtain from the blockchain enables the blockchain to be efficient in code and configurations script dissemination by enabling different IoT devices or nodes to utilize the same parts of code by referencing the appropriate smart contract.

The concept presented in FIG. 28 also facilitates software maintenance, software updates, configuration management and software integrity through using smart contracts to deliver code and configuration scripts and information to IoT devices. With the use of smart contracts for delivering code and or scripts the altering of the code that the IoT device uses can be accomplished by the smart contract to referencing another block on the blockchain allows for ongoing software maintenance of devices in an economical fashion. The is process can also be used to change the IoT devices function.

Figure 29:
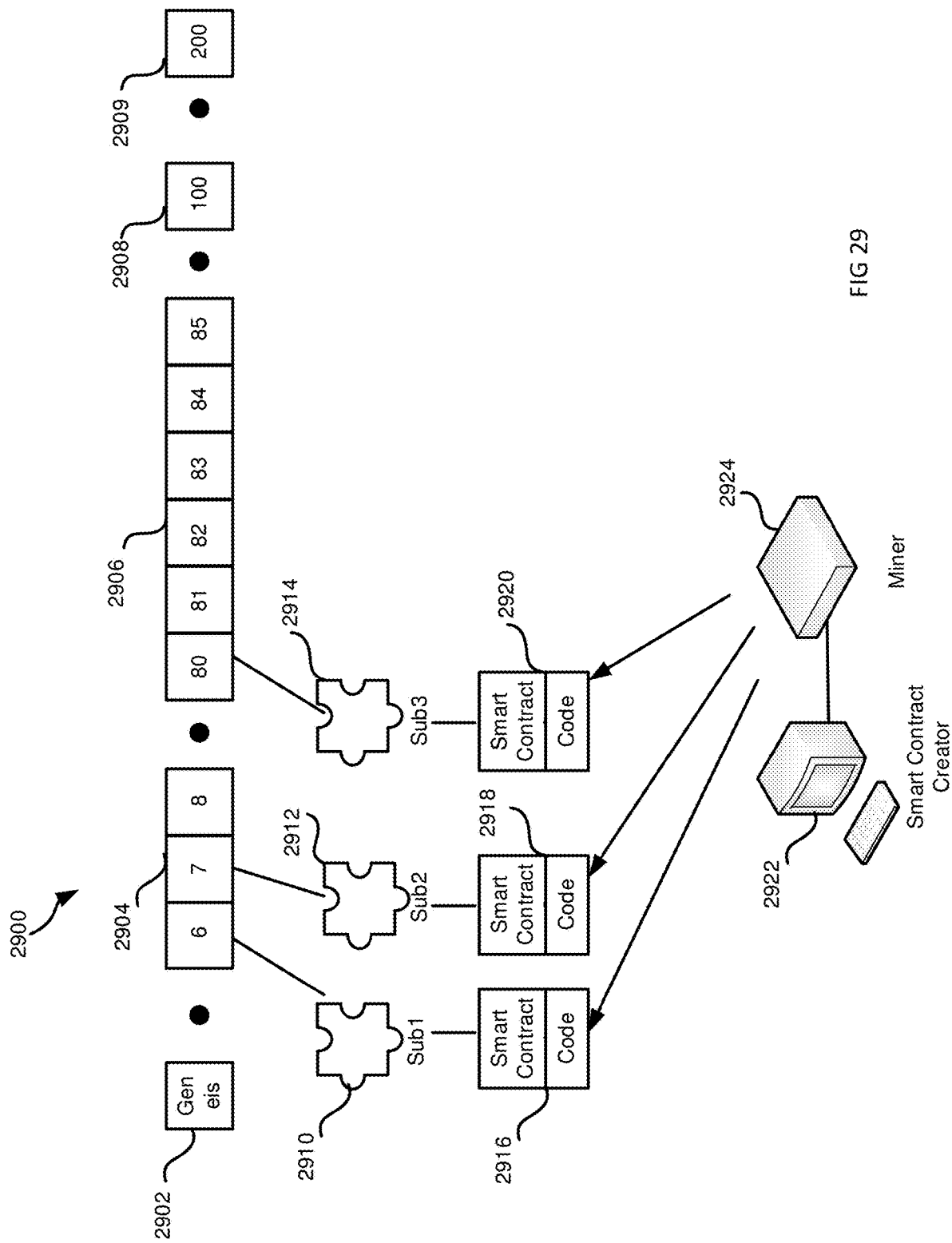
FIG. 29: This figure shows how code is distributed on the blockchain using smart contracts.

FIG. 29 illustrates how various components of software code, subroutines, are entered into the blockchain. The same process shown in FIG. 29 can also be used for entering the configuration scripts to the blockchain. The code or configuration information is entered on the blockchain 2904 and 2806 by a smart contractor creator 2922 that sends the smart contract to a miner 2924 for insertion into the blockchain. The various pieces of code are included in various smart contracts 2916, 2918 and 2920. The use of individual smart contracts also allows the ability to change code as needed as well as reuse the same code for different IoT devices and nodes.

In FIG. 29 the location of the code is for illustrative purposes and the actual location of the code within the blockchain can and will be different than shown in FIG. 29.

Figure 30:
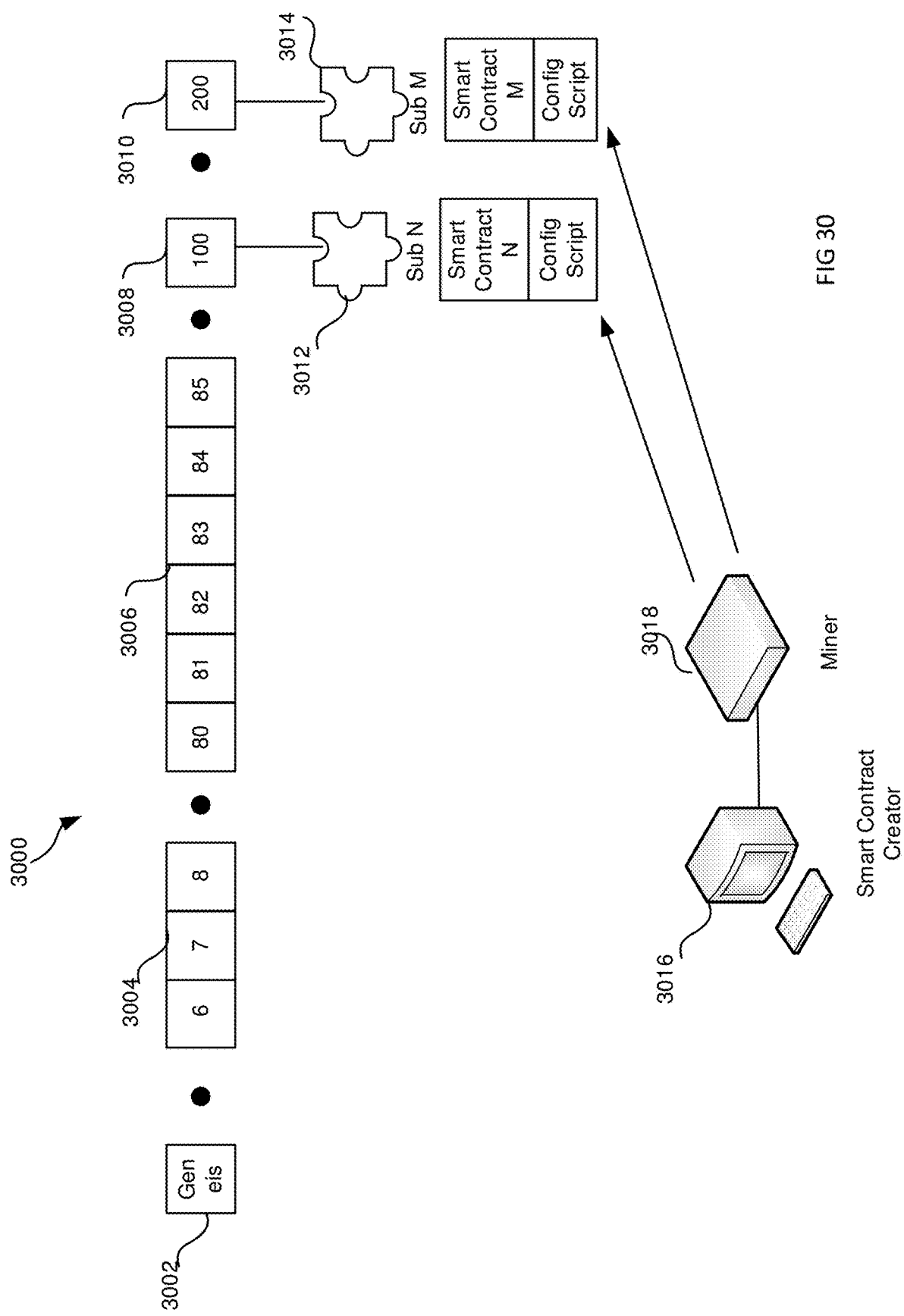
FIG. 30: This figure shows how configuration scripts are distributed on the blockchain using smart contracts.

FIG. 30 is similar in concept to FIG. 29 where FIG. 30 shows the creation in the blockchain of different configuration scripts for an IoT device. In FIG. 30 two configuration scripts are created for illustrative purposes by the Smart Contract Coordinator 3016 and inserted into the blockchain by the miner 3018. Both 3012 and 3014 are each a separate smart contract in the blockchain 3008 and 3010. The use of different smart contracts for configuration scripts allows for better configuration management of the IoT devices and the reuse of configuration script information for common devices. As one possible scenario 3012 is configuration script that is used for all similar devices and 3014 is a unique configuration script for a particular IoT device or node.

Figure 31:
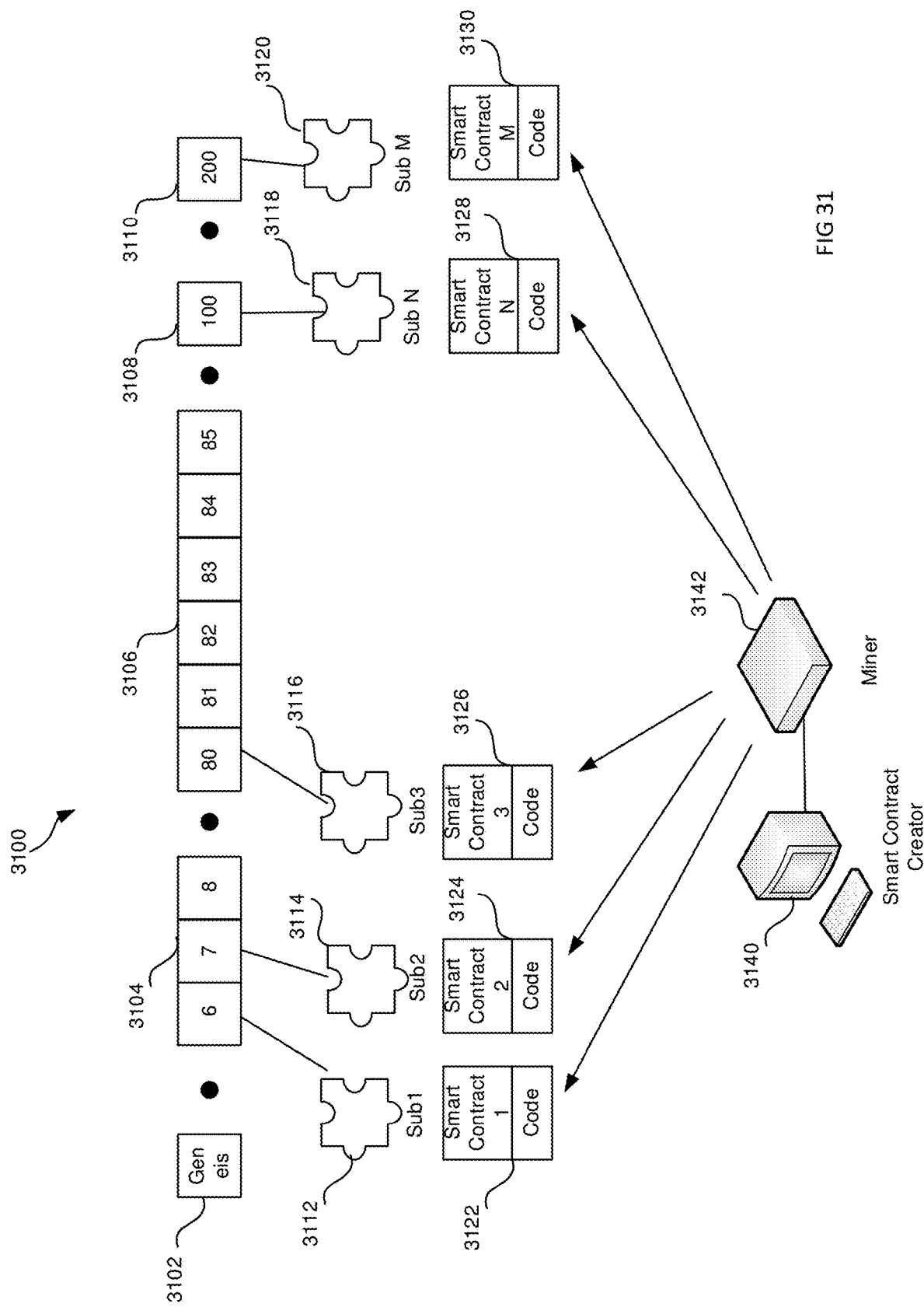
FIG. 31: This figure shows how code and configuration scripts are distributed on the blockchain using smart contracts.

FIG. 31 illustrates software code and configuration script smart contracts within the blockchain itself. FIG. 31 is a combination of both FIG. 29 and FIG. 30 where the configuration and software code for an IoT device or class of IoT devices is stored on the blockchain.

In FIG. 31 both the software code and the configuration files are created through use of the Smart Contractor Coordinator 3140 and then the various elements are loaded onto the blockchain through the miner 3142. At later times if the code for block 3114 becomes obsolete the smart contract referencing that particular block in the blockchain is changed to point to the updated block where the new code resides. The same general process can also take place for altering configuration files for an IoT device.

Figure 32:
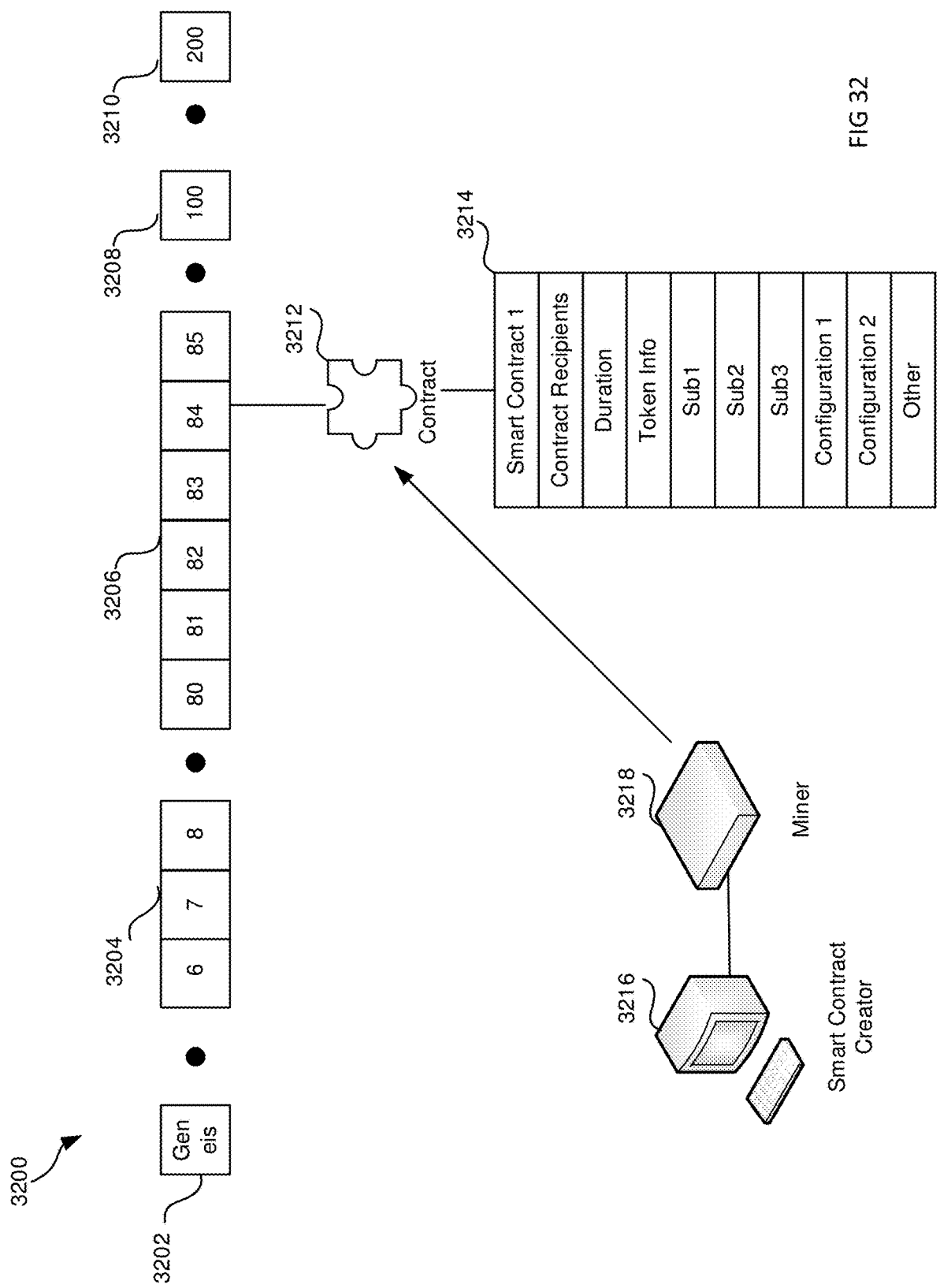
FIG. 32: This figure shows potential content of a smart contract.

FIG. 32 shows and example of a smart contract 3212 or rather master smart contract that will be used by an IoT device or node. The master smart contract 3212 references other smart contracts 3214 besides providing the authentication token process.

3214 references other smart contracts within the blockchain to complete the code and or configuration for the IoT device. The smart contract 3214 contains links to as many other smart contracts as needed to ensure the proper functionality of the IoT device.

Figure 33:
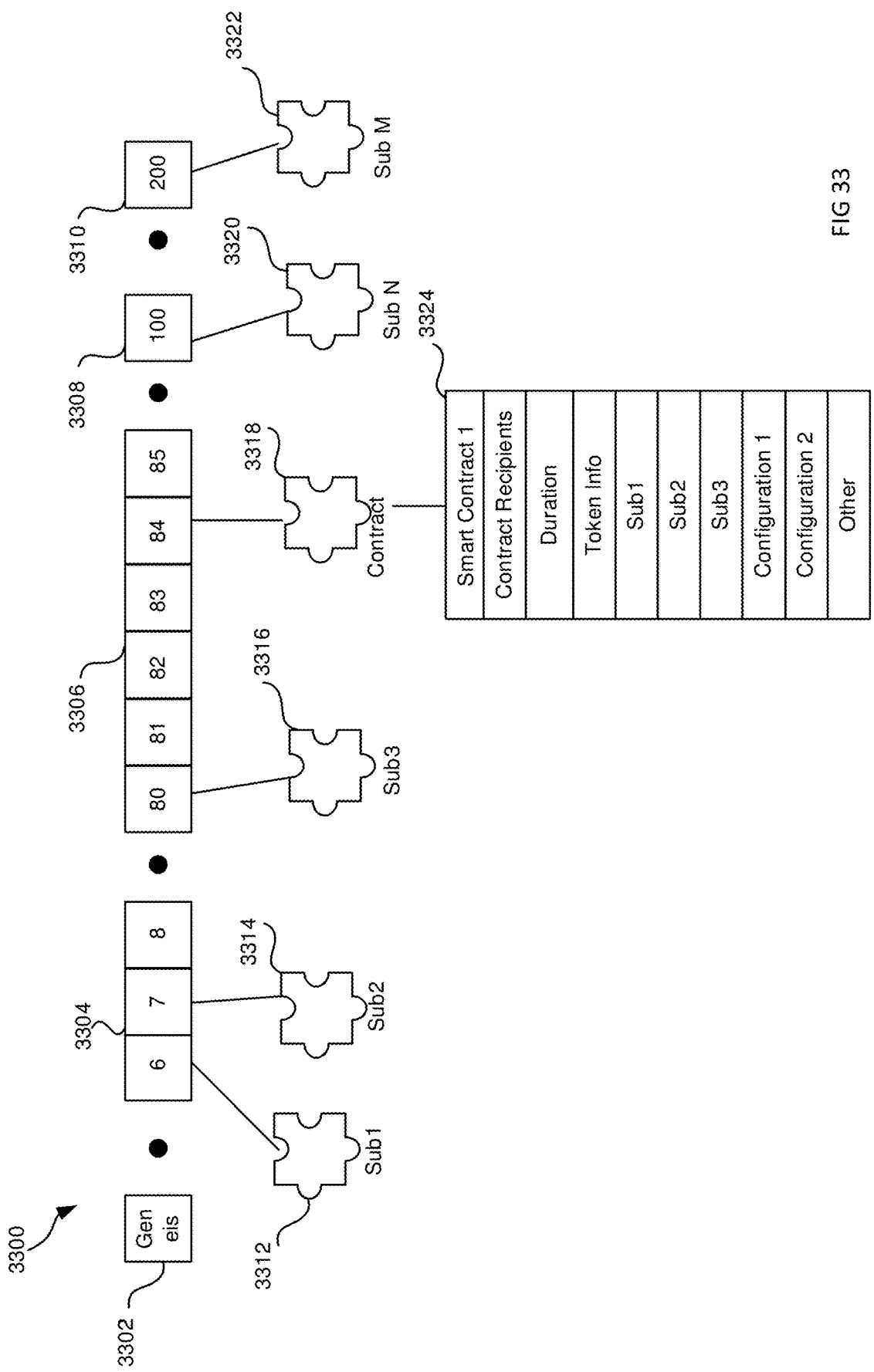
FIG. 33: This figure shows a smart contract referencing other smart contracts on a blockchain.

FIG. 33 illustrates the various components or smart contracts that can be used for providing the IoT devices software and configuration. In FIG. 33 the main smart contract 3318 references different blocks 3324 on the blockchain providing not only the location but the order in which the other smart contracts should be read to ensure proper functionality of the IoT device. In the scenario shown in FIG. 33 the main smart contract information 3224 is stored on block 84 3318. The other smart contracts referenced in 3324 include 5312, 5314, 5316, 5320 and 5322. The locations of the various smart contracts containing the master subcontract or the smart contracts where the code and configuration information is stored is used for illustrative purposes.

Figure 34:
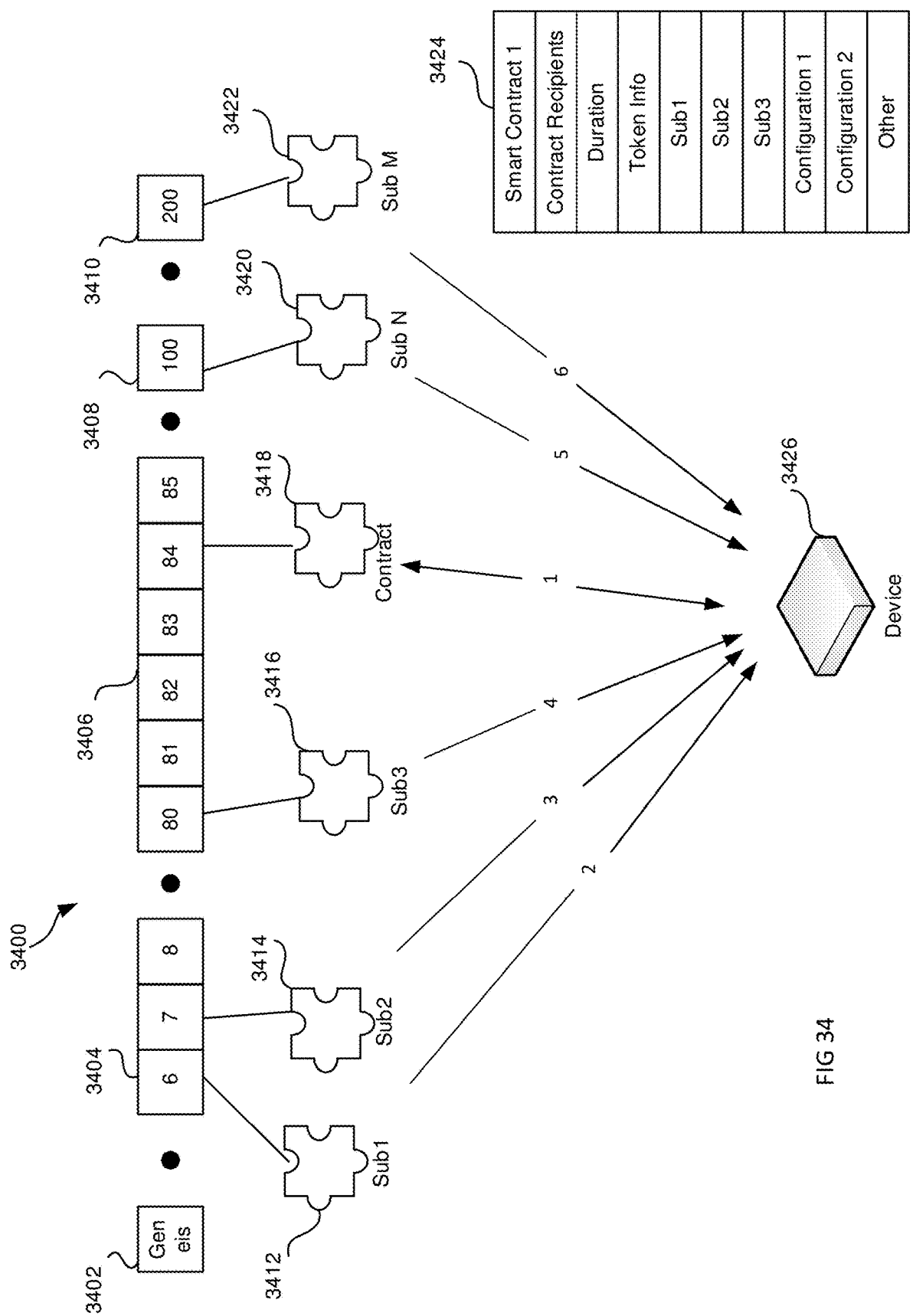
FIG. 34: This figure shows a device reading the smart contract and referenced smart contracts on a blockchain.

FIG. 34 is example of how an IoT device or node reads obtains its code and or configuration from the blockchain. The device 3426 reads the master smart contract 3418 stored on block 84 of the blockchain 3406 and is then informed of various other smart contracts to obtains the other requisite information to have the IoT device function properly. The master smart contract also defines the sequence the other smart contracts are read, or it may not.

In FIG. 34 the device 3426 upon reading the instructions from the master smart contract 3418 then reads the various smart contracts on the blockchain 3412, 3414, 3416, 3418, 3420 and 3422 The IoT device 3426 then either loads the software and or configuration from the blockchain onto the device in a defined sequence or the IoT device runs the code and configuration scripts resident on the blockchain itself. The number and location of the subcontracts referenced in this simple example is meant of illustrative purposes only.

Figure 35:
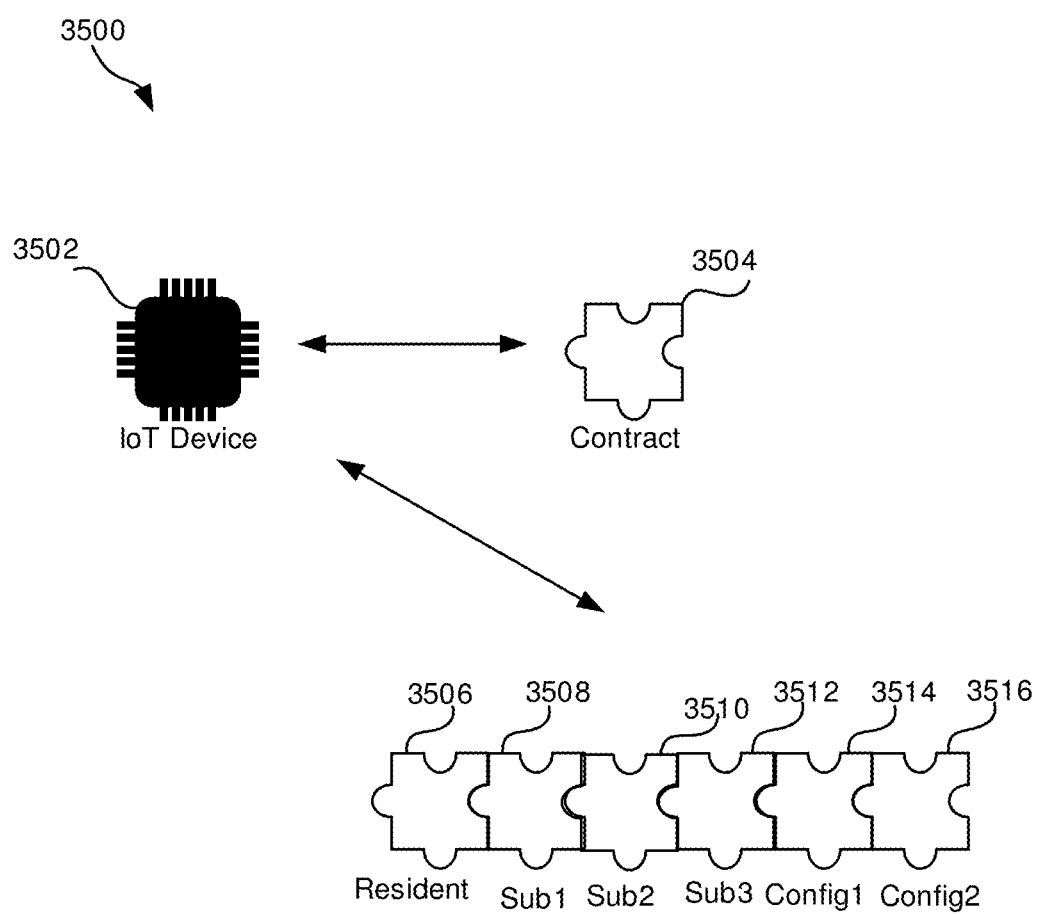
FIG. 35: This figure shows the concatenation of smart contracts for delivering software and or configuration files to an IoT device.

FIG. 35 shows and example of the functional representation of how the various components of software code and configuration scripts can fit together in an IoT device or node.

The code residing in different smart contracts located within the blockchain in FIG. 35 are brought together to form a cohesive code and configuration program that the IoT device or node can properly utilize. For instance, in FIG. 35 an IoT device 3502 reads the contract 3504 on the blockchain. The contract instructs the IoT device to obtain parts of its software code and its configuration from various smart contracts. The smart contracts are read by the IoT device in FIG. 35 the software function for the IoT device consists of the Resident 3506, Sub 1 3508, Sub 2 3510 and Sub 3 3510 while the configuration or profile information is contained in Config 1 3514 and Config 2 3516. These pieces of information are read and assembled as illustrated by the puzzle depiction where sections of the code represented by a puzzle depiction can be interchanged by removing a part of the puzzle, adding to the puzzle or swapping a puzzle part with another.

Figure 36:
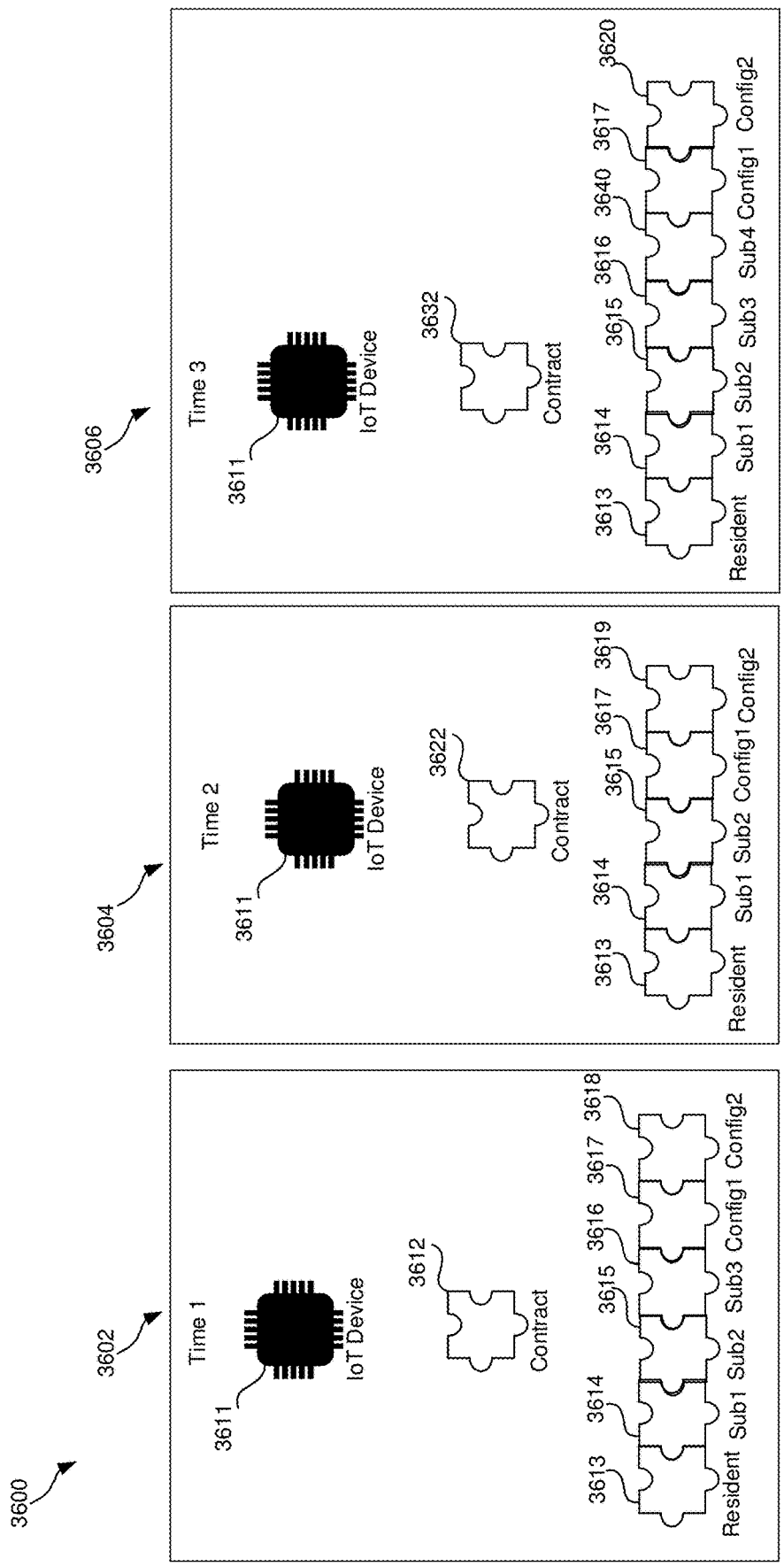
FIG. 36: This figure shows how IoT device profiles can be changed dynamically with the use of smart contracts.

FIG. 36 illustrates how the use of smart contracts can be leveraged to change the device or nodes function over time either by adding or removing software components or by altering the configuration scripts or both software and configuration changes.

Figure 60:
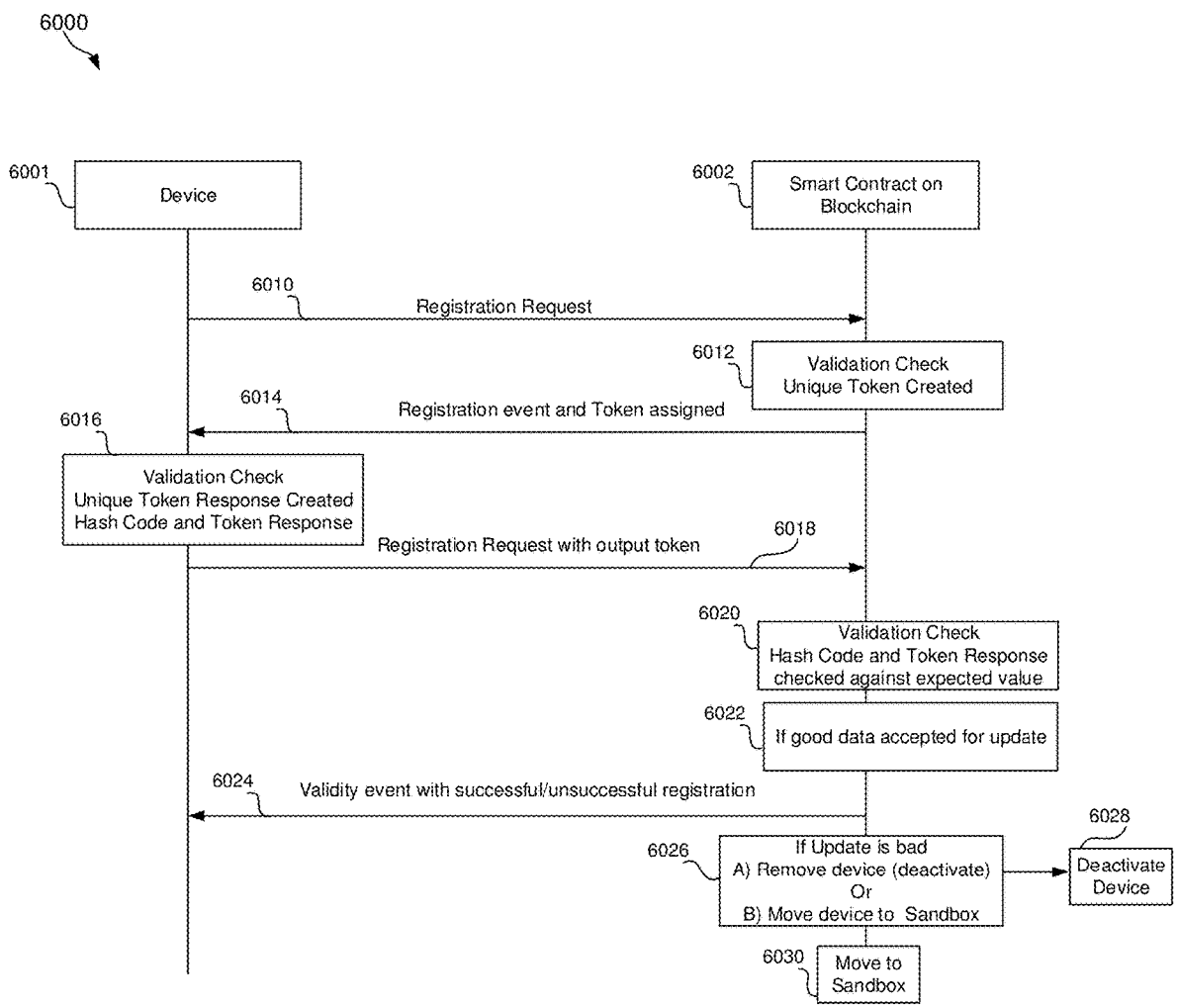
FIG. 60: This figure shows Device and or Node Registration.

For illustrative purposes the same IoT 3611 is show in three times, time 1 3602, time 2 3604 and time 3 3606 in FIG. 36. The contacts 3612, 3622 and 3632 are changed based on the time frame that is used for controlling or changing the characteristics of the IoT device itself. In FIG. 36 the IoT device 3611 is operating as desired at time 1 3602. However, it is desired to change the software functionality of the IoT device at time 2 3604. as shown in FIG. 60. At time 2 in Sub3 3616 is removed and a new config 3619 replacing 3618. At time 2 either through an updated master smart contract 3622 or time related instructions from the smart contract 3612 in time 1. Then at time 3 3606 the IoT device has its software and configuration scripts changed altering the devices function and not only is Sub 3 reinserted into the IoT device functionality an additional Sub4 3640 is also added to the IoT devices functionality as well as an updated config 3620.

Figure 37:
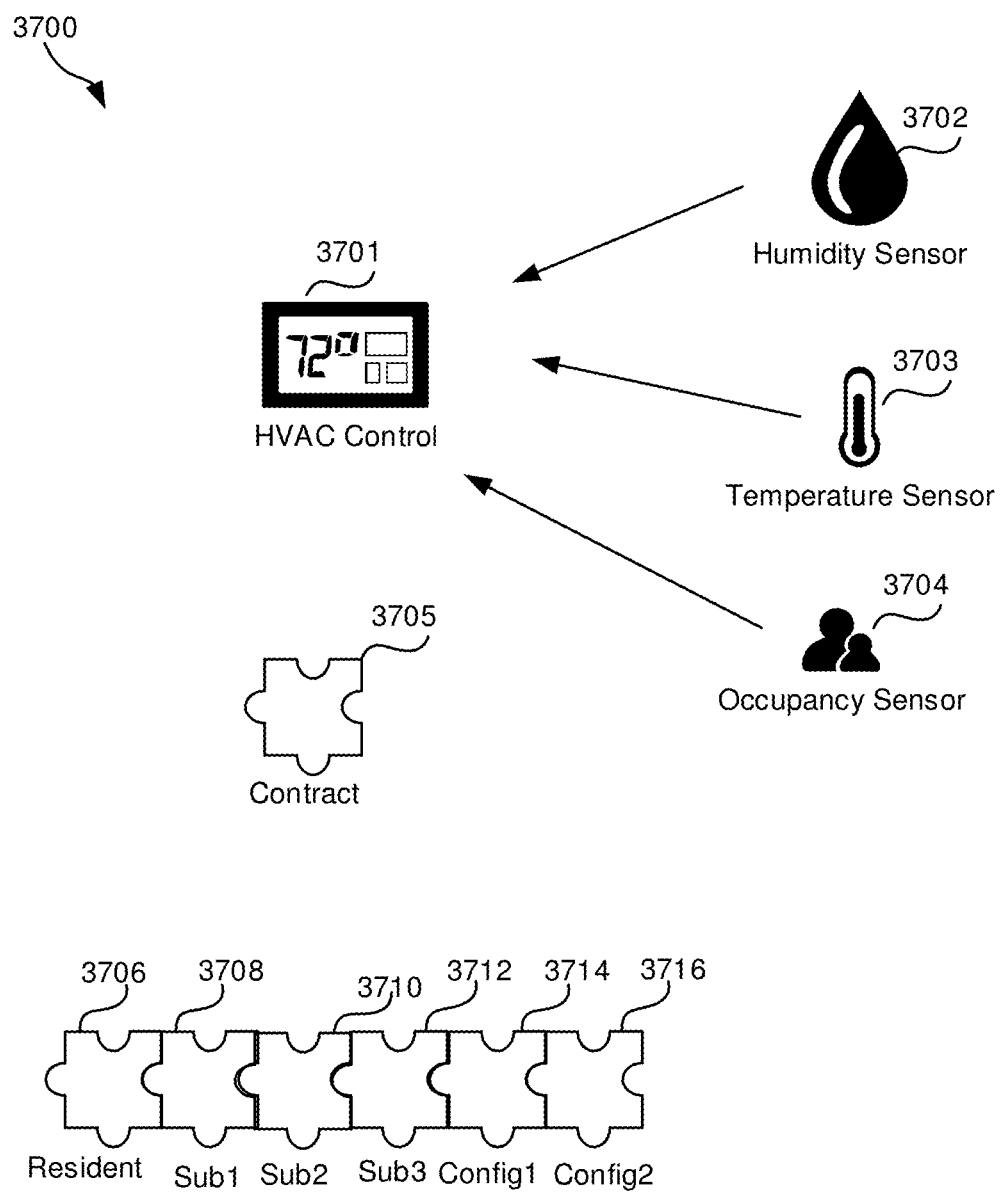
FIG. 37: This figure shows a smart HVAC Controller run off the blockchain.

FIG. 37 shows an IoT device or node that acts as a heating and air conditioner control panel, HVAC Control. The IoT device has several sensors hard wired to it though some or all could be connected by a wireless method. The operating code and the configuration script are obtained from the blockchain. As part of this process it is also possible for the device to store on the blockchain the unique configuration script for the personal settings 3716.

In FIG. 37 Sub1 3708 could be the code that controls the humidity sensor 3702. Sub 2 3710 could also be the code that controls the temperature sensor 3703 while Sub3 3712 is the code for 3704. And the Config1 3714 and Config 2 3716 are used to inform the HVAC Controller 3701 how to function with IoT sensors inputs.

Figure 38:
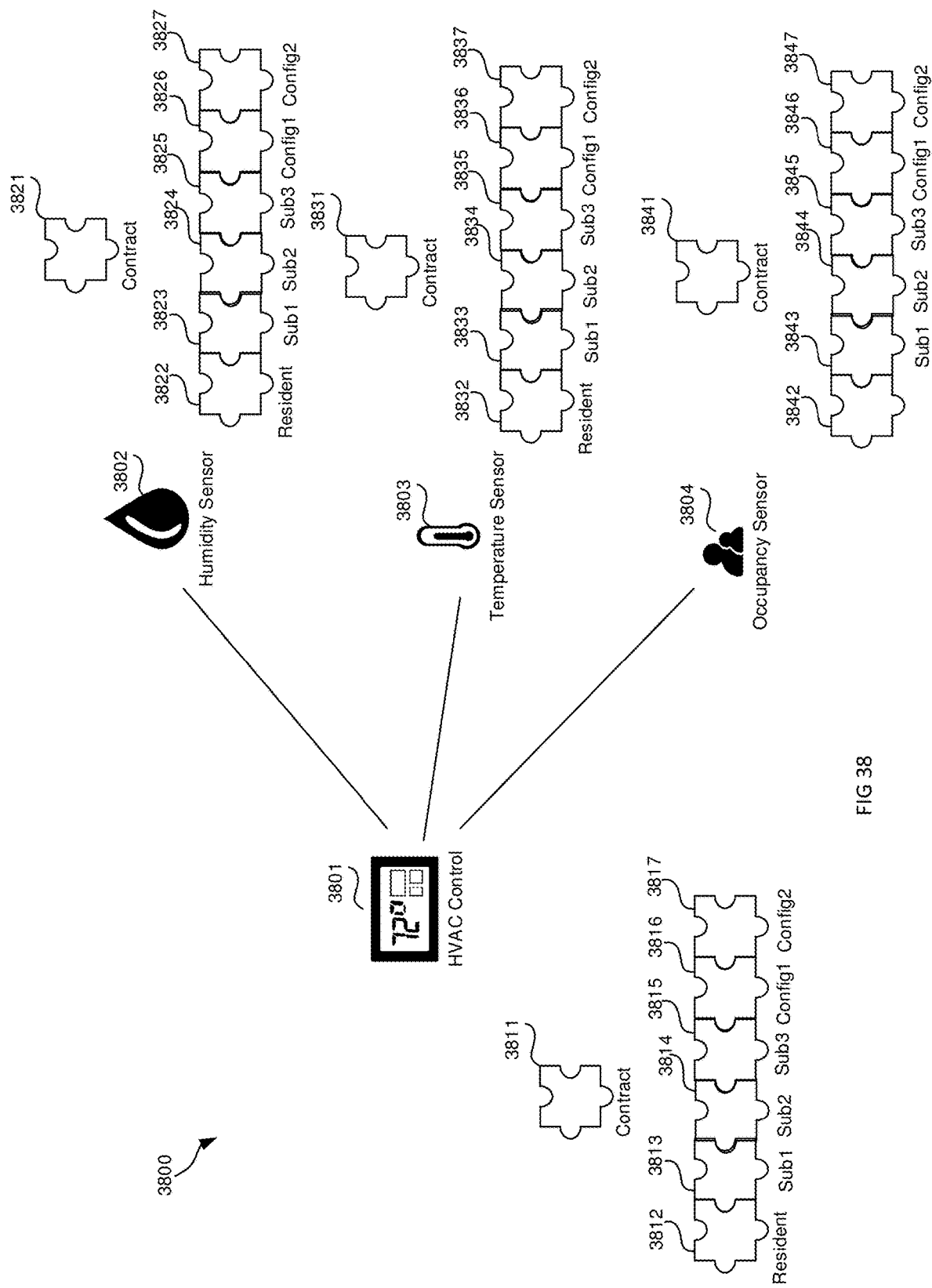
FIG. 38: This figure shows a smart HVAC Controller and smart sensors all being run off of the blockchain.

FIG. 38 shows several smart sensors 3802, 3803, and 3804 connected either by wire or wirelessly to the HVAC control 3801. FIG. 38 is similar to that shown in FIG. 37 however the sensors in FIG. 38 each gets its code and configuration from the blockchain.

In FIG. 38 the sensor devices 3802, 3803 and 3804 can be hardwired or utilize a wireless access method to communicate with the HVAC controller node or device 3801. The code and configuration information for the individual sensors can either be provided by the HVAC controller through its smart contract instructions or obtained through the HVAC controller from the blockchain itself or obtained in another method.

In one scenario for FIG. 38 the code that is run on the occupancy sensor 6204 is obtained from the blockchain. The modular nature of the software code and configuration scripts shown in FIG. 38 for any of the devices creates a future proofing network where the software and configuration scripts can be changed in the future through the blockchain therefore extending the useful life of the devices.

Figure 39:
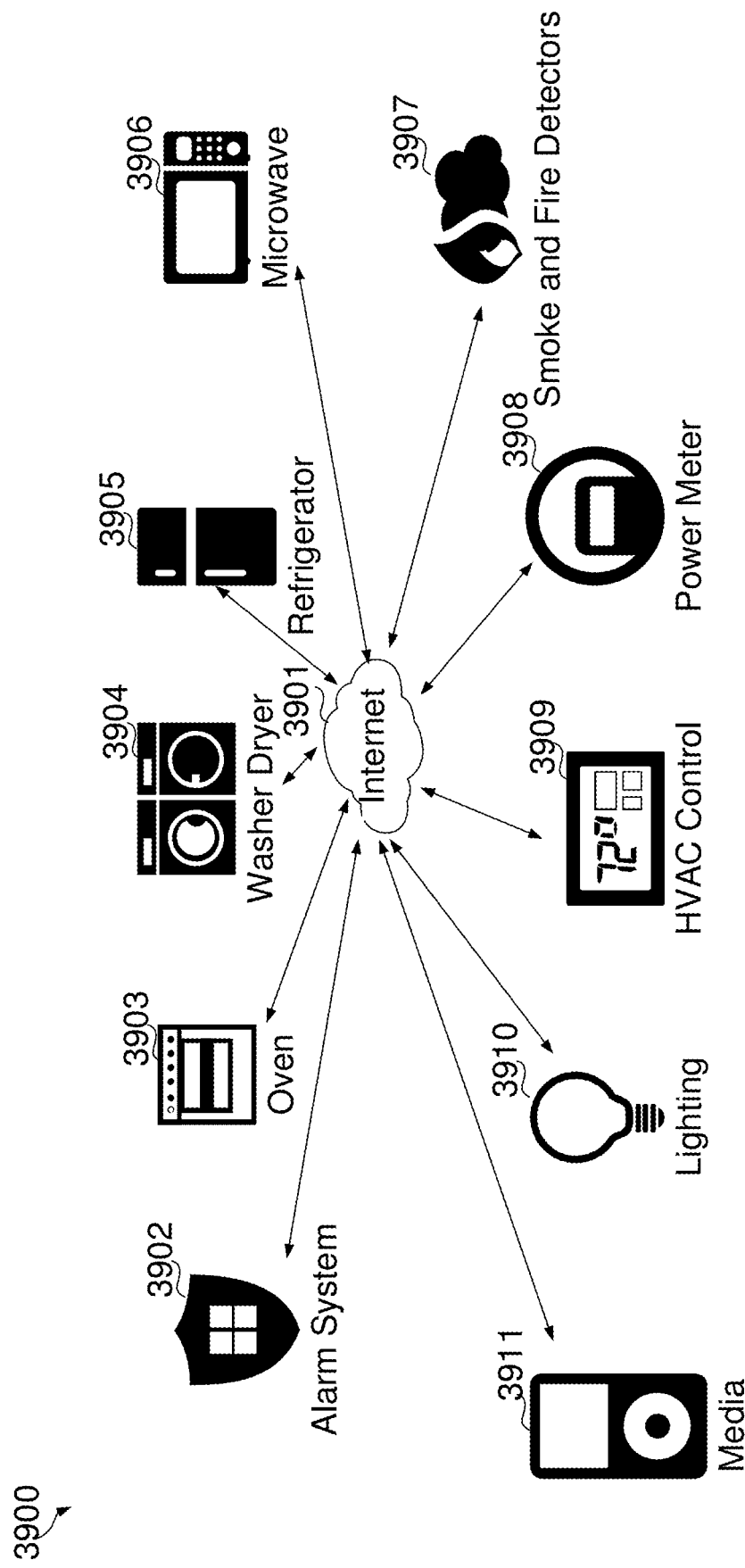
FIG. 39: This figure represents a smart home.

FIG. 39 depicts some of the components or devices that can make up a smart home 3900. Some of the devices shown in FIG. 39 include an oven 3903, washer/dryer 3904, HVAC controller 3909, media source 3911, lights 3910 and alarm system 3902. There devices shown in FIG. 39 are only representations of what can be included in a smart home, restaurant, hotel or other. Each of the devices shown in FIG. 39 can be independent of each other with each device having access to the internet 3901 and potential control by a person or entity that is not the owner of the device.

In FIG. 39 all the devices shown for this smart home scenario have connectivity to the internet and can also have connectivity to each other either via a wireless access protocol or through connectivity provided by a LAN or the internet or some other means.

In FIG. 39 the smart home devices all are autonomous or semi-autonomous where they execute their programs according the manufacturer of the device itself. The devices themselves can be compromised through malware or some other method leading to them to perform in undesired methods either by sharing data or performing some undesired function.

Figure 40:
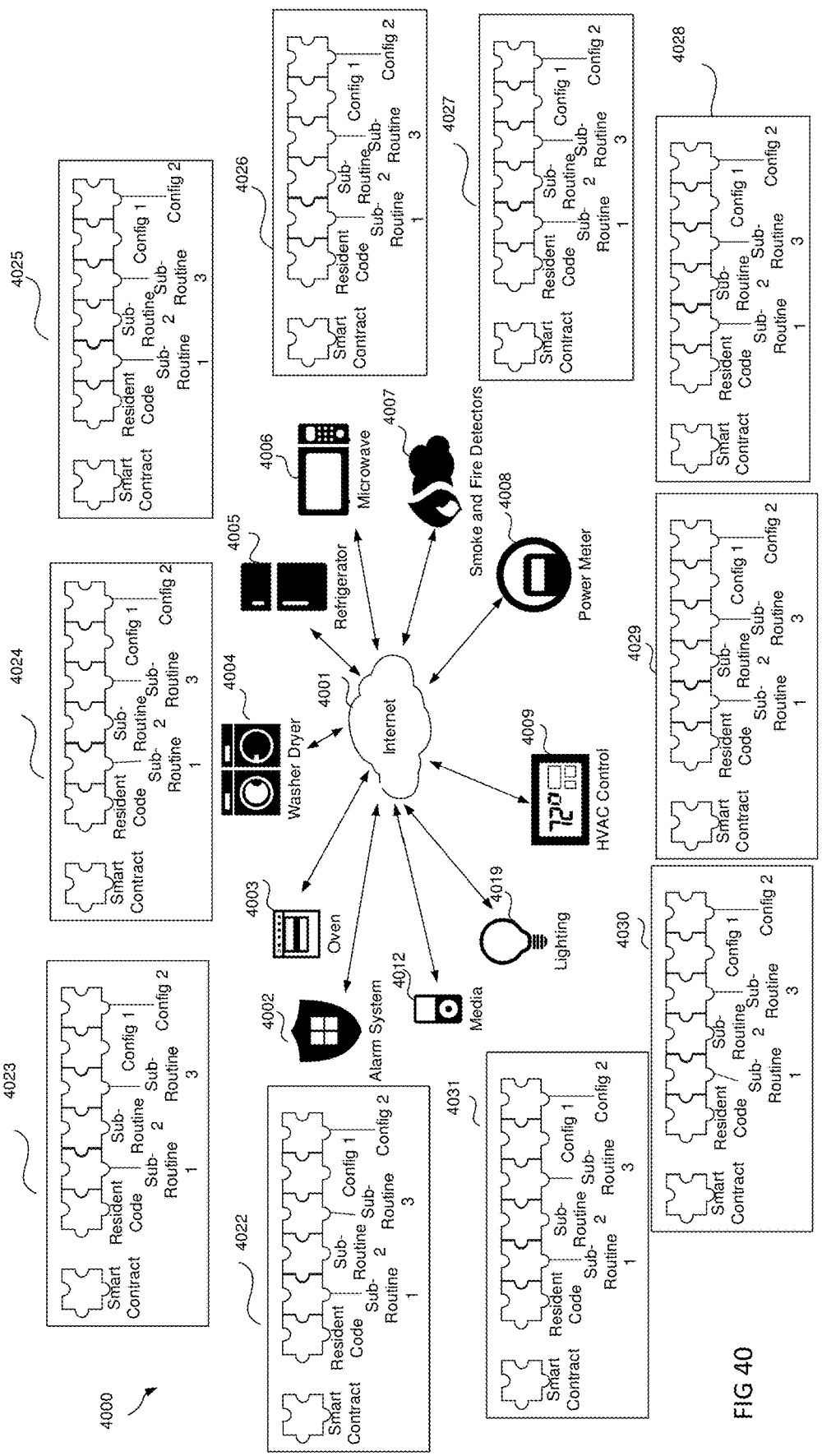
FIG. 40: This figure represents a smart home with the smart home devices being run and controlled by the blockchain.

FIG. 40 shows a smart home 4000 where the various IoT devices and or nodes all have obtained wither software and configuration scripts from the blockchain. The software code and configuration information used by the device can be either loaded onto the device from the blockchain source or run on the blockchain through use of the smart contract.

Using a single device shown in FIG. 40 as an example the refrigerators 4005 utilizes the software code and configuration scripts 4025 that are in the devices smart contract which is located on the blockchain. This ensures that the refrigerator 4005 will perform only the functions desired and also communicate with known or trusted entities as detailed in the smart contract.

In FIG. 40 the various IoT devices and or nodes can also communicate and share information between each other and other entities following a set of policy rules and functions which cannot be altered. The use of blockchain in FIG. 40 for delivering the devices software and configuration scripts prevents the introduction of malware man in the middle attacks and device misbehaviors from taking place as a result of the device being compromised.

Figure 41:
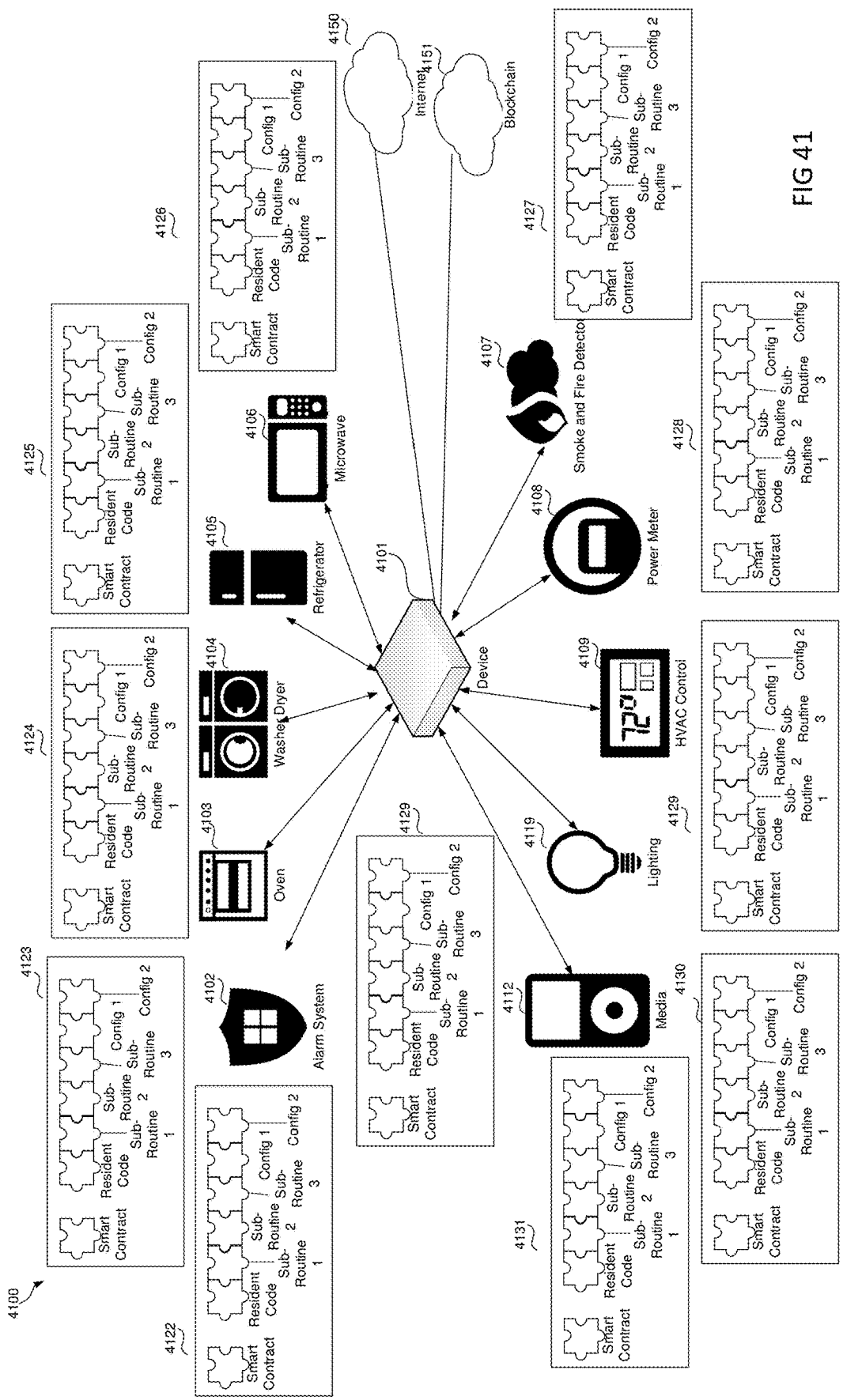
FIG. 41: This figure shows a Smart Home hub.

FIG. 41 is similar to FIG. 40 except FIG. 41 shows the use of a hub or concentration node 4101 in the smart home environment 4100. The hub provides the access to either the internet 4150 and or the blockchain 4151 for the various devices like the power meter 4108. The hub also called an IoT hub has its own software code and configuration that that it can get from the blockchain allowing it to manage the access and functionality of the various devices that are connected to it either via a wire, hardwired, or wireless. The IoT hub shown in FIG. 41 creates its own local network. The IoT hub is capable of performing edge computing to minimize the amount of data and bandwidth consumed in communicating with off net resources such as the blockchain or the internet.

Figure 42:
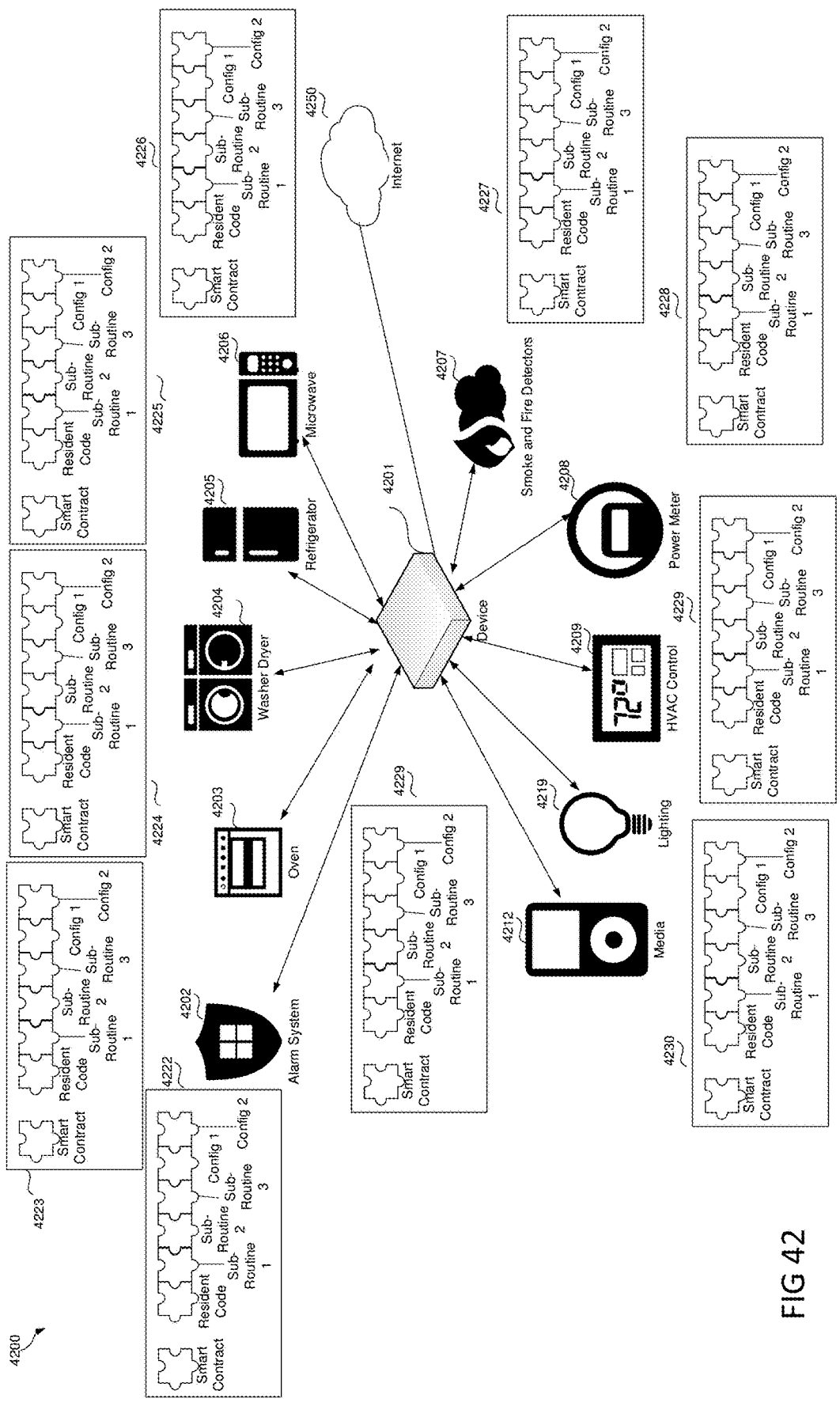
FIG. 42: This figure shows a Smart Home hub with legacy devices.

FIG. 42 a similar to the scenario as shown in FIG. 41. In FIG. 42 the inclusion of legacy and or rogue devices 4212 is introduced included. The legacy devices are included because not all devices that can be part of the smart home network ecosystem will have their software code and or configuration controlled by the blockchain. The legacy devices can present security vulnerability where a legacy device can become a bad actor as a result of purposeful manipulation, malware or any method where the device misbehaves and attempts to provide a security beachhead into the networks ecosystem as a result of the device being compromised.

The IoT hub device 4201 shown in FIG. 42 through its policy process that it has as result of the code and configuration it has 4229 manages the access the legacy device, in this case the media player 4212, has. The blockchain software run on other devices like the alarm system 4202 can prevent the media device or some other rouge device now shown in FIG. 42 from attempting to gain access to devices shown in FIG. 42. The IoT devices in FIG. 42 obtain their immutable code and configuration through smart contracts from the blockchain and therefore are protected from malware, man in the middle attacks and device misbehaviors from taking place as a result of the individual IoT devices and or nodes being compromised.

Figure 43:
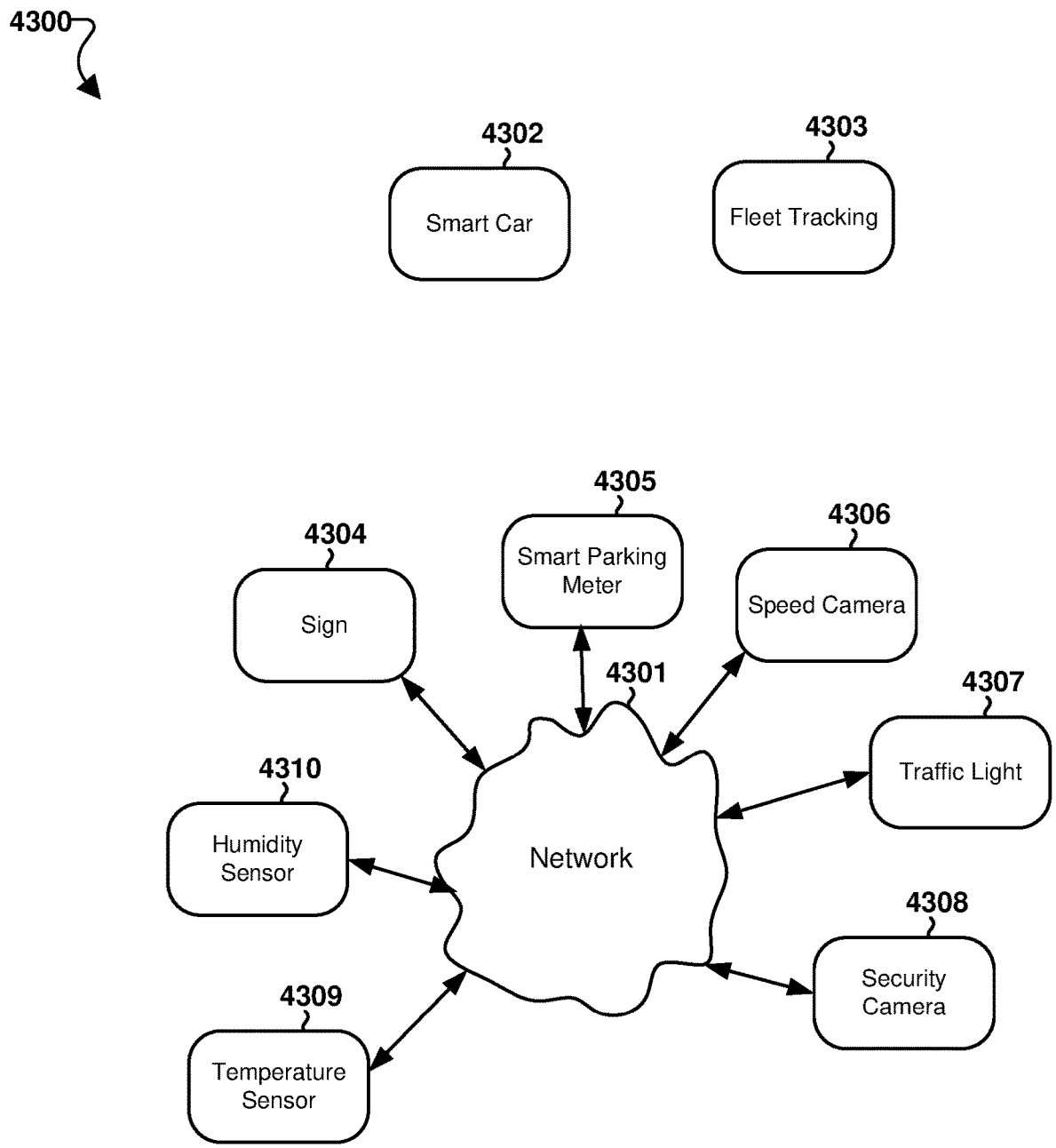
FIG. 43: This figure shows a Smart City.

FIG. 43 represents a smart city 4300 with various sensors, smart vehicles and devices that can be included. The IoT devices whether they are sensors, telemetry devices, smart vehicles or other IoT devices that are shown in FIG. 43 are representative and do not include every possible IoT device that can be used in a smart city ecosystem. Each the IoT devices shown in FIG. 43 is connected to a network 4301 that can represent anything including a private data network, the public internet or a hybrid network consisting both private and public networks. The various IoT devices shown in FIG. 43 can be connected to the network either by a wired or wireless connection.

In FIG. 43 the various IoT devices like signs 4304, temperature sensors 4309 and traffic lights 4307 all have software and configurations that detail how they function and communicate either to receive and or send data.

In FIG. 43 the various IoT devices all communicate either to some central system or systems that are represented by the network 4301. In this scenario there is a possibility for an IoT device to be compromised and begin performing undesired functions either from malware, man in the middle attacks, device misbehaviors taking place as a result of the individual nodes and or devices being compromised, or something else.

Figure 44:
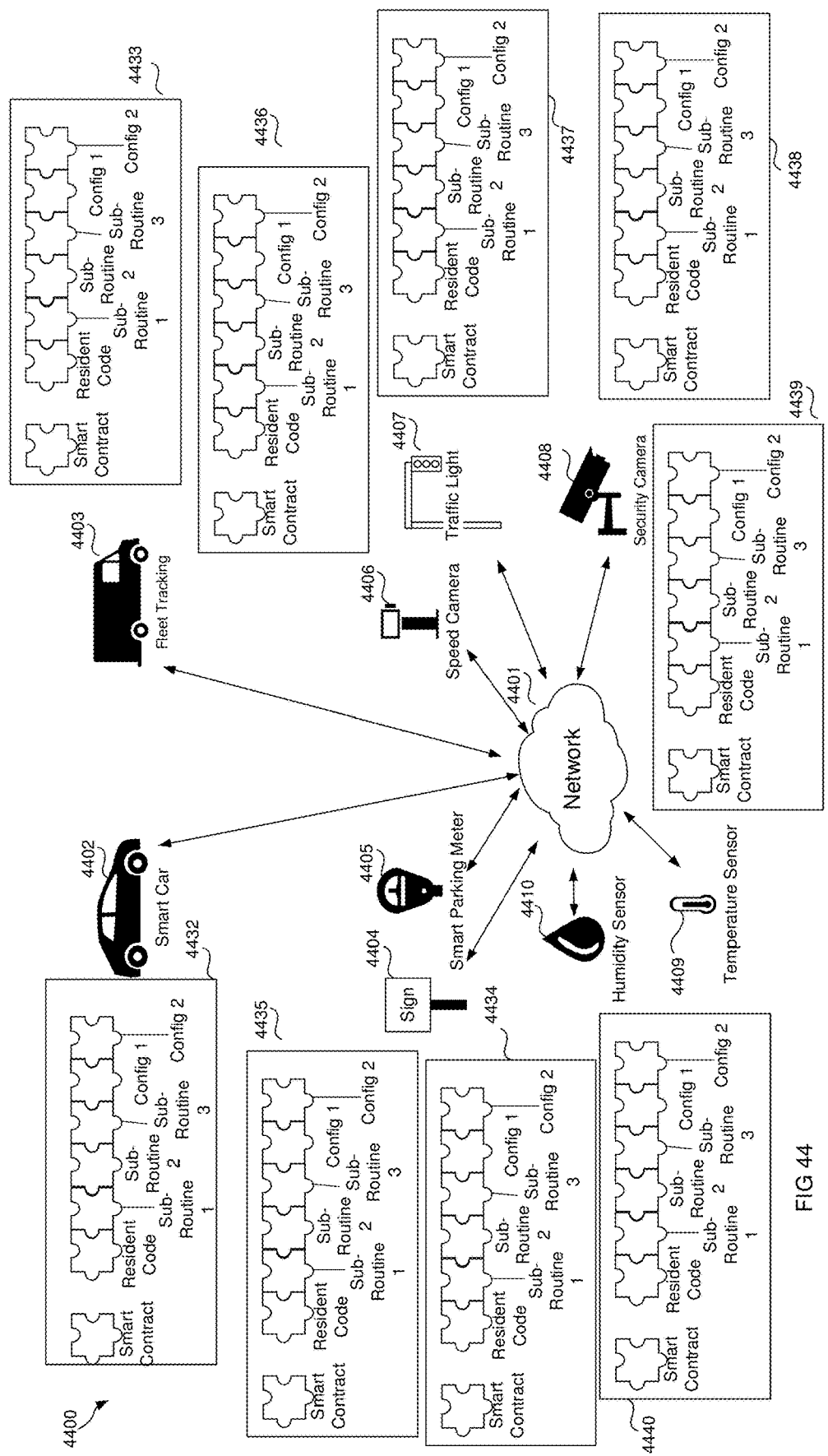
FIG. 44: This figure represents a smart city with the smart city devices being run and controlled by the blockchain.

In FIG. 44 the various IoT devices including smart vehicles that make up the smart city ecosystem 4400 have their software and configuration scripts delivered by or run on the blockchain. For brevity street sign 4404 has its code and configuration 4434 obtained from the blockchain.

Additionally, any telemetry updates provided by the devices is validated by the blockchain method through the zero-trust environment. When a push command or rather a desire to evoke a change to the devices state is needed like changing the traffic signal from green to red the blockchain smart contract is used to validate the devices software code and configuration integrity ensuring that it performs as desired and protected from malware, man in the middle attacks and device misbehaviors from taking place as a result of the individual nodes and or devices being compromised.

The software code and configuration check are done with every communication in a zero-trust environment.

In FIG. 44 a smart vehicle 4402 or 4403 can communicate or obtain information like position location or other key information from a street sign 4434. The amount of trust that can associated with the information obtained by the smart vehicle from the street sign is enhanced due to the use of the blockchain where the devices are protected from being compromised. If the IoT device however is compromised it is removed from the network or depending on its function is flagged for being potentially compromised. In this case the street sign 4434 is not allowed to be communicating with the smart vehicles because there is a problem detected with 4434 therefore improving the security ecosystem that smart vehicles will utilize in a smart city environment.

Additionally, in FIG. 44 by having the software code and configuration files provided by the smart contract will prevent a device from being comprised and then act as a source of either spam, control entry point for bad actors, or other undesired results. The devices based on their configuration files can also have a list of devices that they are allowed to communicate with, if any, and the conditions upon which the communication can take place along with the type of information. By having a zero trust and tightly coupled device ecosystem with immutable software provides a level of security and integrity that is desired for constrained and unconstrained devices within the desired ecosystem.

Figure 45:
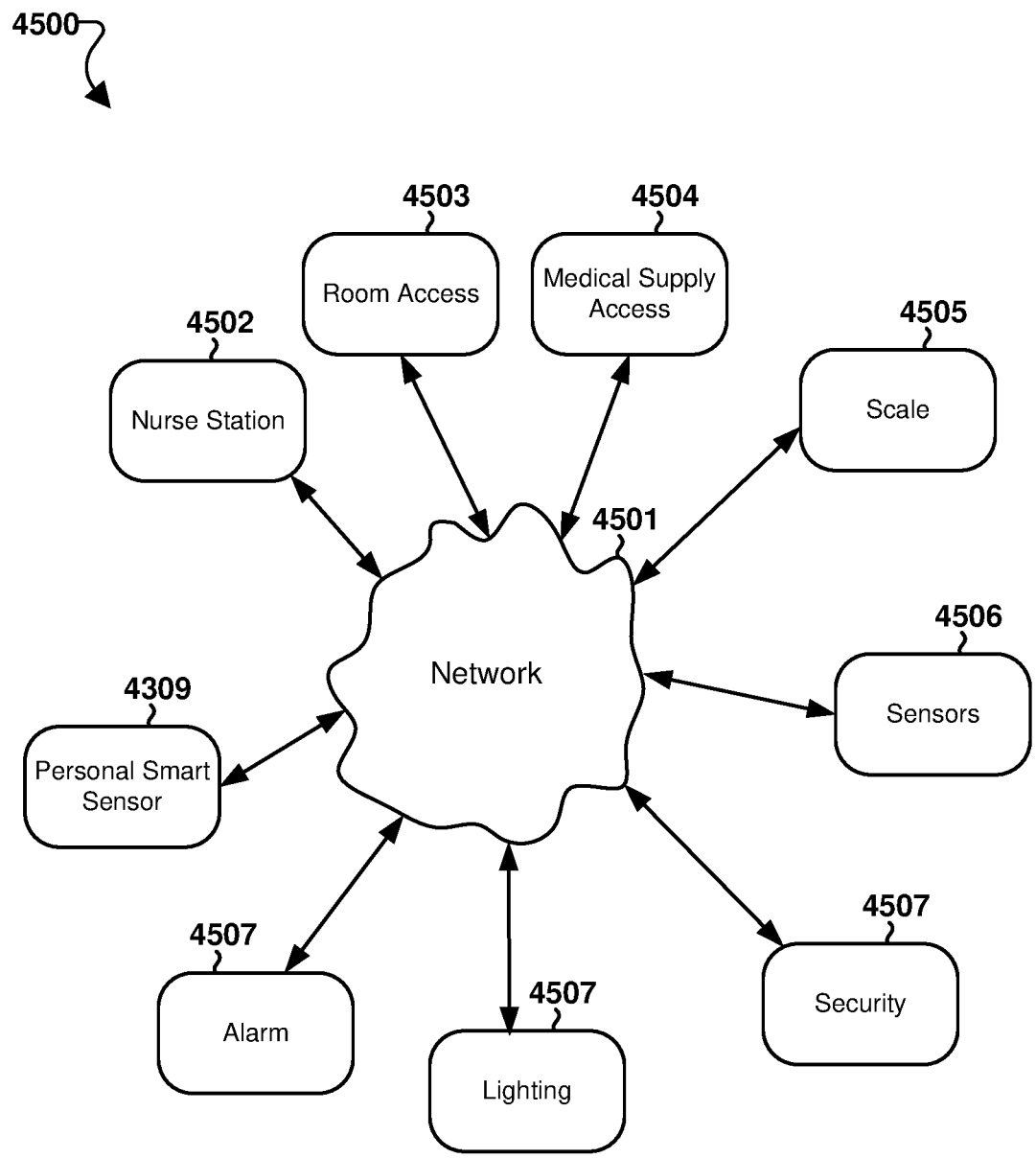
FIG. 45: This figure shows a health care facility.
Figure 46:
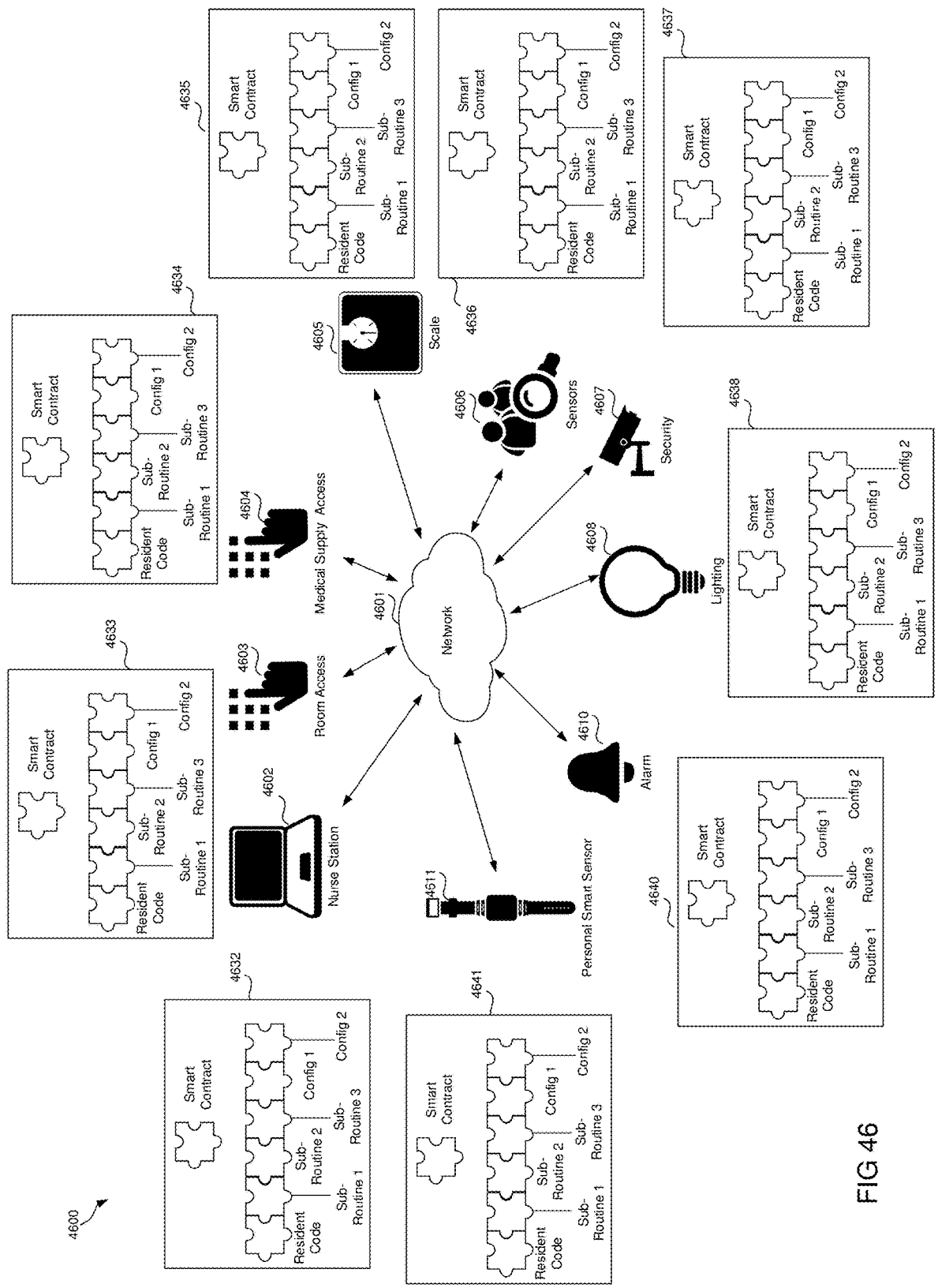
FIG. 46: This figure represents a health care facility with various IoT devices being run and controlled by the blockchain.

FIG. 45 is one possible scenario for a health care system 4500 that may be used for a nursing home, retirement home, or other health care facility. In this example the use of several access restrictions 4403 and 4404, alarms 4410, monitoring devices 4411 and 4406 and nurse stations 4402 are all connected through a network 4401 of some type. The IoT devices in 4400 also have the potential to communicate directly between each other in a device to device communication method. There is the unfortunate possibility of having a device compromised either enabling it though inserted code or external control for gaining access to medical supplies or reporting incorrect monitoring data or even causing a device to malfunction can take place due to the proliferation of devices and their diverse ecosystem of software.

To ensure that the devices are operating properly, and that unwanted access has not taken place in the health care environment 4500 that may be used for a nursing home, retirement home, or other health care facility FIG. 45 represents the various IoT devices having their software and configuration scripts obtained from the blockchain. The blockchain software run on other device can prevent the media device or some other rouge device, both not shown, from attempting to gain access to those devices due to compromising the code and configuration running on the individual nodes and or devices.

For example, the medical supply access 4504 obtains its policies, configuration and or operating code from the blockchain. As previously discussed, the smart contract used to define the medical access supply provides a zero-trust environment and every time access is obtained it is validated. However, personnel changes as well as rules change from time to time and the ability to provide an updated configuration to the medial supply access terminal is important. By having the medical supply access software code and or configuration defined by the blockchain this prevents compromises from taking place and also enables an enhanced level of compliance verification and assurance to a highly regulated industry.

The proliferation of Software Defined Networks (SDN) and the ever-increasing need for edge computing while revolutionary also presents itself with some unique security issues. The need to ensure that edge devices are secure as well as verifying that their configuration has not been altered is very important. The ability to protect edge devices becomes more important and complex as more and more network functions are pushed to the edge of the network to improve service delivery though edge computing increased the amount of attack vectors possible for a device or devices to be compromised. The use of blockchain smart contracts for this very purpose can be used to help ensure that the edge device integrity is maintained as well as the communication channel between the devices is uncompromised.

Figure 47:
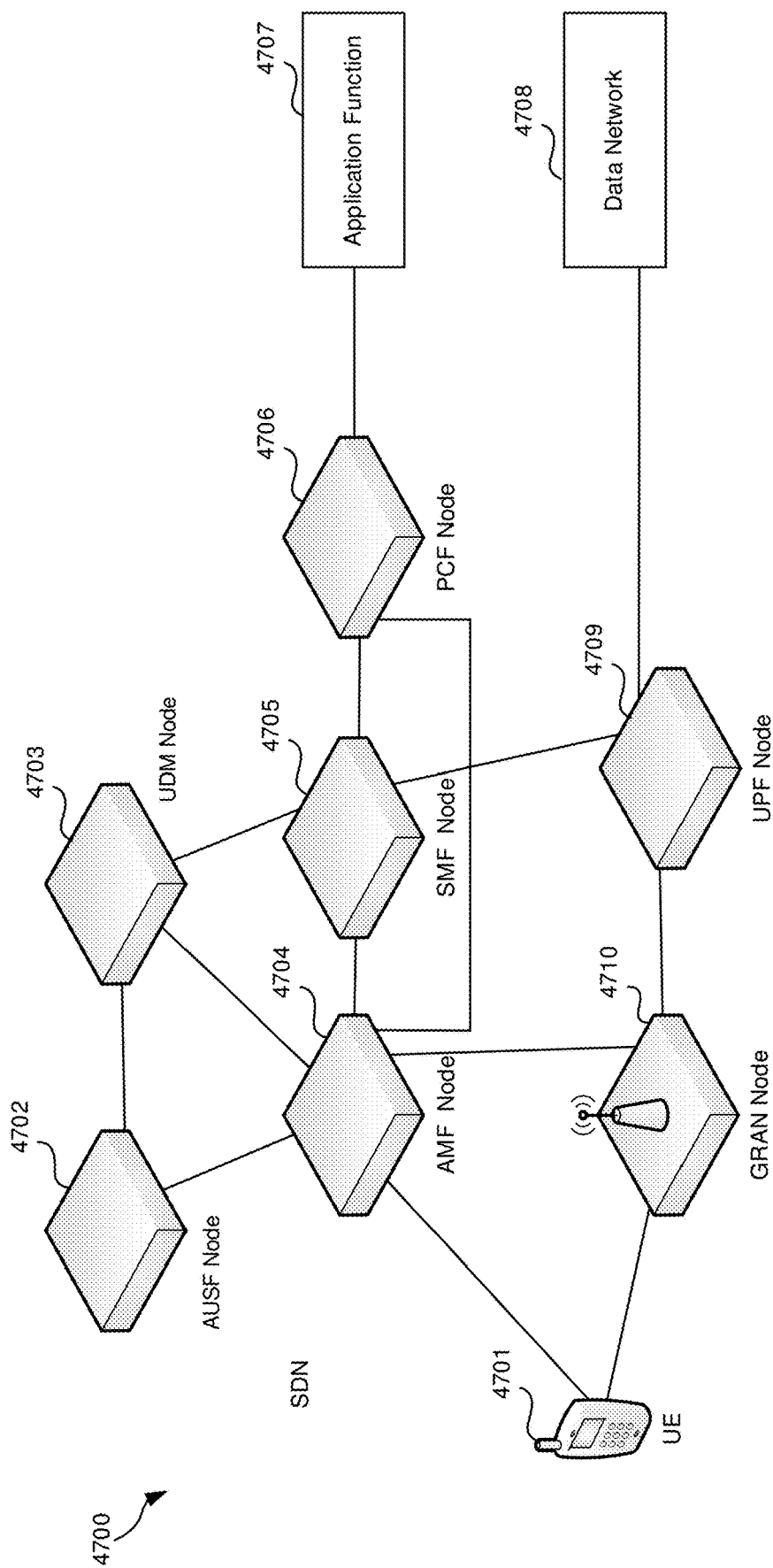
FIG. 47: This figure shows a 5G SDN Network.

FIG. 47 is an illustration of a software defined network (SDN). Components shown in FIG. 47 are representational only showing a 5G wireless network 4700. In a 5G network the GRAN Node 4710 and the User Equipment (UE) 4701 are typically stationed at the edge of the network and have edge computing capability. The potential to have these devices compromised is possible due to their potential placement in unsecured environments. Additionally, nodes like the PCF Node 4706 has its own unique software and configuration files that are different than the SMF Node 4705 or other nodes. However as shown in FIG. 47 the PCF node communicates with other entities like the Application Function 4707. The 5G SDN network is a distributed network and is such open to potential compromises as well from unwanted actors or code.

5G networks are envisioned to be virtual networks where their functionality is all driven by code and configuration scripts. The use of the blockchain to deliver or manage the various software code and or configuration of the 5G network nodes provides a level of security preventing malware, man in the middle attacks and device misbehaviors from taking place as a result of the individual nodes and or devices being compromised.

Figure 48:
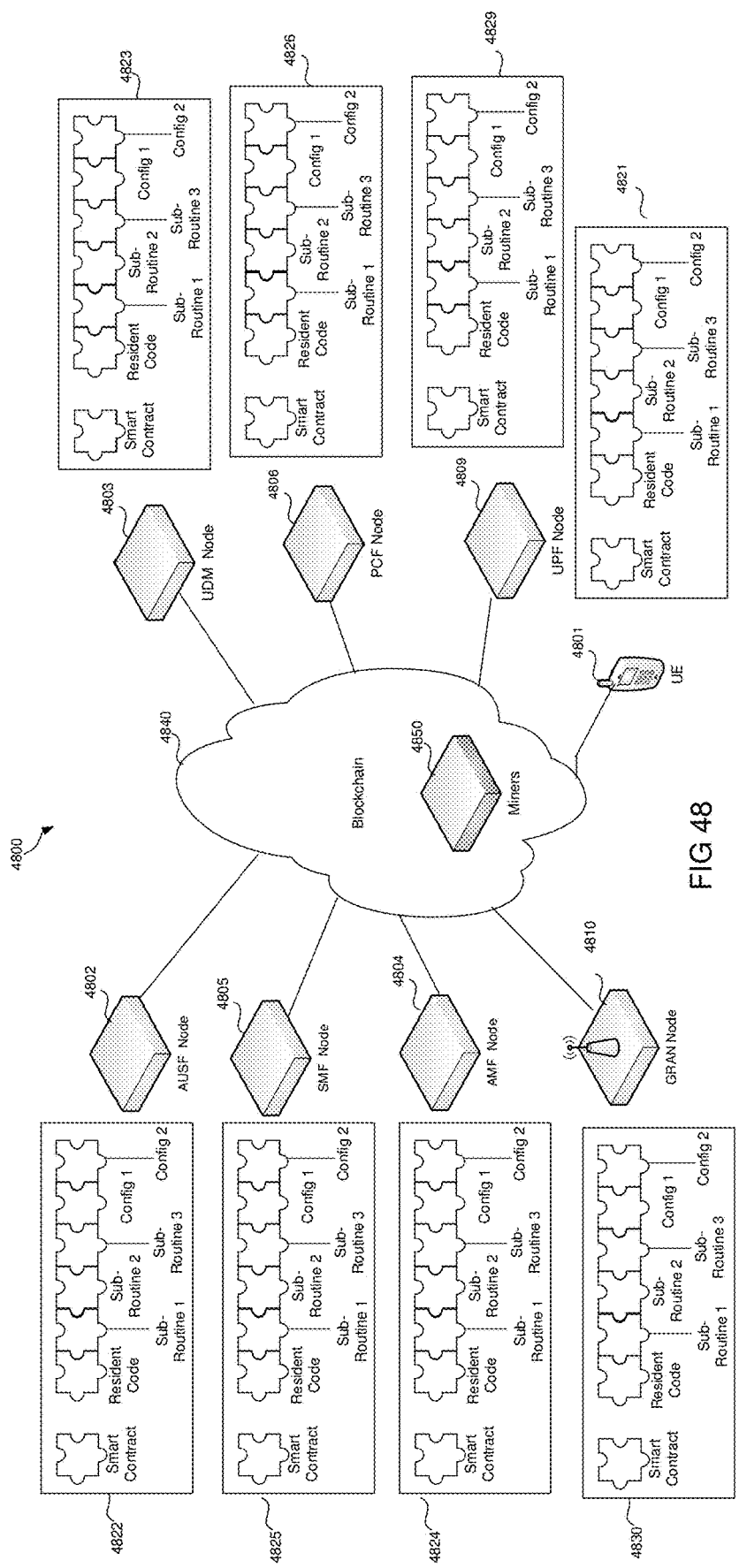
FIG. 48: This figure shows a 5G SDN Network being run and configured through the blockchain.

FIG. 48 is one method of how various elements of a 5G SDN network can obtain their software and or configuration scripts from the blockchain 4840. For example, the GRAN Node 4810 obtains its software and or configuration from the smart contract instructions 4830. The blockchain shown in FIG. 48 can be a private blockchain, public blockchain, consortium or hybrid blockchain.

Figure 49:
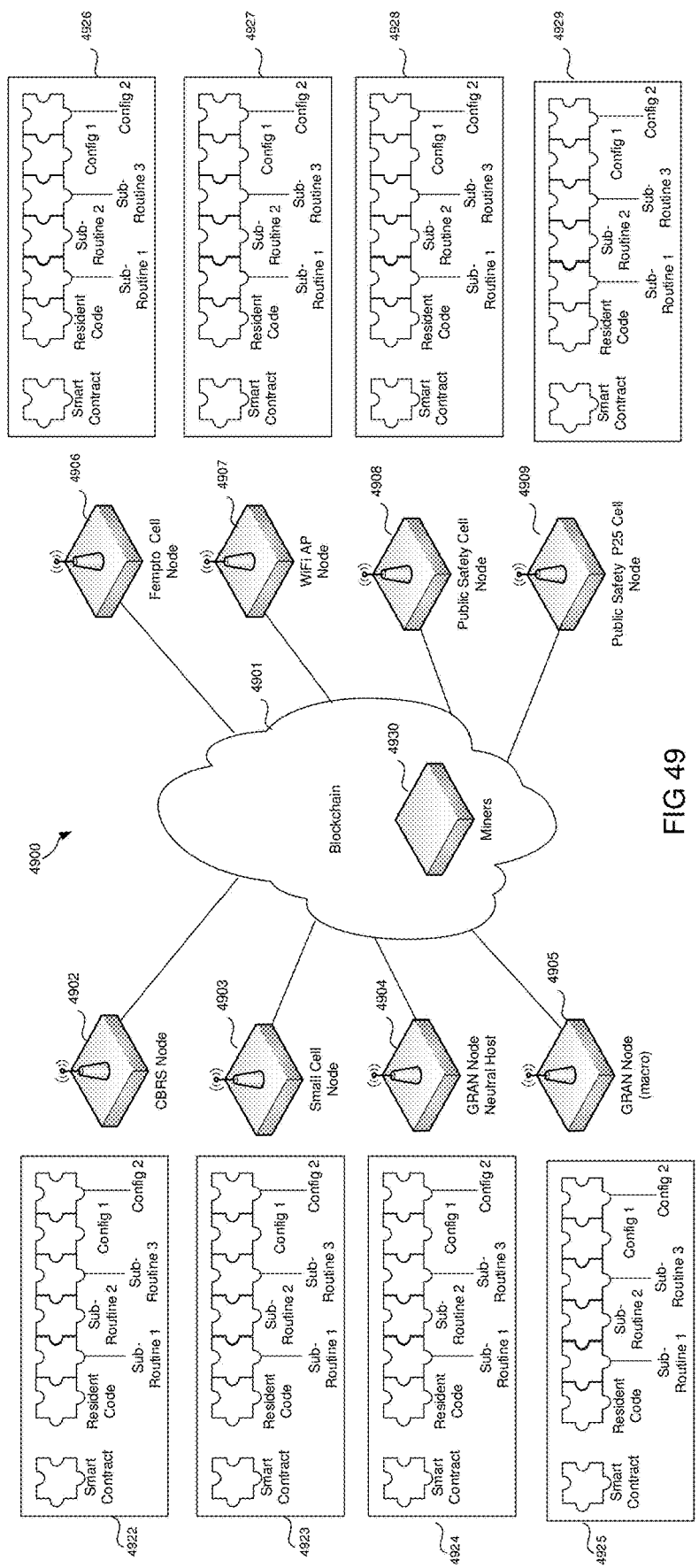
FIG. 49: This figure shows elements of an SDN Network being run and configured through the blockchain.

FIG. 49 shows various edge components of a 5G or SDN network like a CBRS Node 4902 or a Small Cell Node 4903. In FIG. 49 the software and or configuration scripts can be obtained from the blockchain 4901. By using the blockchain for SDN and edge nodes the integrity of the devices can be maintained even in limited access or devices in the wild where they are placed or operate in an unsecure environment that can foster compromises taking place.

The use of having the software and or configuration scripts for devices is not limited to 5G or IoT devices. The use of the blockchain smart contracts for delivering and providing a verifiable method for device integrity also applies to traditional devices that can reside in wired or wireless network. Some of those devices can include a CBRS cell site 4902, 5G cell (GRAN) 4905, Public Safety cell site 4908, fempto cell 4906, WiFI AP 4907, and others.

Figure 50:
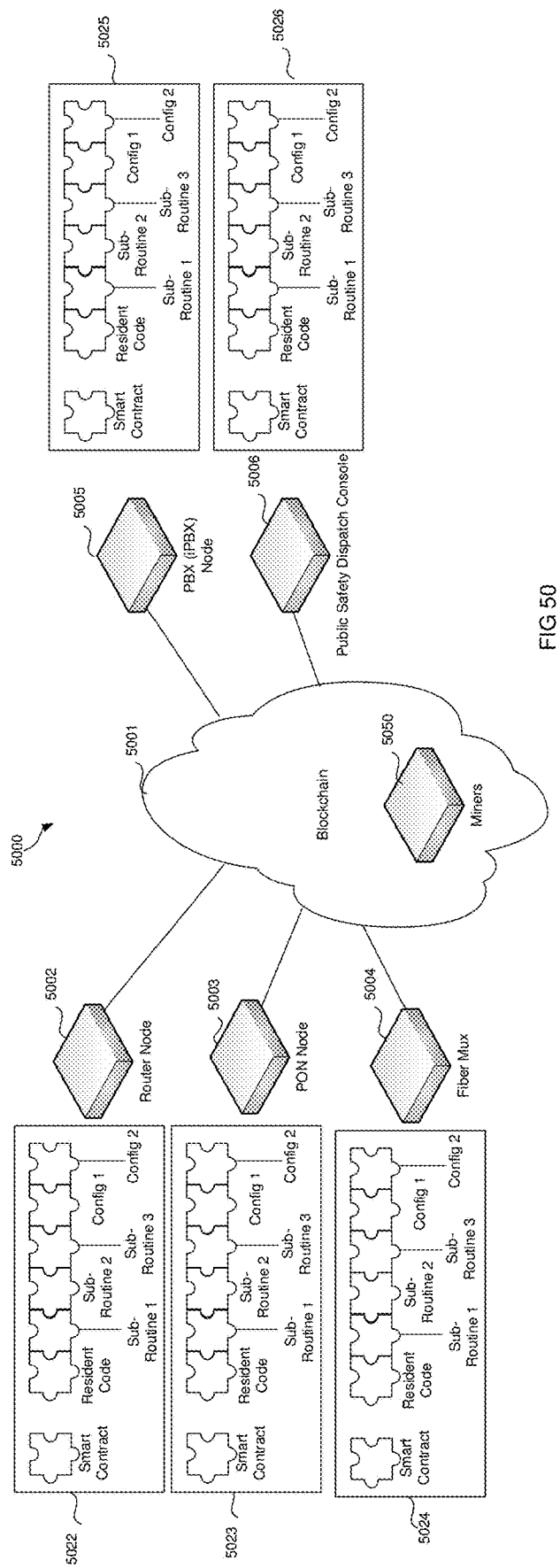
FIG. 50: This figure shows Telecommunications Network elements being run and configured through the blockchain.

FIG. 50 represents some devices 5000 that are normally associated with a wired network as being able to utilize the blockchain 5001 smart contact method 5022 5023 2024 5025 5026 for device management and integrity. The devices in 5000 could also be connected to the blockchain by a wireless or combination of wired and wireless. Some of those devices can include routers, smart switches, PON 5003, Fiber Mux 5004, PBX and iPBX's 5005 and Public Safety dispatch consoles 5006 are just some examples of where the method of providing the software and or configuration through the blockchain to protect the devices and nodes from being compromised and performing in an unwanted method.

Figure 51:
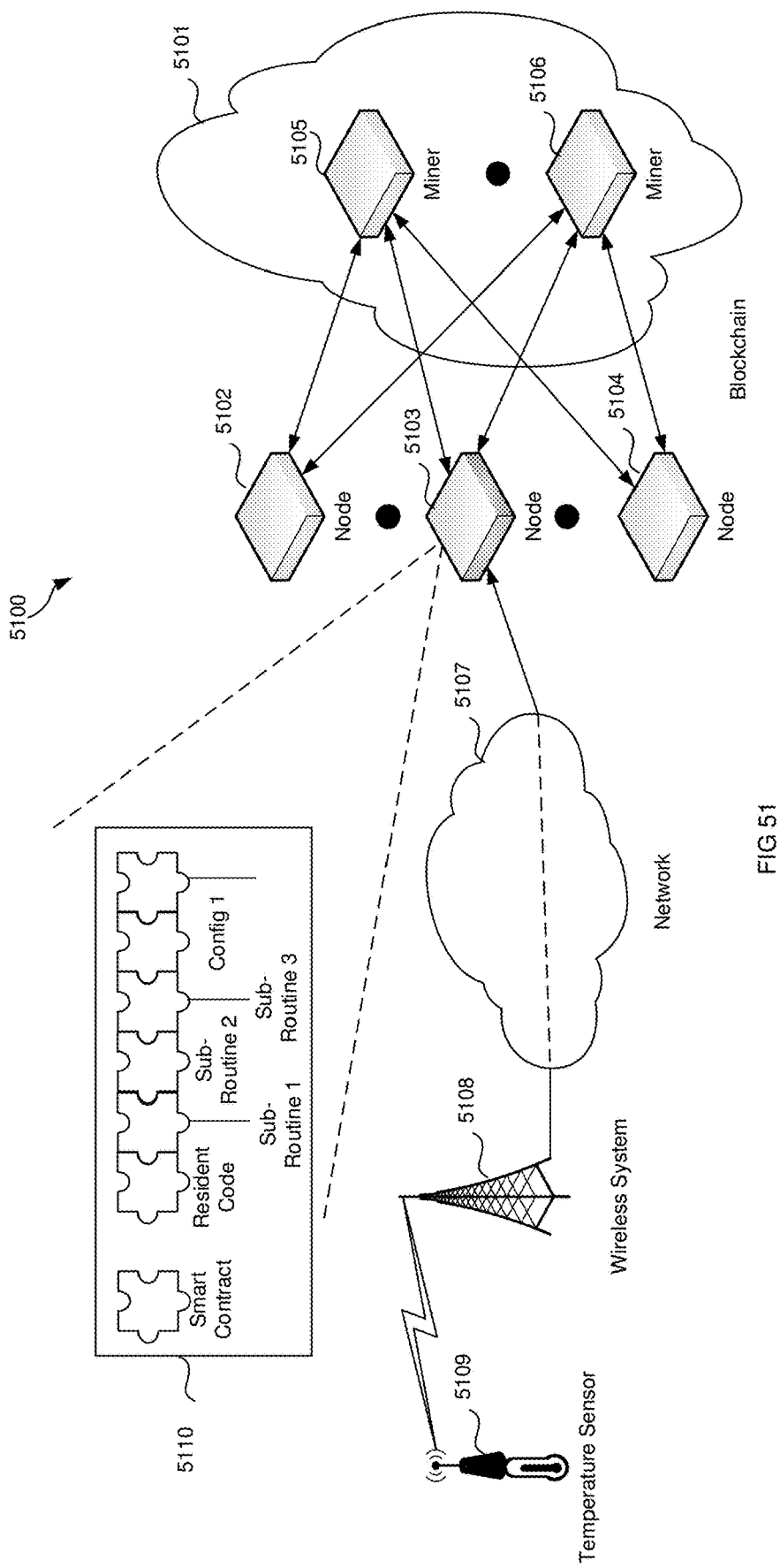
FIG. 51: This figure shows a temperature sensor being run and configured through the blockchain.

For many legacy IoT devices and other devices cannot afford the ability to have code run on them or any significant code associated with them locally because they can be constrained due to resources like CPU, memory, or some other thing. Therefore FIG. 51 represents a scenario 5100 where a sensor 5109 provides telemetry data to a node or device 5103 that is not local. In this depiction that node is remote and is utilizing a wireless system 5108 to deliver the telemetry content to the node 5103. The wireless connectivity can utilize any wireless technology that is applicable based on the connectivity needs or availability.

In FIG. 51 the temperature sensor 5109 sends it telemetry data to the node 5103. The node is utilizing the software code and or configuration scripts 5110 provided through use of the blockchain. The node using its software culls the telemetry data according to its policy and programming. The telemetry data when applicable is then written to the blockchain 5105 5106 or passed to another network 5101 or device if desired.

Figure 52:
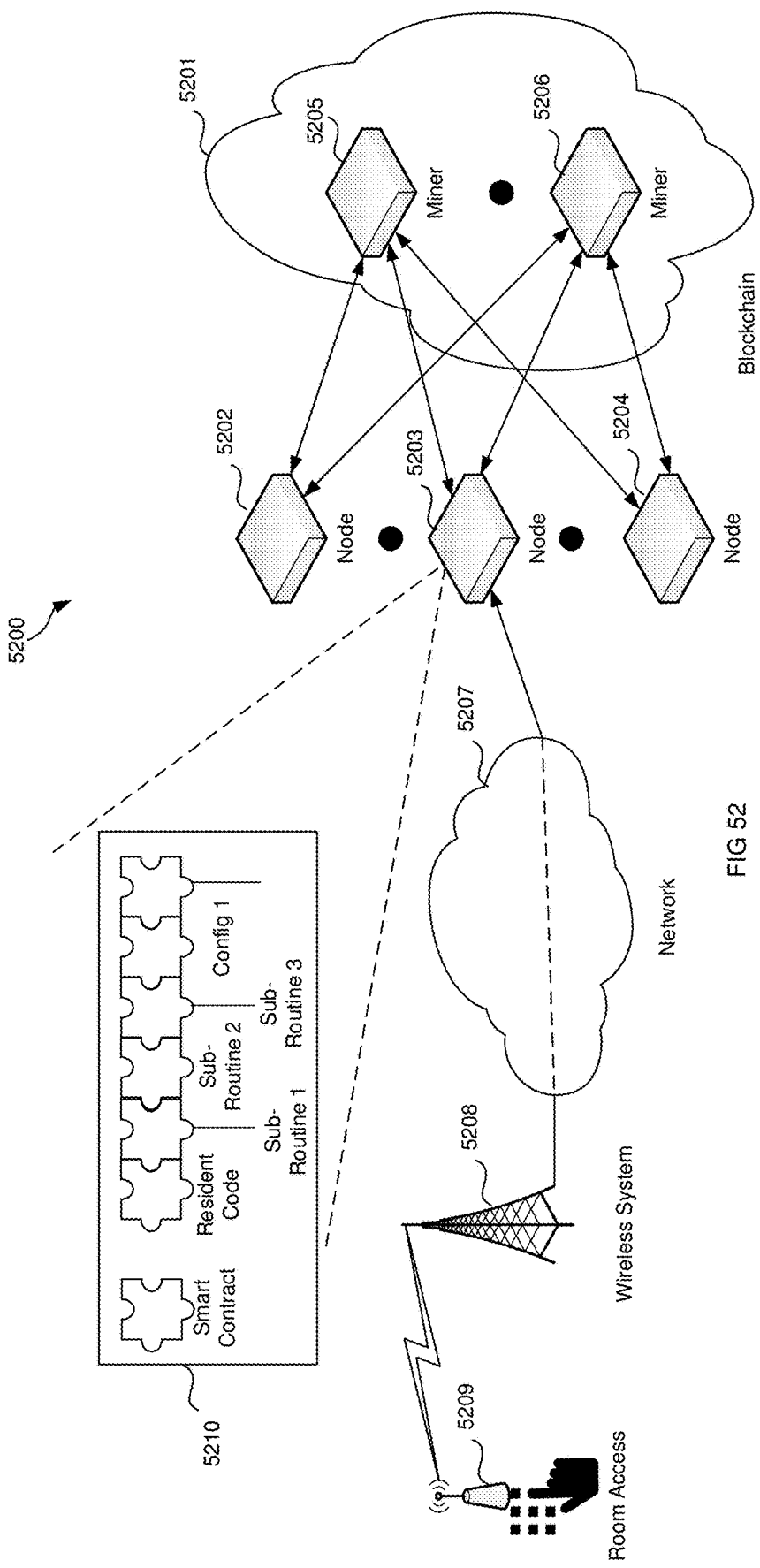
FIG. 52: This figure shows a room access device being run and configured through the blockchain.

FIG. 52 is similar to FIG. 51 except FIG. 52 shows an IoT device that is an access granting device 5209. In the example shown in 5200 the access granting device could be a door entry room access device. In FIG. 52 when the keys on the access pad is pressed the sequence, they entered is sent from the device 5209 sends to the node 5203 via wireless connectivity through some wireless system 5208. The wireless system then is able to provide the telemetry to the node 5203 for potential action.

The node 5203 in FIG. 52 is utilizing code obtained from the smart contract 5219 on the blockchain 5201. Depending on the rules and or policies resident in the node 5203 the node can issue to the door access device the command to open it. This method is unique in that the code to conduct this function is obtained from the smart contract and can utilize a zero-trust environment.

Figure 53:
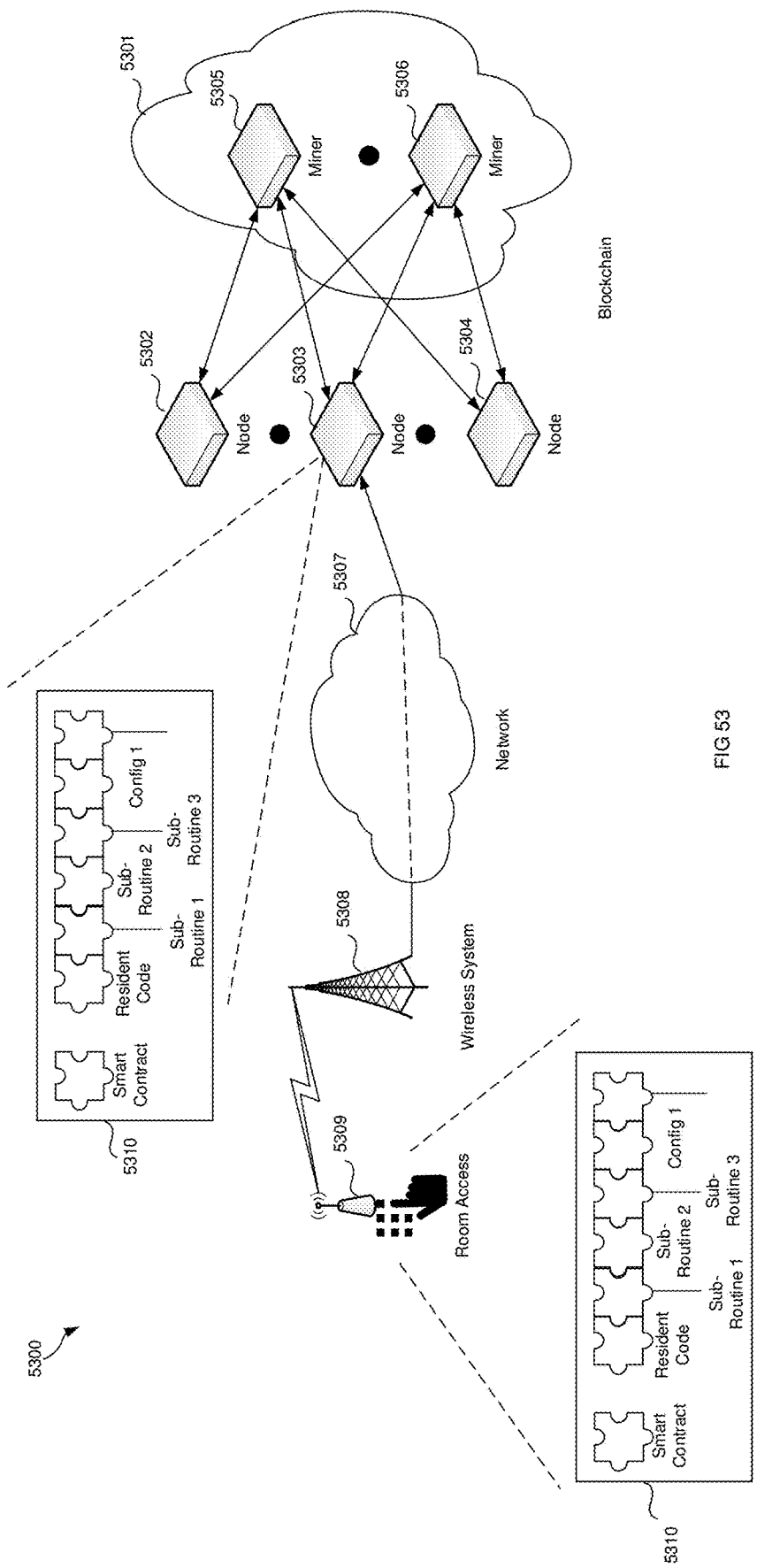
FIG. 53: This figure shows a room access device being run and configured through the blockchain.

FIG. 53 is similar to FIG. 52 with the exception that the code 5310 to operate the entry device 5309 is obtained from the smart contact method via the blockchain 5301. When the keys are pressed, and the sequence entered the device 5309 can grant or deny access based on the code and configuration 5310 that it has using a zero-trust environment. The device 5309 can also send the access request information to the node 5303 via wireless connectivity through some wireless system 5308. The wireless system then is able to forward the telemetry from the room access device 5309 to the node 5303

By providing the software and or configuration scripts 5310 for the smart entry device 5309 the potential to have the device at edge of the network from being compromised by malware or other software methods is negated.

Figure 54:
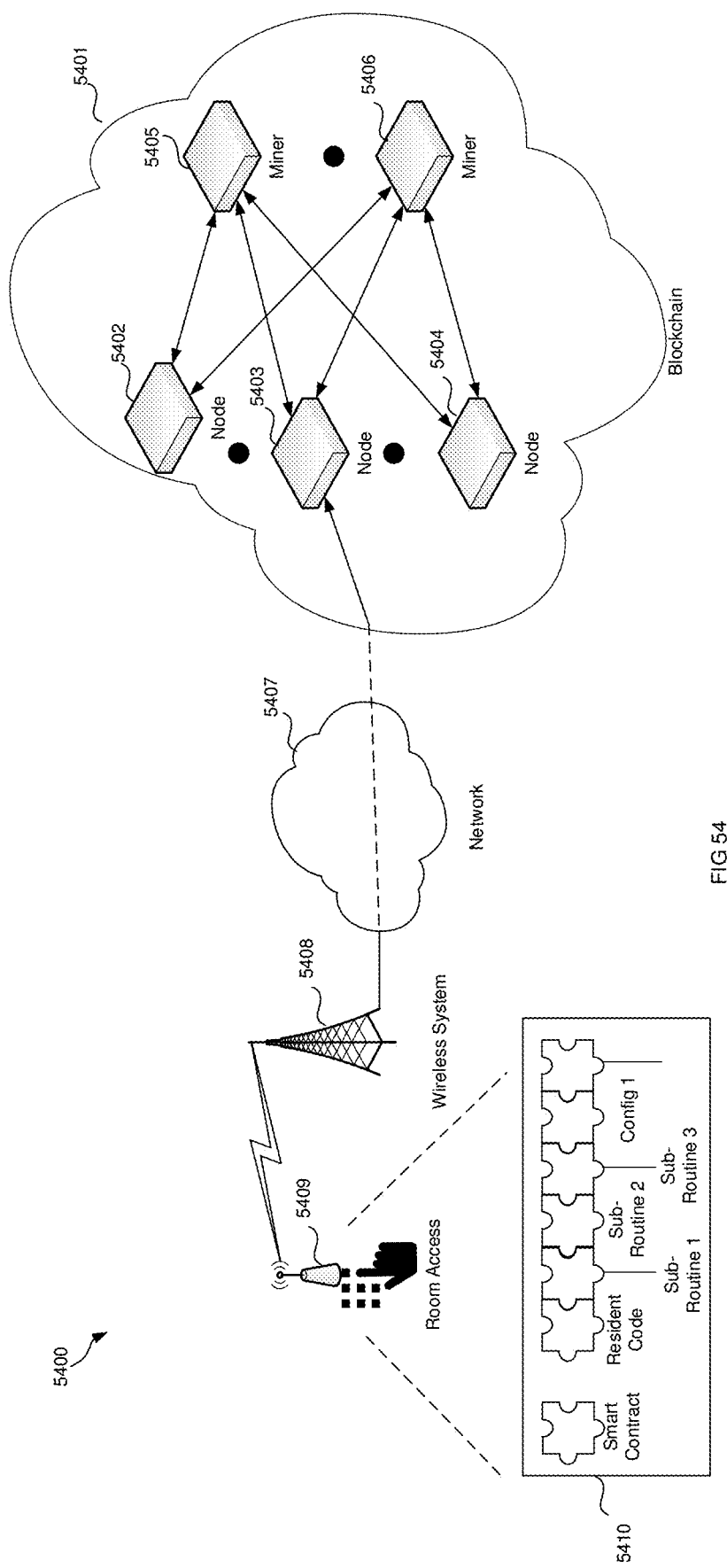
FIG. 54: This figure shows a room access device being run and configured through the blockchain.

FIG. 54 is another possible scenario of using smart contracts from a blockchain for IoT devices with a room access method 5409. The room access device 5409 is now operating as a node in the blockchain 5401. The connectivity between the room access device 5409 and the blockchain 5401 is done via a wireless network 5408 which could also be a wired connection of a combination of wireless and wired connections.

The node's 5409 software and or configuration scripts 5410 are obtained from the smart contract method previous described. By having the entry device act as a node, itself on the blockchain provides another level of integrity for the edge device.

Figure 55:
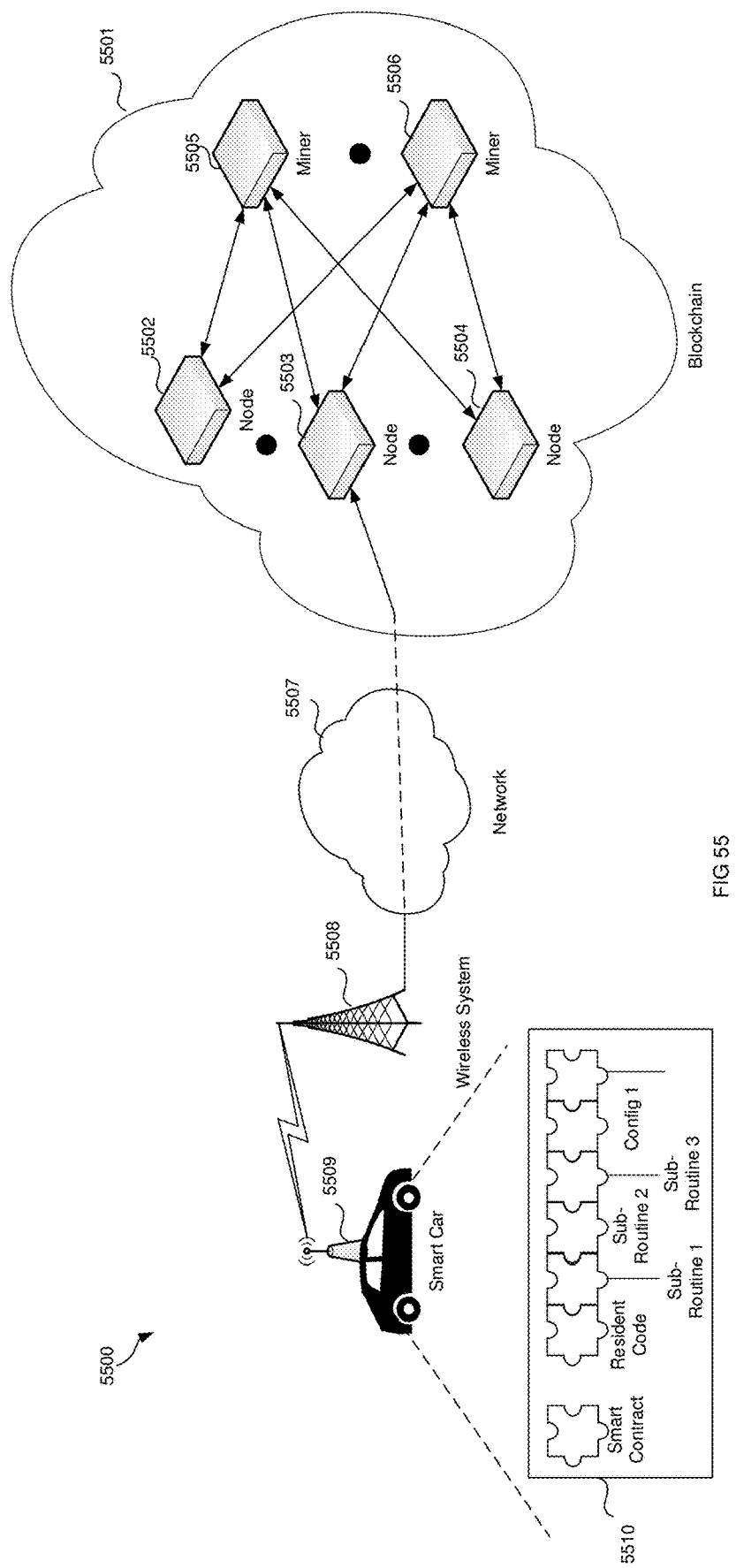
FIG. 55: This figure shows a smart vehicle being run and configured through the blockchain.

FIG. 55 is an example of how a smart vehicle can utilize the blockchain to obtain its software and or configuration. In the scenario shown in 5500 the smart car 5509 is able to obtain its software and or configuration information from the blockchain 5501. However, in a smart vehicle here are numerous computers and separate programs that make up the entire smart car ecosystem. Therefore, the example shown in FIG. 55 can be for a particular module within a smart car or all the modules within a smart car.

The smart car 5509 in FIG. 55 is connected to the blockchain by a wireless network 5508 which then is connected to the blockchain 5501. The smart car can also be a node 5503 on the blockchain or one of its modules can be a node on the blockchain facilitating the dissemination of secure software and or configuration information.

The smart car shown in FIG. 55 can also receive telemetry from a variety of other devices that are typically associated with a smart city concept shown in FIG. 55. The wireless connection 5503 scan also be used to communicate with another smart vehicle for passing along secure information as shown in FIG. 44. The smart contract 5510 in FIG. 55 provides a method for the smart vehicle to obtain and utilize rules and other policy decisions dictating what and where the smart vehicle can communicate with either to receive telemetry or send telemetry. The information sent and received from the smart vehicle can also include streaming video of entertainment media or vehicle mounted cameras either in the passenger compartment or external.

There are numerous configurations possible for an IoT device to connect to a node for obtaining software and or configuration scripts from the blockchain smart contract method. The configurations presented are examples of possible scenarios and are not meant to limit the use of this innovate approach of using smart contracts to provide software code and or configuration data to devices.

Figure 56:
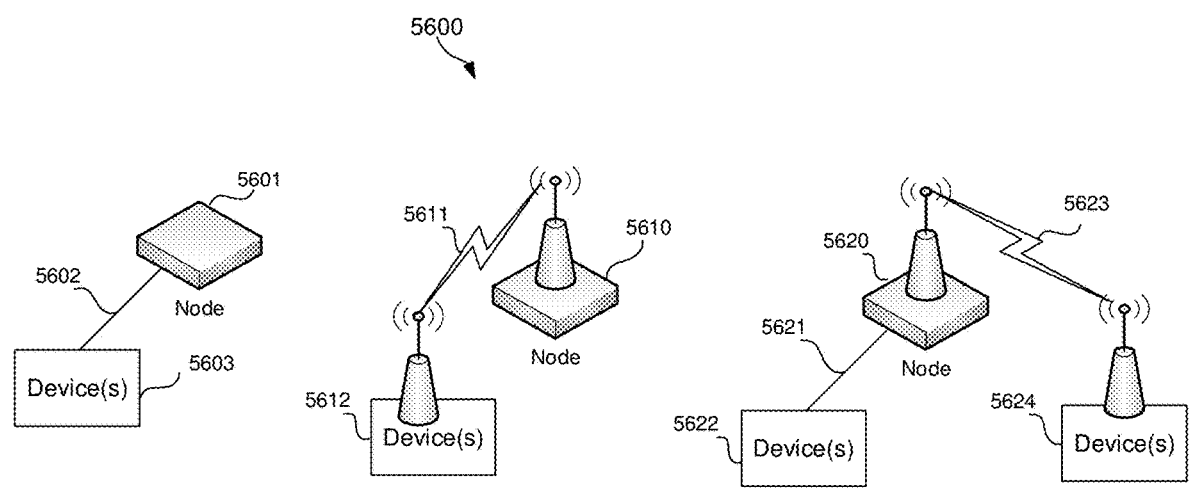
FIG. 56: This figure shows different IoT Hub/nodes.

FIG. 56 5600 depicts three possible node configurations that can communicate with a blockchain. Each of the nodes 5601 5610 5620 all can communicate with the blockchain directly or through a gateway. The node 5601 which connects to IoT devices 5603 with the use of a wired connection 5602. Node 5610 that also acts as a wireless access point and connects to the IoT devices 5613 through a wireless method 5611. Node 5620 is another example of a node that connects to devices 5622 by a wired connection 5621 and devices 5624 through a wireless access method 5623.

The connectivity between the IoT devices and nodes can be via wired or wireless and the actual protocols used either with a wired connection or a wireless connection are determined the connectivity requirements of the devices themselves and the function that they are being used for. The nodes can be located either on premise, remote or run a virtual machine (VM) in a cloud environment. The cloud environment can utilize numerous protocols include Open NFV, Open Slice, AWS, AZURE or any of the multitude of platforms that exist or will exist.

Figure 57:
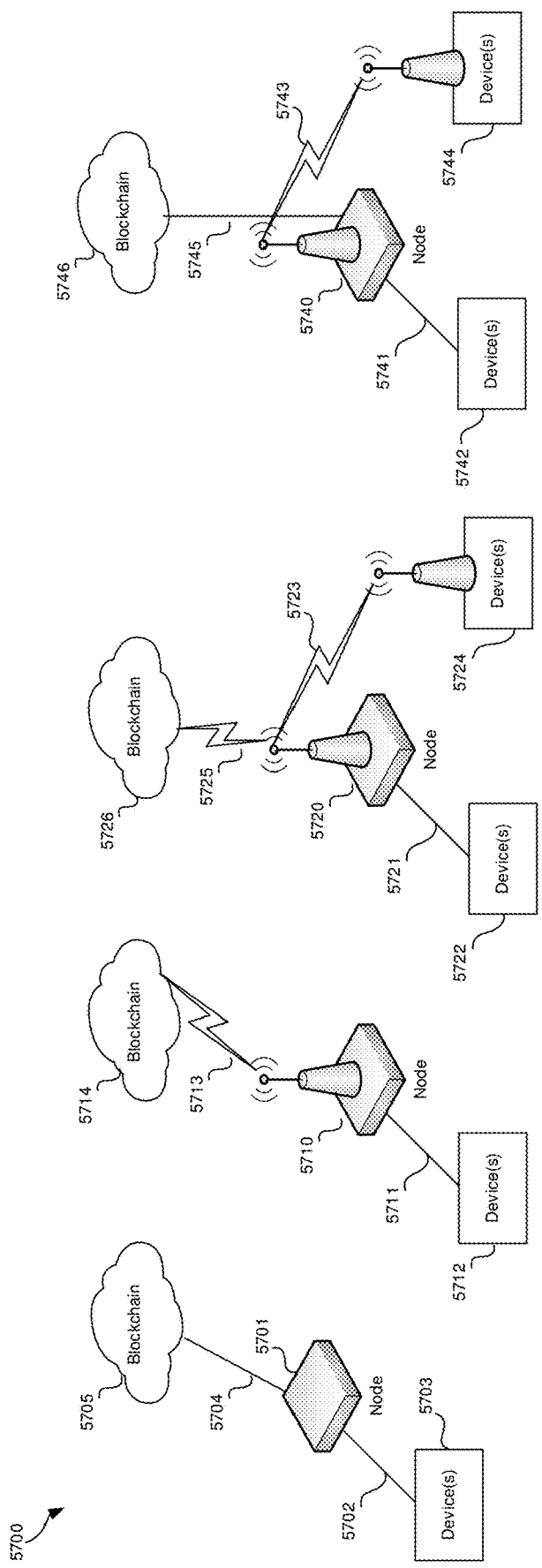
FIG. 57: This figure shows different IoT Hub/nodes connectivity to blockchain.

FIG. 57 shows the nodes 5701 5710 5720 and 5740 having connectivity to an outside network which can be a blockchain 5705 5714 5726 5746. The connectivity to the blockchain or outside network by the node can be wired 5704 5745 or wireless 5713 5725. The connectivity between the various nodes and the blockchain whether initially connected to an outside network through a wired or wireless connection can transverse over several types of networks until it is able to connect to appropriate blockchain environment.

Figure 58:
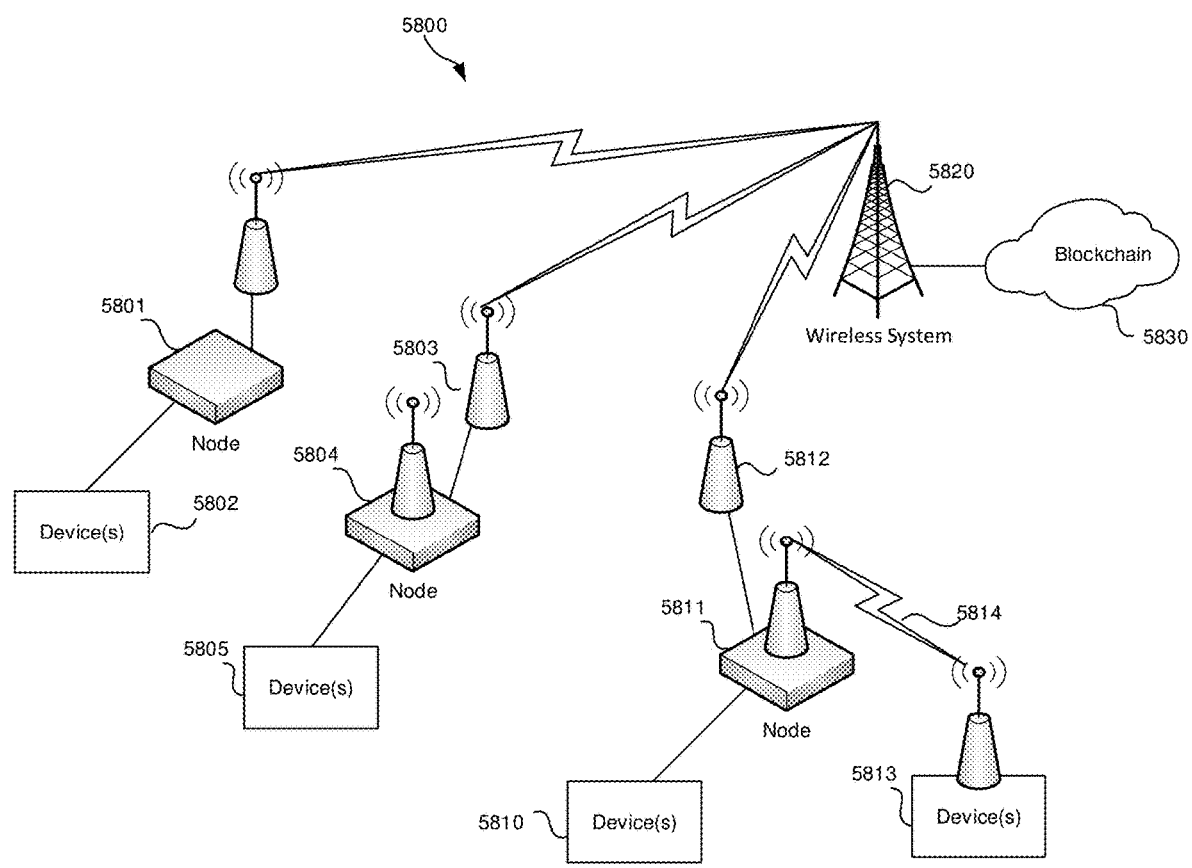
FIG. 58: This figure shows different IoT Hub/nodes connectivity to blockchain by wireless.

FIG. 58 shows the nodes 5801 5810 and 5811 and the associated IoT devices having connectivity to an outside network which can be a blockchain 5830 through a wireless network 5820. The connectivity between the various nodes and the blockchain whether initially connected to an outside network through a wireless connection can transverse over several types of networks until it is able to connect to appropriate blockchain environment.

Figure 59:
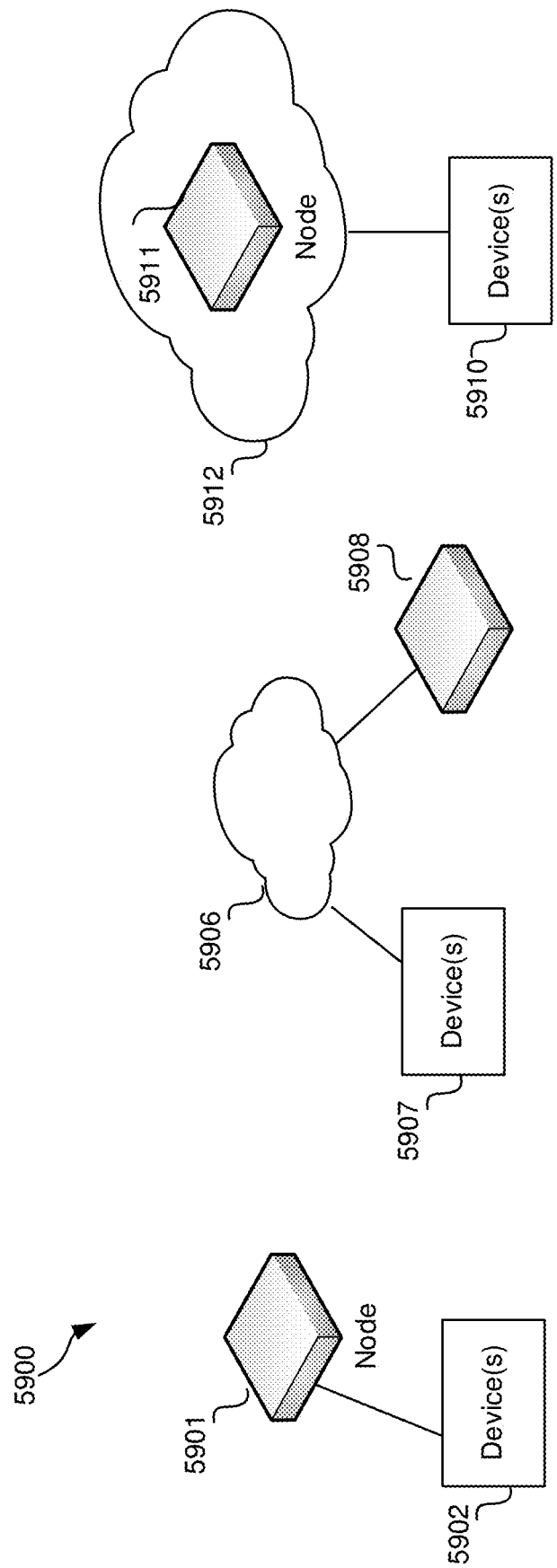
FIG. 59: This figure shows sample node locations.

FIG. 59 shows the general type of nodes shown in FIG. 57 and FIG. 58 obtaining their connectivity to the blockchain.

FIG. 59 has three possible node to device connectivity methods that are possible but not limited to these configurations. Node 5901 involves a node that is a standalone device which may have connectivity to the blockchain provided by a temporary connection. The node 5901 is connected to various IoT devices 5902. Another possible configuration involves node 5908 having the IoT devices 5907 that are associated with the node 5908 not being physically connected to each other and utilizing a network 5906 to provide the connectivity and this can be either a wireless network or wired network or a combination. Node 5911 is different than 5901 and 5906 in that node 5911 is virtual and operating in a cloud environment 5812 and the devices 5910 are connected either via wired or wirelessly to the cloud environment hosting 5911. The cloud environment can be a blockchain or the cloud environment enables the node to connect to a blockchain environment which can be on another network.

IoT devices or nodes that utilize the software code and or configuration data that resides on the blockchain is a unique cybersecurity process where the various IoT devices and nodes are being protected from being compromised and performing in an unwanted method.

FIG. 60 is a representation of how the messaging flow between an IoT device and or node and the smart contract residing on the blockchain could take place. The communication between the IoT device and the smart contract or blockchain involves a zero-trust environment which is very different than many security processes done presently. The objective of the zero-trust environment is to challenge all communication attempts and not just the initial access therefore providing a very robust method of securing edge devices.

As part of the zero-trust environment a unique token or key is created by the smart contract for every communication. The challenge request has the smart contract sending a random challenge to the device that only the smart contract is aware of and this challenge is different for every communication that take place. Once sent the IoT device and or node receives the challenge and generates a response. The challenge response is then hashed with the devices configuration and or software and sent back to the smart contract as a unique hash response that is only valid for that message. The smart contract knows the hash response expected since it knows the code, configuration and challenge response the device is meant to give. If the IoT device or node does not respond with the appropriate hash it is either denied registration, deregistered or placed in a quarantine, sandbox. The quarantine is meant to prevent draconian events from taking place due to hardware or software glitches or in the case that evidentiary information is being collected.

This method of zero trust validates that the software and configuration being used by the IoT device is correct and therefore not compromised. By ensuring this level of checking the data, telemetry, which is generated by the IoT device or node can be assured that it is indeed uncompromised. Additionally, this method also ensures that data piggybacking is not possible and preventing man in the middle attacks.

The use of the blockchain also prevents denial of service attacks due to the cost that is associated with each transaction. The transaction fee that is used for a blockchain does not need to have monetary value but can be initiated to that it has a life of a certain amount of transactions ensuring a license life or preventing the denial of service attacks through disabling the device itself. The wallet or equivalent for the blockchain utilized can be updated on a predetermined interval for each IoT device or node.

The process shown in FIG. 60 6000 is a device and or node registration process where the IoT device or node is allowed to proceed with the smart contact conditions. In FIG. 60 the device 6001 puts in a registration request 6010 to the smart contact 6002 on the blockchain. A unique token or key is created 6012 and this is then sent 6014 to the device. The IoT device or node receives the token and creates the unique response 6016 which is then sent to the smart contract 6018. The smart contract validates the response 6020 and if good responds with a success 6024 otherwise it is sent to a deregistration/quarantine process 6026.

Therefore, if the IoT device or node fails to register for any reason depending on the policy used it can be deactivated and removed for the smart contact devices or it is quarantined and assigned to another platform for post processing and further decisions.

Figure 61:
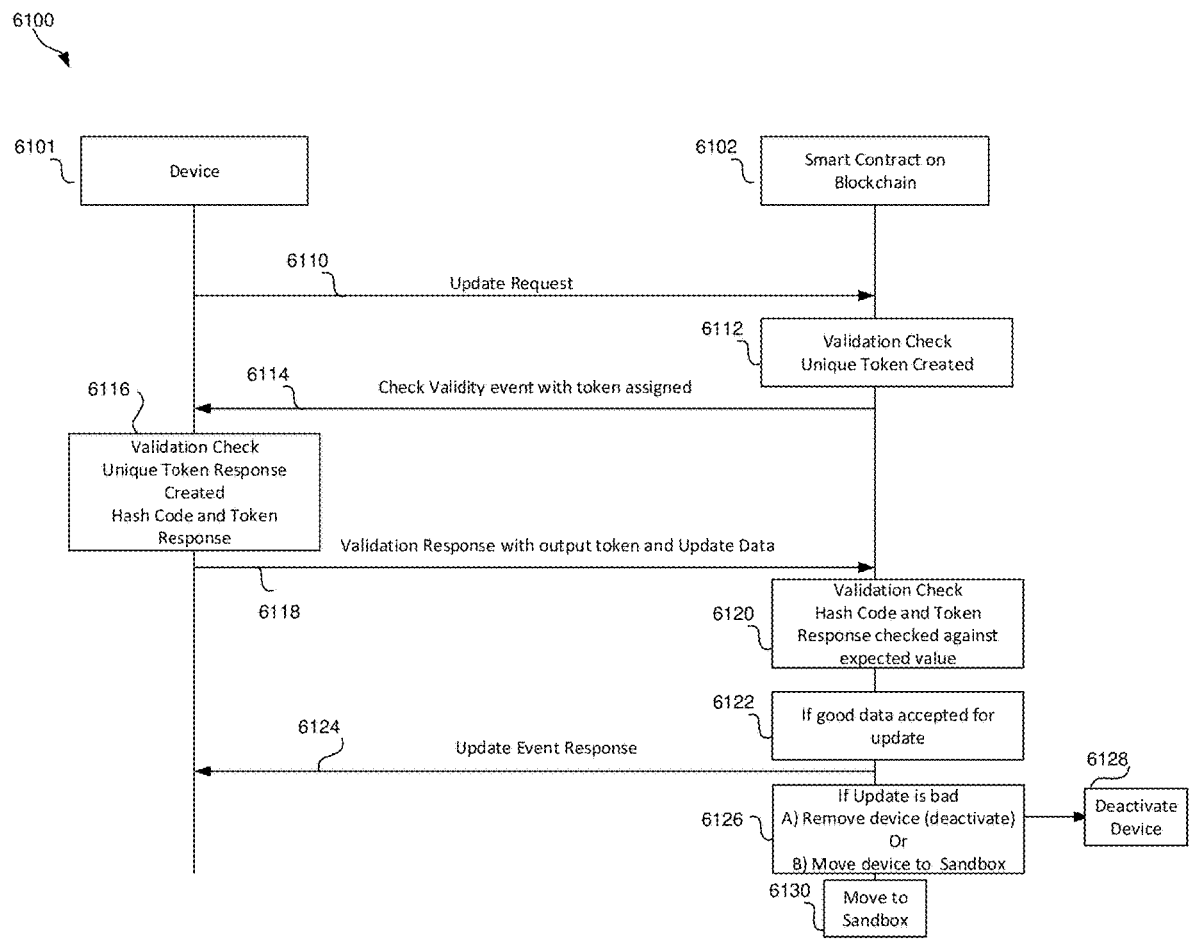
FIG. 61: This figure shows the Transaction Process.

FIG. 61 illustrates the messaging flow between an IoT device or node 6101 and the smart contract 6102 residing on the blockchain. The process shown in FIG. 61 is an IoT device and or node transaction process where the IoT device or node 6101 or node is allowed to proceed with the smart contact conditions. The IoT device or node in this process requests and update 6110 with the smart contract 6102. A validation check 6112 takes place and a challenges token is generated and sent 6114 to the device. The IoT device or node creates the response and associated hash 6116 and responds to the smart contract 6118. The response is checked 6120 and if good 6112 an update response is generated 6124. However, if there is a problem the device is either deactivated or placed into a quarantine sandbox 6126.

If the IoT device or node fails in the transaction approval process for any reason depending on the policy used it can be deactivated and removed for the smart contact devices or it is assigned to another platform for post processing and further decisions.

Figure 62:
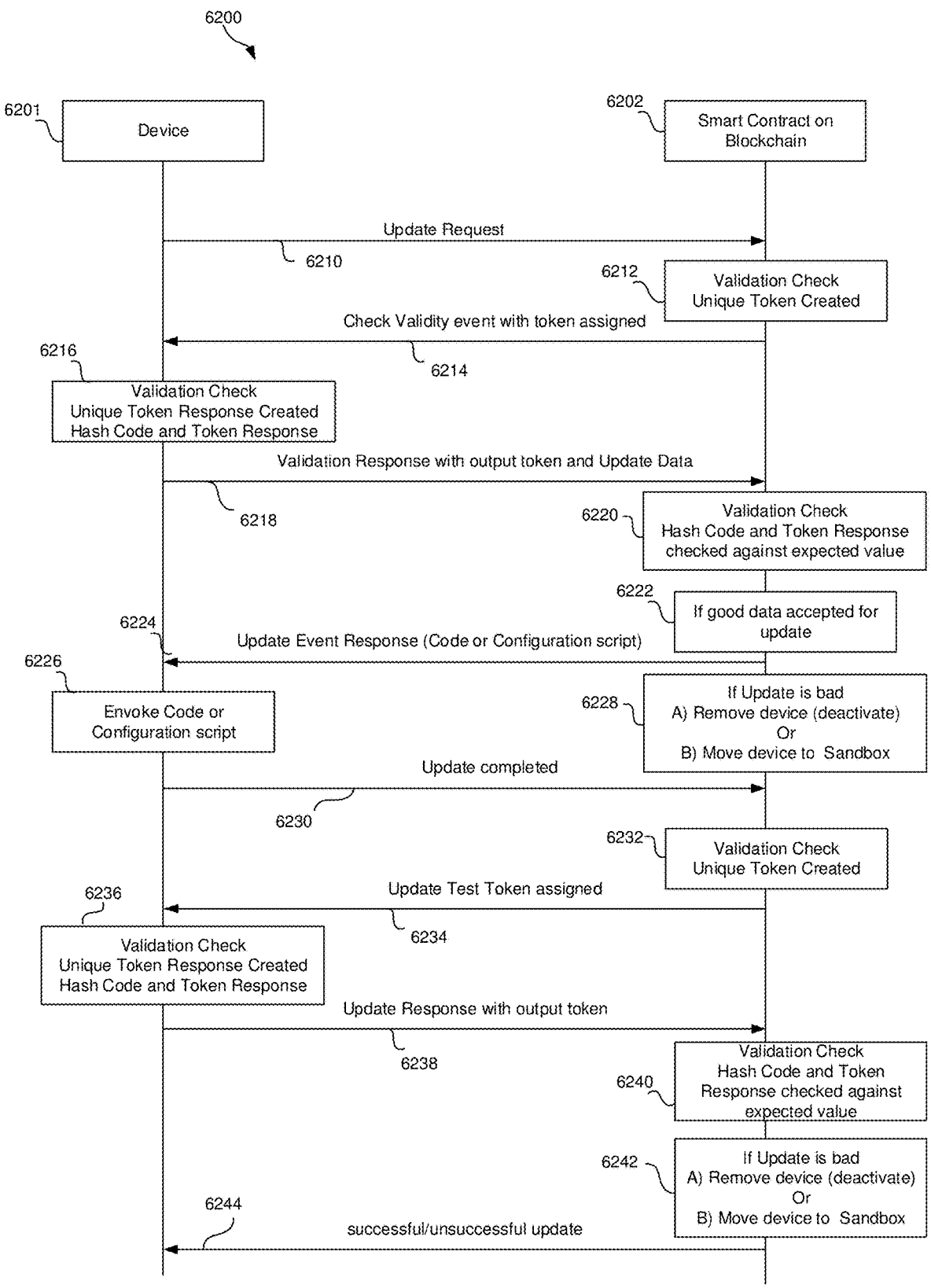
FIG. 62: This figure shows the configuration process.

The process shown in FIG. 62 is an IoT device and or node process involving the fetching, retrieving, of the software code and or configuration script process from the blockchain utilizing a smart contract. FIG. 62 therefore shows a process of the messaging flow between an IoT device and or node and the smart contract residing on the blockchain for fetching the software code and or configuration script.

The IoT device or node 6201 in this process requests an update 6210 with the smart contract 6202. A validation check 6212 takes place and a challenges token is generated and sent 6214 to the device. The IoT device or node creates the response and associated hash 6216 and responds to the smart contract 6218. The response is checked 9220 and if good 6212 an update response is generated 6224 with the appropriate software code and or configuration script. However, if there is a problem the IoT device or node is either deactivated or placed into a quarantine sandbox 6228.

Once validated the IoT device or node then runs the software code and or configuration script 6226. When the IoT device or node has completed the update or change it notifies the smart contract 6230. The smart contract initiates another validation check 6232 which is sent 6234 to the IoT device or node. The IoT device or node performs the response 6236 and sends the response 6238 to the smart contract. The response is then validated 6240 by the smart contract. If successful, the IoT device or node is notified 6244 otherwise the IoT device or node is deactivated or quarantined 6242.

Therefore, if the IoT device or node fails in the software and or configuration script process for any reason depending on the policy used it can be deactivated and removed for the smart contact devices or it is assigned to another platform for post processing and further decisions.

Figure 63:
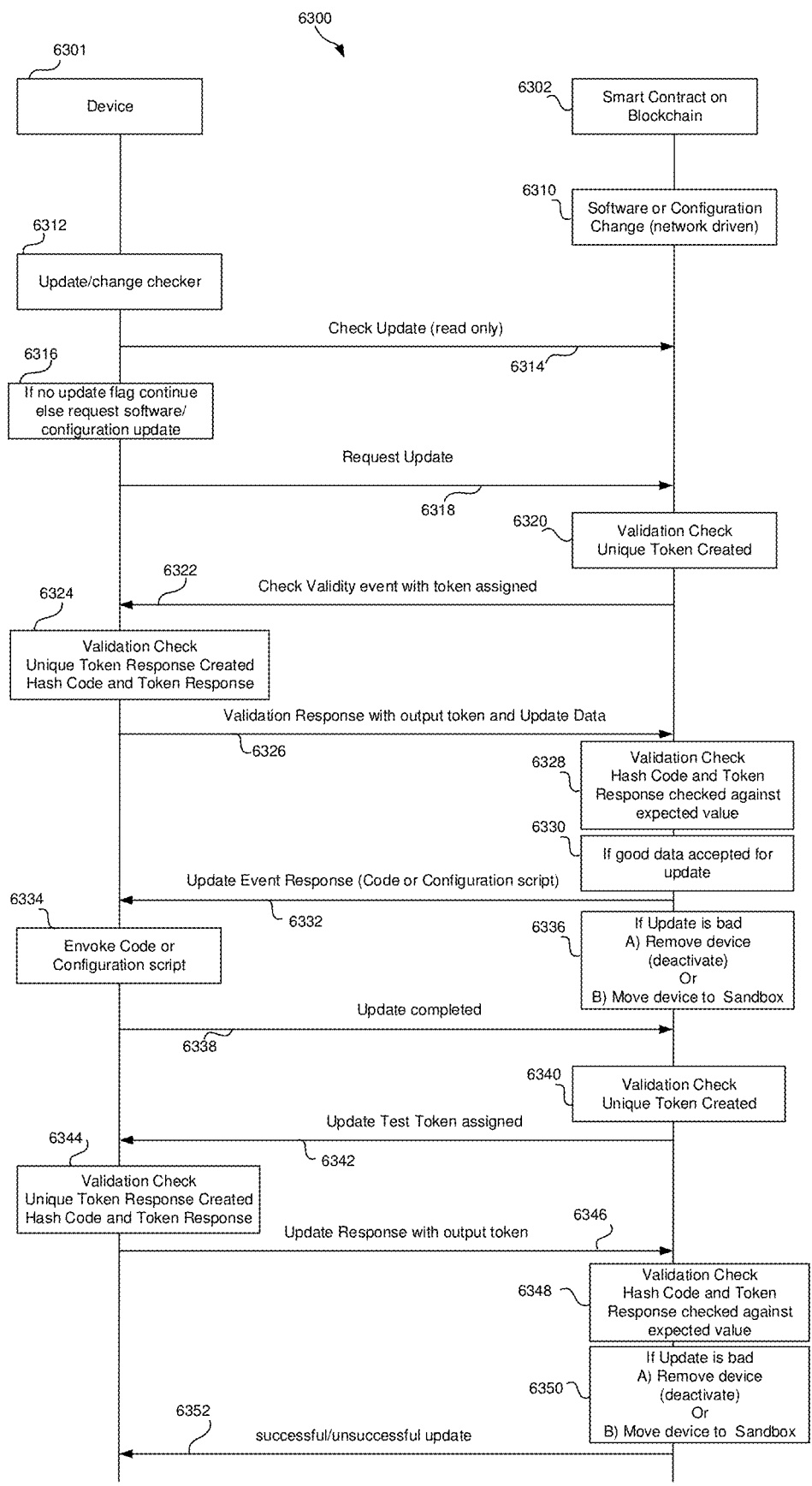
FIG. 63: This figure shows the Software and or Configuration change process.

The process shown in FIG. 63 is an example of how software code and or configuration script updates and or changes needed by the IoT device or node can be done. FIG. 63 is an example of the messaging flow between an IoT device and or node and the smart contract residing on the blockchain for updating software code and or configuration scripts. The process shown in FIG. 63 is one where the IoT device or node initiates the update process however this update process can also be initiated by the smart contract.

The IoT device or node 6301 in this process show in FIG. 63 determines 6312 that the IoT device or node needs to either get updated software or configuration file or just needs to check to see if what is has is current and requests an update check 6314 with the smart contract 6302. If no update flag or response is received the IoT device or node continues and or requests and update 6316 through 6218. The validation check 6329 takes place and a challenges token is generated and sent 6322 to the IoT device or node. The IoT device or node creates the response and associated hash 9324 and responds to the smart contract 9326. The response is checked 9328 and if good 9330 an update response is generated 9332 with the appropriate software code and or configuration script. However, if there is a problem the IoT device or node it is either deactivated or placed into a quarantine sandbox 9336.

The IoT device or node then runs the software code and or configuration script 6334. Once the IoT device or node has completed the update or change it notifies the smart contract 6338. The smart contract initiates another validation check 6340 which is sent 6342 to the IoT device or node. The IoT device or node performs the response 6344 and sends the response 6346 to the smart contract. The response is then validated 6348 by the smart contract. If successful, the IoT device or node is notified 6352 otherwise the IoT device or node is deactivated or quarantined 6350.

If the device fails in the software and or configuration script process for any reason depending on the policy used it can be deactivated and removed for the smart contact devices or it is assigned to another platform for post processing and further decisions.

Figure 64:
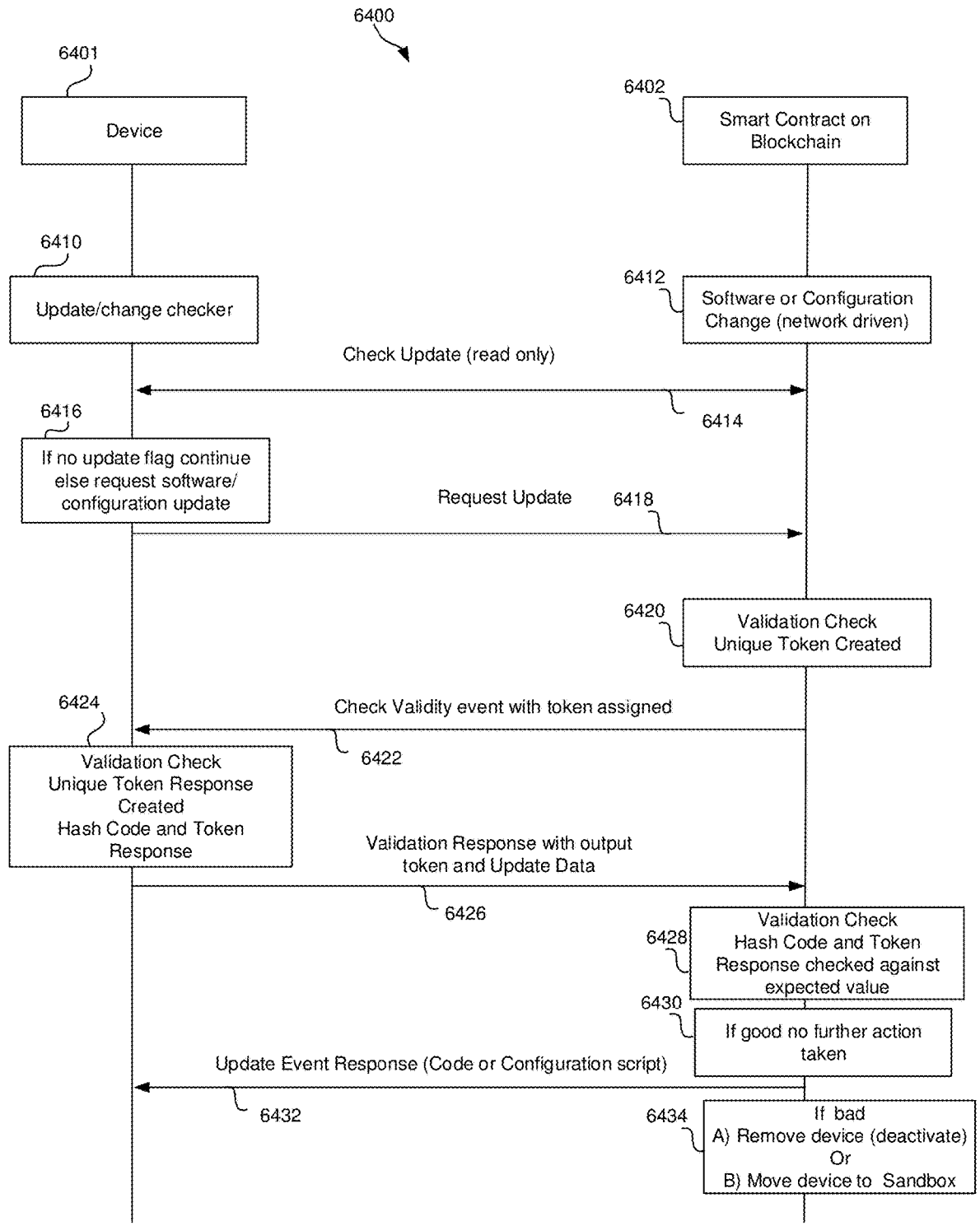
FIG. 64: This figure shows the Software and Configuration Audit process.

Periodically it may be necessary to perform an audit of the IoT devices or nodes that reside in the network. FIG. 64 is an example of a possible messaging flow between an IoT device and or node and the smart contract residing on the blockchain. The process shown in FIG. 64 is where software code and or configuration script is checked as part of a routine audit process for a network.

The IoT device or node 6401 in this process determines 6410 it needs to check that its software or configuration file is has is current. The check or rather audit can be initiated from the IoT device or node or from the network as indicated in 6414 which is dual directional depending on where the audit is initiated from. Therefore, an update check 6414 check is initiated. The process with the IoT device or node requesting the update involves sending and update check 6414 to the smart contract 6402. If no update flag or response is received the IoT device or node continues and or requests and update 6416 through 6418. The validation check takes place and a challenges token is generated 6420 and sent 6422 to the IoT device or node. The IoT device or node creates the response and associated hash 6424 and responds to the smart contract 6426. The response is checked 6428 and if good 6430 an update response is generated 6432 with the appropriate software code and or configuration script. However, if there is a problem with the response the IoT device or node is either deactivated or placed into a quarantine sandbox 6434.

If the IoT device or node fails in the software and or configuration script process for any reason depending on the policy used it can be deactivated and removed for the smart contact devices or it is assigned to another platform for post processing and further decisions.

Figure 65:
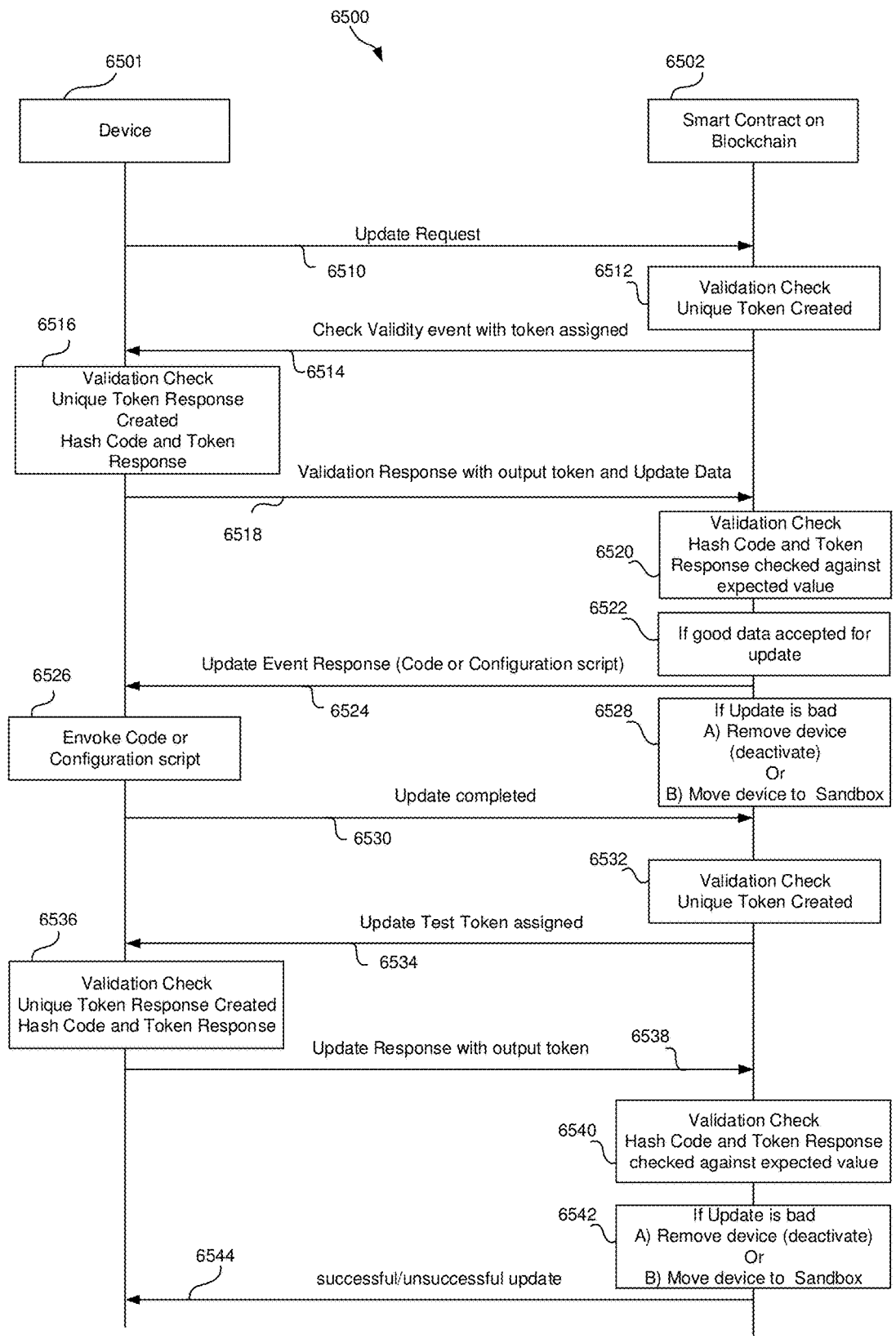
FIG. 65: This figure shows the Update request process.

FIG. 65 shows one possible process where a software code and or configuration script update is requested from the IoT device or node 6501.

The IoT device or node 6501 in this process requests an update 6510 with the smart contract 6502. A validation check 6512 takes place and a challenges token is generated and sent 6514 to the IoT device or node. The IoT device or node creates the response and associated hash 6516 and responds to the smart contract 6518. The response is checked 6520 and if good 6512 an update response is generated 6524 with the appropriate software code and or configuration script. However, if there is a problem the IoT device or node is either deactivated or placed into a quarantine sandbox 6528.

The IoT device or node then runs the software code and or configuration script 6526. Once the IoT device or node has completed the update or change it notifies the smart contract 6530. The smart contract initiates another validation check 6532 which is sent 6534 to the IoT device or node. The IoT device or node performs the response 6536 and sends the response 6538 to the smart contract. The response is then validated 6540 by the smart contract. If successful, the IoT device or node is notified 6544 otherwise the device is deactivated or quarantined 6542.

The need to protect communication devices in a non-secure environment also includes those devices used for military and surveillance operations. Using software code and or configuration scripts through smart contracts in a blockchain environment can directly protect critical assets.

Figure 66:
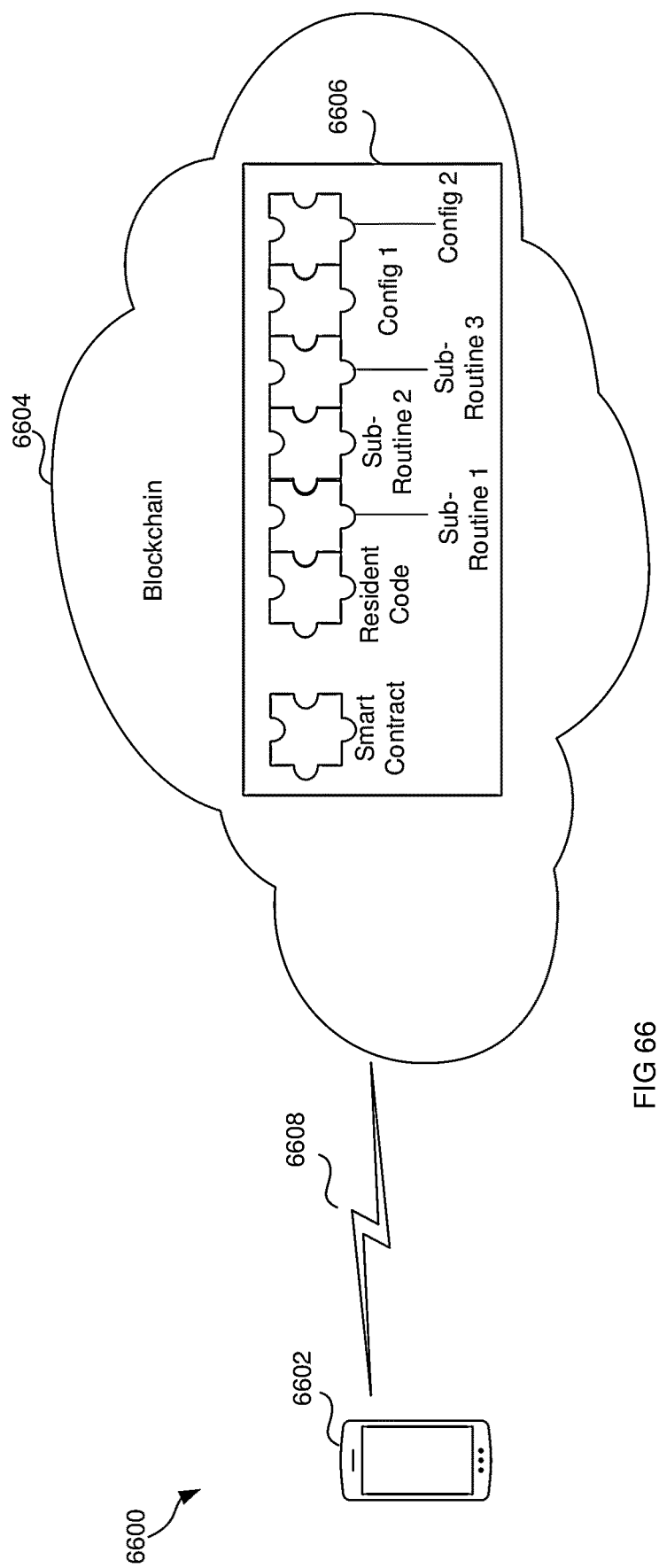
FIG. 66: This figure shows a Digital Message Device using blockchain smart contracts.

In FIG. 66 a digital message device (DMD) 6602 is connected to the blockchain 6604 through a wireless connection 6608. The code and or configuration information that the DMD or IoT device or node 6602 uses is located in the smart contract(s) 6606.

FIG. 66 the device 6602 utilized does not have the sensitive information residing within it preventing the information from being repurposed by an unwanted device or entity. The device 6602 is acting like a thin client however using the blockchain for securing the device and information content. The possible scenario involving the smart contract utilizing zero trust can be used to ensure that the information that is being used by the device is not available if the device becomes compromised. In the possible scenario show in FIG. 66 the user of the device 6602 accesses and uses sensitive information to perform a particular mission either by providing instructions or by receiving intelligence about the surrounding environment and assets both friendly and non-friendly.

The information that is being displayed and interacted with on the device 6602 in FIG. 66 is being displayed on the device however the code and other sensitive information is being run and controlled by the use of a smart contract 6606. In the event that the device is compromised either by being misplaced or taken by an unwanted entity the sensitive information is no longer available because the information is not resident to the device itself and therefore is not available for undesired or unwanted viewers. The device 6602 can be disabled from the network or fail in the zero-trust environment due to the lack of biometric sensors that are paired with the device or some other verification method pairing the device 6206 with the authorized user.

The device 6606 shown in FIG. 66 can also be a remote device. An example of a remote device could be a CCTV camera, remote listening device, drone, aerial reconnaissance vehicle, guided munition, autonomous robot or another other device sending and or receiving information that is sensitive in nature.

The various embodiments include methods for improving the security and functionality for internet of things (IoT) devices using blockchain techniques. In an embodiment, the method may include using multiple inputs received from various devices (e.g., both mobile devices and IoT devices, etc.).

In a further embodiment, the method may include determining an approximate location of an IoT device, forming a communication group.

In a further embodiment, the method may include grouping the mobile device or IoT device with a plurality of wireless transceivers, IoT devices, mobile devices and/or fixed wireless devices that are in close proximity to form the communication group and receiving location information from two or more of the devices in the communication group.

In some embodiments, the devices the communication group may be coupled to different networks, which may include to utilize different network access technologies. In a further embodiment, the method may include establishing a near field communication link to a wireless transceiver and sending the determined approximate location to the wireless transceiver over the established near field communication link.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What we claim is:

1. A method of providing software to a network device in a network that implements a fifth generation wireless mobile communication technology standard, the method comprising:
    communicating, by a processor in the network device, with two or more smart contracts on a blockchain that includes a plurality of blocks to determine the blocks in the in the two or more smart contracts that include software for the network device, wherein each of the two or more smart contracts include at least one configuration block and two or more software blocks;
    determining an execution order in which the software blocks from different smart contracts in the determined blocks are to be executed on the network device;
    using the configuration block to provide a configuration script to the network device;
    invoking executable code on the network device to call the two or more smart contracts and read the determined blocks in the determined execution order to generate executable code for the network device; and
    executing the generated executable code on the network device.

2. The method of claim 1, further comprising using the two or more smart contracts on the blockchain to:
    manage the generated executable code;
    configure the generated executable code;
    provision a dynamic element;
    provision a static element; or
    perform network slicing.

3. The method of claim 1, further comprising:
    determining a profile for the network device based on the configuration block; and
    provisioning the network device with the determined profile.

4. The method of claim 1, further comprising using the retrieved executable code to perform one or more network functions.

5. The method of claim 1, further comprising using the two or more smart contracts on the blockchain to retrieve:
    code from one or more blocks in the plurality of blocks of the blockchain;
    configuration data from one or more blocks in the plurality of blocks of the blockchain; or
    profile data from one or more blocks in the plurality of blocks of the blockchain.

6. The method of claim 1, further comprising assigning the network device to a tiered class of service based on the two or more smart contracts on the blockchain.

7. The method of claim 1, further comprising:
    associating a policy and security hierarchy to the network device;
    assigning a class of service to the network device; or
    assigning a security policy to the network device.

8. A network device, comprising:
a processor; and
a memory coupled to the processor, wherein the processor is configured with processor executable software instructions to perform operations comprising:
communicating with two or more smart contracts on a blockchain that includes a plurality of blocks to determine the blocks in the in the two or more smart contracts that include software for the network device, wherein each of the two or more smart contracts include at least one configuration block and two or more software blocks;
determining an execution order in which the software blocks from different smart contracts in the determined blocks are to be executed on the network device;
using the configuration block to provide a configuration script to the network device;
invoking executable code on the network device to call the two or more smart contracts and read the determined blocks in the determined execution order to generate executable code for the network device; and
executing the generated executable code on the network device.

9. The network device of claim 8, wherein the processor is configured with processor executable software instructions to perform operations further comprising using the two or more smart contracts on the blockchain to:
manage the generated executable code;
configure the generated executable code;
provision a dynamic element;
provision a static element; or
perform network slicing.

10. The network device of claim 8, wherein the processor is configured with processor executable software instructions to perform operations further comprising:
determining a profile for the network device based on the configuration block; and
provisioning the network device with the determined profile.

11. The network device of claim 8, wherein the processor is configured with processor executable software instructions to perform operations further comprising using the retrieved executable code to perform one or more network functions.

12. The network device of claim 8, wherein the processor is configured with processor executable software instructions to perform operations further comprising using the two or more smart contracts on the blockchain to retrieve:
code from one or more blocks in the plurality of blocks of the blockchain;
configuration data from one or more blocks in the plurality of blocks of the blockchain; or
profile data from one or more blocks in the plurality of blocks of the blockchain.

13. The network device of claim 8, wherein the processor is configured with processor executable software instructions to perform operations further comprising assigning the network device to a tiered class of service based on the two or more smart contracts on the blockchain.

14. The network device of claim 8, wherein the processor is configured with processor executable software instructions to perform operations further comprising:
associating a policy and security hierarchy to the network device;
assigning a class of service to the network device; or
assigning a security policy to the network device.

15. A non-transitory computer readable storage medium having stored thereon processor-executable software instructions configured to cause a processor of a network device to perform operations comprising:
communicating with two or more smart contracts on a blockchain that includes a plurality of blocks to determine the blocks in the in the two or more smart contracts that include software for the network device, wherein each of the two or more smart contracts include at least one configuration block and two or more software blocks;
determining an execution order in which the software blocks from different smart contracts in the determined blocks are to be executed on the network device;
using the configuration block to provide a configuration script to the network device;
invoking executable code on the network device to call the two or more smart contracts and read the determined blocks in the determined execution order to generate executable code for the network device; and
executing the generated executable code on the network device.

16. The non-transitory computer readable storage medium of claim 15, wherein the stored processor-executable software instructions are configured to cause the processor to perform operations further comprising using the two or more smart contracts on the blockchain to:
manage the generated executable code;
configure the generated executable code;
provision a dynamic element;
provision a static element; or
perform network slicing.

17. The non-transitory computer readable storage medium of claim 15, wherein the stored processor-executable software instructions are configured to cause the processor to perform operations further comprising:
determining a profile for the network device based on the configuration block; and
provisioning the network device with the determined profile.

18. The non-transitory computer readable storage medium of claim 15, wherein the stored processor-executable software instructions are configured to cause the processor to perform operations further comprising using the retrieved executable code to perform one or more network functions.

19. The non-transitory computer readable storage medium of claim 15, wherein the stored processor-executable software instructions are configured to cause the processor to perform operations further comprising using the two or more smart contracts on the blockchain to retrieve:
code from one or more blocks in the plurality of blocks of the blockchain;
configuration data from one or more blocks in the plurality of blocks of the blockchain; or
profile data from one or more blocks in the plurality of blocks of the blockchain.

20. The non-transitory computer readable storage medium of claim 15, further comprising assigning the network device to a tiered class of service based on the two or more smart contracts on the blockchain.

21. The non-transitory computer readable storage medium of claim 15, wherein the stored processor-executable software instructions are configured to cause the processor to perform operations further comprising:
associating a policy and security hierarchy to the network device;
assigning a class of service to the network device; or
assigning a security policy to the network device.

* * * * *